US011550031B2

(12) United States Patent
Nguyen et al.

(10) Patent No.: US 11,550,031 B2
(45) Date of Patent: Jan. 10, 2023

(54) METHOD AND APPARATUS FOR BIOMETRIC AUTHENTICATION USING FACE RADAR SIGNAL

(71) Applicant: Samsung Electronics Co., Ltd., Suwon-si (KR)

(72) Inventors: Khuong N. Nguyen, Allen, TX (US); Wenxun Qiu, Allen, TX (US); Boon Loong Ng, Plano, TX (US); Vutha Va, Plano, TX (US); Abhishek Sehgal, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 16/687,367

(22) Filed: Nov. 18, 2019

(65) Prior Publication Data

US 2020/0300970 A1     Sep. 24, 2020

Related U.S. Application Data

(60) Provisional application No. 62/829,840, filed on Apr. 5, 2019, provisional application No. 62/829,824, filed
(Continued)

(51) Int. Cl.
*G01S 7/41*      (2006.01)
*G01S 13/86*      (2006.01)
*G06V 40/16*      (2022.01)

(52) U.S. Cl.
CPC .............. *G01S 7/412* (2013.01); *G01S 7/417* (2013.01); *G01S 13/867* (2013.01); *G06V 40/166* (2022.01); *G06V 40/172* (2022.01)

(58) Field of Classification Search
CPC ........ G01S 7/412; G01S 7/417; G01S 13/867; G01S 13/522; G01S 13/88; G06V 40/172;
(Continued)

(56) References Cited

U.S. PATENT DOCUMENTS 8,782,775 B2    7/2014   Fadell et al.
10,591,586 B2 *   3/2020   Trotta ..................... G01S 7/412
(Continued)

FOREIGN PATENT DOCUMENTS

KR    10-2017-0020036 A    2/2017
KR    10-2019-0005740 A    1/2019

OTHER PUBLICATIONS

Wang et al., "Deep Face Recognition: A Survey", arXiv preprint arXiv:1804.06655, Apr. 2018, 26 pages. (Year: 2018).*
(Continued)

*Primary Examiner* — Donald H B Braswell

(57) ABSTRACT

An electronic device, a method, and computer readable medium are disclosed. The method includes transmitting radar signals via a radar transceiver. The method also includes identifying signals of interest that represent biometric information of a user based on reflections of the radar signals received by the radar transceiver. The method further includes generating an input based on the signals of interest that include the biometric information. The method additionally includes extracting a feature vector based on the input. The method also includes authenticating the user based on comparison of the feature vector to a threshold of similarity with preregistered user data.

20 Claims, 31 Drawing Sheets

Related U.S. Application Data on Apr. 5, 2019, provisional application No. 62/829,136, filed on Apr. 4, 2019, provisional application No. 62/819,779, filed on Mar. 18, 2019.

(58) Field of Classification Search
CPC ...... G06V 40/166; G06V 10/82; G06V 40/40; G06K 9/6267
See application file for complete search history.

(56) References Cited

U.S. PATENT DOCUMENTS

| | | | |
|---|---|---|---|
| 2016/0054803 | A1 | 2/2016 | Poupyrev |
| 2016/0341821 | A1 | 11/2016 | Wang |
| 2017/0048239 | A1 | 2/2017 | Jeon et al. |
| 2017/0097413 | A1 | 4/2017 | Gillian et al. |
| 2017/0185870 | A1* | 6/2017 | Romanenko ........... G06V 10/44 |
| 2018/0252806 | A1 | 9/2018 | Miranda et al. |
| 2019/0011534 | A1* | 1/2019 | Trotta ................... G01S 13/878 |
| 2019/0349365 | A1* | 11/2019 | Sambhwani ............. G06N 3/08 |
| 2020/0025877 | A1* | 1/2020 | Sarkis .................... G01S 13/87 |
| 2020/0202145 | A1* | 6/2020 | Mao ...................... G05D 1/0088 |
| 2020/0309930 | A1* | 10/2020 | Zhou .................... G06V 40/172 |

OTHER PUBLICATIONS

Wang et al., "Deep Face Recognition: A Survey", arXiv preprint arXiv:1804.06655, Apr. 2018, 26 pages.

Liu et al., "Large-Margin Softmax Loss for Convolutional Neural Networks", Proceedings of the 33rd International Conference on International Conference on Machine Learning (ICML'16), Jun. 2016, 10 pages.

Liu et al., "SphereFace: Deep Hypersphere Embedding for Face Recognition", 2017 IEEE Conference on Computer Vision and Pattern Recognition (CVPR), Jul. 2017, pp. 212-220.

Hochreiter et al., "Long Short-Term Memory", Neural Computation, vol. 9, No. 8, Nov. 1997, pp. 1735-1780.

Rosenblatt, "The Perceptron, A Perceiving and Recognizing Automaton (Project Para)", Cornell Aeronautical Laboratory, Report No. 85-460-1, Jan. 1957, 33 pages.

International Search Report dated Jun. 29, 2020 in connection with International Patent Application No. PCT/KR2020/003709, 5 pages.

Written Opinion of the International Searching Authority dated Jun. 29, 2020 in connection with International Patent Application No. PCT/KR2020/003709, 4 pages.

\* cited by examiner

METHOD AND APPARATUS FOR BIOMETRIC AUTHENTICATION USING FACE RADAR SIGNAL

CROSS-REFERENCE TO RELATED APPLICATION AND CLAIM OF PRIORITY

This application claims priority under 35 U.S.C. § 119(e) to U.S. Provisional Patent Application No. 62/819,779 filed on Mar. 18, 2019, U.S. Provisional Patent Application No. 62/829,136 filed on Apr. 4, 2019, U.S. Provisional Patent Application No. 62/829,824 filed on Apr. 5, 2019, and U.S. Provisional Patent Application No. 62/829,840 filed on Apr. 5, 2019. The above-identified provisional patent applications are hereby incorporated by reference in its entirety.

TECHNICAL FIELD

This disclosure relates generally to biometric authentication. More specifically, this disclosure relates to radar based biometric authentication.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing. For example, certain electronic devices not only provide voice call services using a mobile communication network, but can also offer video call services, messaging services, data transmission service, multimedia services, as well as provide content to a user. Some of the functions and features that an electronic device can perform, include displaying documents, opening files, running programs, and the like. Documents, files, and programs can include confidential and sensitive information that require the electronic device to first verify and authenticate the user prior to providing access to the requested content.

An electronic device can verify a user prior to allowing a user access to certain functions and features by authenticating the user. A user can input credentials such as a user identification (ID) and a password, which are specific to the content the user desires to access, for authentication purposes. After inputting the credentials, the electronic device determines whether the inputted credentials match a preregistered set of credentials. When the inputted credentials match a preregistered set of credentials, the user is authenticated and provided the requested content. Since a user ID and password are intangible, the electronic device is unable to determine, based on the user ID and the password alone, whether the password was used by a third party who would otherwise not have access to the requested content. Anyone who acquires the credentials of a user can illicitly gain access to the content by masquerading as the authorized user.

SUMMARY

This disclosure provides methods and apparatuses for biometric authentication using face radar signal.

In one embodiment, electronic device is provided. The electronic device includes a memory, a radar transceiver, and a processor. The memory is configured to store preregistered user data. The processor is configured to transmit radar signals via the radar transceiver. The processor is also configured to identify signals of interest that represent biometric information of a user based on reflections of the radar signals received by the radar transceiver. The processor is further configured to generate an input based on the signals of interest that include the biometric information. The processor is additionally configured to extract a feature vector based on the input. The processor is also configured to authenticate the user based on comparison of the feature vector to a threshold of similarity with the preregistered user data.

In another embodiment, a method is provided. The method includes transmitting, via a radar transceiver, radar signals. The method also includes identifying signals of interest that represent biometric information of a user based on reflections of the radar signals received by the radar transceiver. The method further includes generating an input based on the signals of interest that include the biometric information. The method additionally includes extracting a feature vector based on the input. The method also includes authenticating the user based on comparison of the feature vector to a threshold of similarity with preregistered user data.

In yet another embodiment a non-transitory computer readable medium embodying a computer program is provided. The computer program comprising computer readable program code that, when executed by a processor of an electronic device, causes the processor to: transmit, via a radar transceiver, radar signals; identify signals of interest that represent biometric information of a user based on reflections of the radar signals received by the radar transceiver; generate an input based on the signals of interest that include the biometric information; extract a feature vector based on the input; and authenticate the user based on comparison of the feature vector to a threshold of similarity with preregistered user data.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
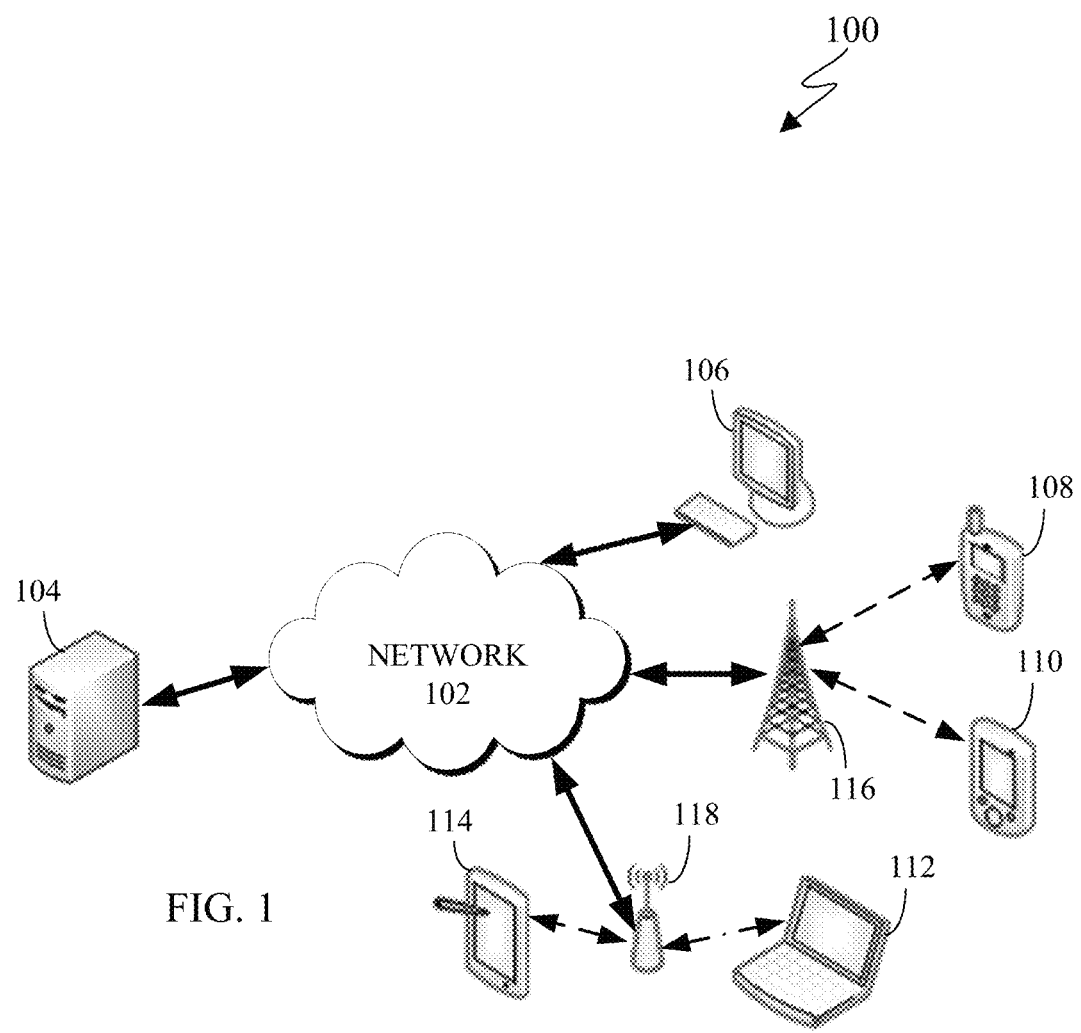
FIG. 1 illustrates an example communication system in accordance with an embodiment of this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure, can include personal computers (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), portable multimedia players (PMPs), MP3 players, mobile medical devices, virtual reality headsets, portable game consoles, cameras, and wearable devices, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices, and can include new electronic devices depending on the development of technology. It is noted that as used herein, the term "user" may denote a human or another device (such as an artificial intelligent electronic device) using the electronic device.

Certain electronic devices include a graphical user interface (GUI) such as a display that allows a user to view information displayed on the display in order to interact with the electronic device. Electronic devices can also include a user input device, such as keyboard, a mouse, a touchpad, a camera, among others. The various types of input devices allow a user to interact with the electronic device. Various electronic devices can also include a combination of a user input device and a GUI, such as a touch screen. Touch screens allow a user to interact with the electronic device via touching the display screen itself. Content that is displayed on the GUI can include confidential or sensitive information, which require the electronic device to authenticate the user prior providing the information to the user.

An electronic device can employ one or more authentication mechanisms to authorize a user to access content on an electronic device as well as access to physical and digital resources such as buildings, rooms, computing devices, and digital content, and the like. The electronic device itself can require a form of authentication that verifies the user is an approved user of the electronic device, prior to granting access to the electronic device. Similarly, an electronic device can employ one or more authentication mechanisms that provide a user with access to content that is located remotely from the electronic device. For example, a remote server can require the electronic device to verify the identity of the user prior to granting access to the content of the remote server, in order to prevent unauthorized access to confidential or personal information.

Authentication mechanisms can include passwords, gestures, and biometrics. Biometric authentication can include personal identifiers of a user such as a fingerprint of the user, a face of the user, an iris of the user, a retina of the user, and the like. Biometric authentication is a security process that relies on the unique physical characteristics and/or biological characteristics of an individual to verify and authenticate the user. User biometric data is difficult to forge as it is unique to each individual person. Facial recognition uses a camera to capture the face of the user or the eye of the user.

Biometric authentication systems compare captured biometric data to preregistered biometric data of the user. For example, an image capturing device, such as a camera, can acquire an image of particular biometric characteristic of the user, such as the face of the user, the fingerprint of the user, or the like. It is noted that an object or other body parts of the user can be used for authentication purposes. The captured image of the particular biometric characteristic represents a unique signature, such as a secret password, that when matched with preregistered data, allows access to the electronic device, or content while preventing access to unauthorized persons. The electronic device determines whether to authenticate the user and provide access to the requested content based on whether the captured image of particular biometric characteristic matches a preregistered biometric characteristic. If both the captured biometric data and the preregistered biometric data are within a threshold of similarity, the user is authenticated, and provided access to the requested content.

Embodiments of the present disclosure recognize and take into consideration that, vision based biometric authentication systems can capture a poor sample for authentication purposes based on external constraints. For example, biometric authentication can fail to capture an image of a user for authentication purposes when ambient lighting poor. Embodiments of the present disclosure include systems and methods for radar based biometric authentication systems. Radar signals can penetrate different materials and collect facial data for authentication purposes, regardless of ambient lighting conditions or whether a user is wearing an article of clothing or a mask which covers their face. For example, an electronic device can emit radar signals, can collect biometric data to authenticating the user prior to proving the user access personal or sensitive information.

Embodiments of the present disclosure recognize and take into consideration that, biometric authentication can be exploited due to holes in a biometric verification process. For example, a presentation attack is an attempt to interfere with the verification process of biometric system and can result in bypassing the security system. Spoofing is a type of presentation attack. Embodiments of the present disclosure include apparatuses and methods to prevent or minimize spoofing by determining whether the source of the authentication is alive or fake. In certain embodiments, liveness detection detects a spoofing attempt by determining whether the source of the biometric sample is a live human being or a false representation of the user, such as a mask of photographic image of the user. For example, an electronic device can collect data of the user through additional sensors for determining whether the source is alive or a reproduction. For another example, an electronic device can identify whether the radar signals are reflected off of a surface other than skin.

Embodiments of the present disclosure recognize and take into consideration that, if the radar signal is directly used for biometric authentication, then a possibility arises that the radar signals are too variable for a learning algorithm to identify the user. Alternatively, if certain signals are preprocessed into geometrically interpretable radar image, the signal cropping could result in loss of information necessary for biometric authentication.

Embodiments of the present disclosure include apparatuses and methods for training multiple learning and deploy models based on the extracted radar information, such as a range estimate as the indicator for categorizing scenarios in which the signals were captured. Embodiments of the present disclosure include various learning-based solutions that use radar as a sensing device to provide input signals. The learning-based solutions can be implemented to detect certain signals that are relevant for various tasks, such as biometric authentication of a user.

Embodiments of the present disclosure include apparatuses and methods for extracting certain signals corresponding to the target, such as the face or hand of a user. Moreover, different radar signals can be selected, based on the task to be performed, such as face authentication, anti-spoofing, gesture recognition, to name a few.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

In certain embodiments, the server 104 is a neural network that is configured to extract features from images or radar signatures for authentication purposes. In certain embodiments, a neural network is included within any of the client devices 106-114. When a neural network is included in a client device, the client device can user the neural network to extract features from images or radar signatures for authentication purposes, without having to transmit content over the network 102.

Each client device 106-114 represents any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals for biometric authentication via a radar transceiver.

In this example, some client devices 108 and 110-114 communicate indirectly with the network 102. For example, the mobile device 108 and PDA 110 communicate via one or more base stations 116, such as cellular base stations or eNodeBs (eNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s).

In certain embodiments, any of the client devices 106-114 transmit information securely and efficiently to another device, such as, for example, the server 104. Also, any of the client devices 106-114 can trigger the information transmission between itself and server 104. Any of the client devices 106-114 can function as a radar emitter and collector for biometric authentication purposes. For example, any of the client devices 106-114 can collect and compare biometric data of the user to preregistered biometric data to authenticate the user. After the user is authenticated, the client devices 106-114 can provide access to the user of the requested content, such as information that is locally stored on a respective client device, stored on another client device, or stored on the server 104.

For instance, if the mobile device 108 authenticates the user, the mobile device 108 can grant the user access to the secured content or request the content from another device, such as another client device or the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
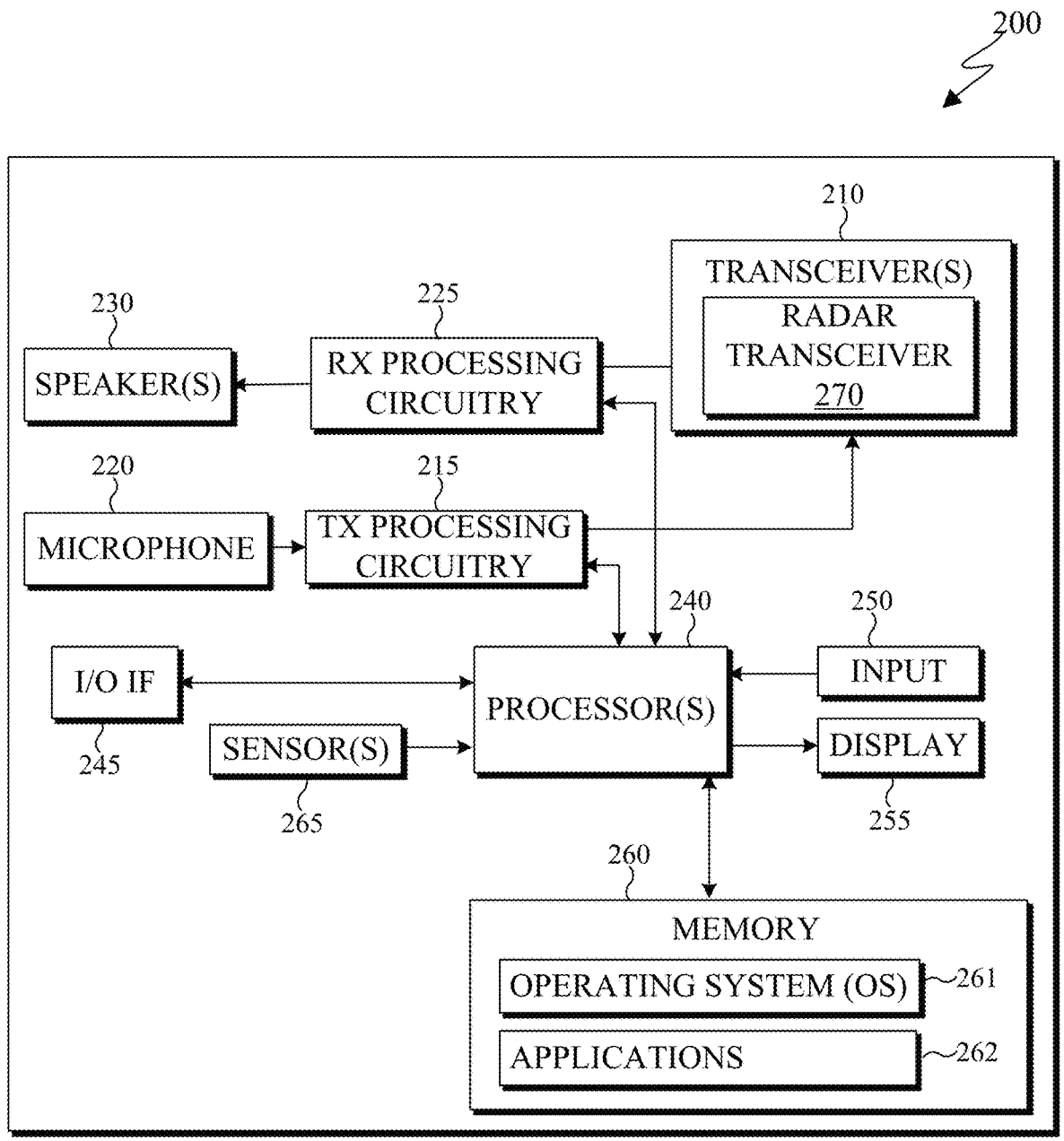
FIG. 2 illustrates an example electronic device in accordance with an embodiment of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114, of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WI-FI transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. The transceiver(s) 210 transmit and receive a signal or power to or from the electronic device 200. The transceiver(s) 210 receives an incoming signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include an authentication program as well as a program or file that requires authentication prior to accessing.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the radar transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc. The memory 260 also can include sensitive and confidential information, which require user authentication prior to accessing the content.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is a radar transceiver 270 that is configured to transmit and receive signals for detection and ranging purposes. For example, the radar transceiver 270 may be any type of transceiver including, but not limited to a WiFi transceiver, for example, an 802.11ay transceiver. The radar transceiver 270 includes an antenna array. The radar transceiver 270 can transmit signals at a frequency less than or equal to 100 GHz. For example, the radar transceiver 270 can transmit signals at frequencies including, but not limited to, 6 GHz, 7 GHz, 8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200.

In certain embodiments, the radar transceiver 270 can include a transmitter and a receiver. The transmitter can transmit millimeter wave (mmWave) signals. The receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the objection by mapping the various distances.

The electronic device 200 can include one or more cameras (not shown). The camera can represent any number of devices that can capture or generate an image. For example, the camera captures a color image such as RGB or a black and white image. The camera can capture a still image or video. The camera can capture an image of a body part of the user, such as the users face. In certain embodiments, the camera can capture an image of an object. The camera can capture an image that of a quality that can be used for authentication purposes. For example, the camera can provide a captured image to a feature extractor which extracts certain features from the image for authentication purposes.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3A:
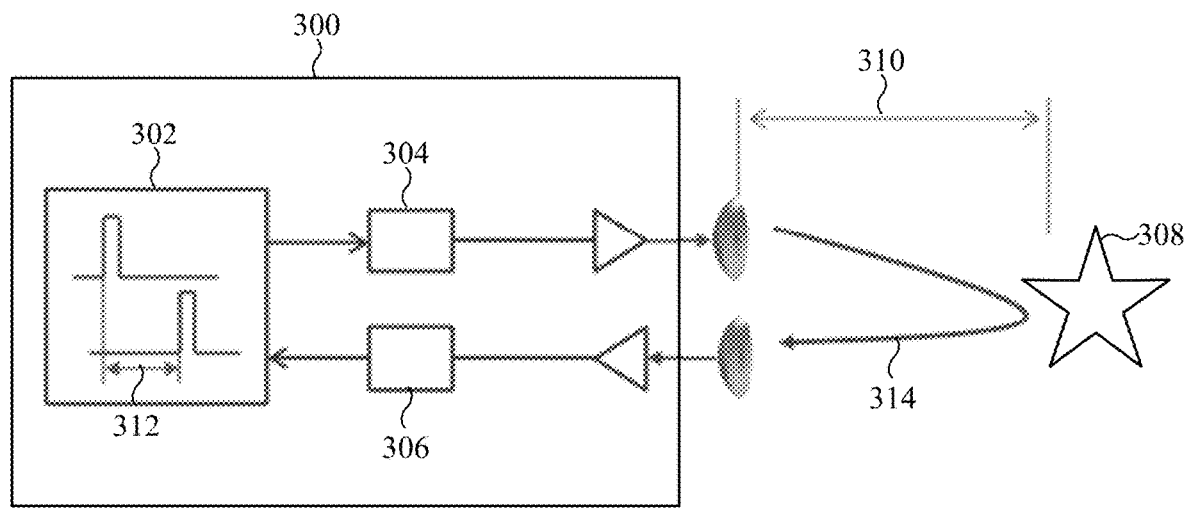
FIG. 3A illustrates an example architecture of a monostatic radar signal in accordance with an embodiment of this disclosure.
Figure 3B:
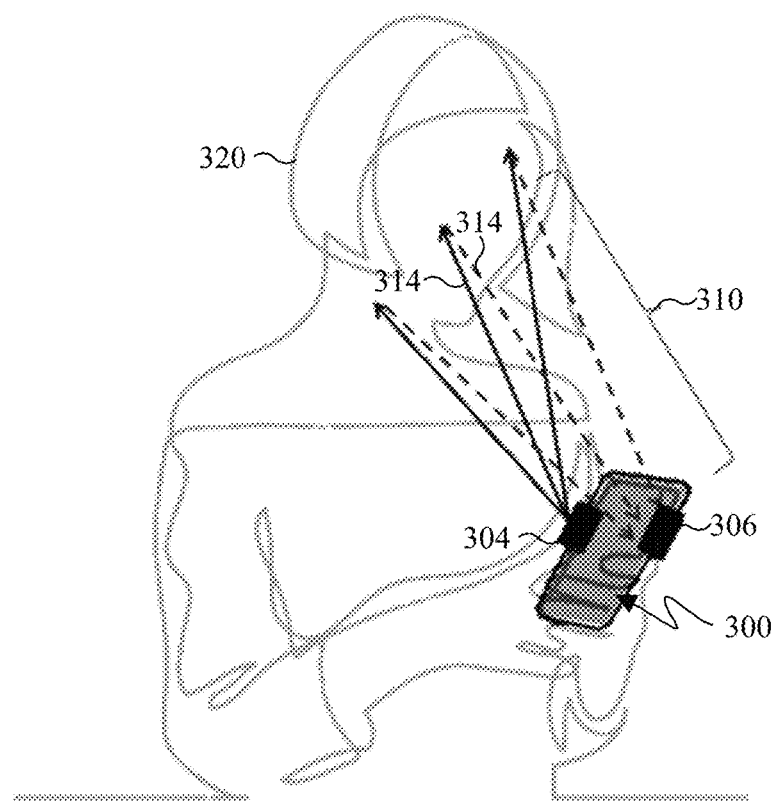
FIG. 3B illustrates an example of a radar based authentication of a user in accordance with an embodiment of this disclosure.
Figure 3C:
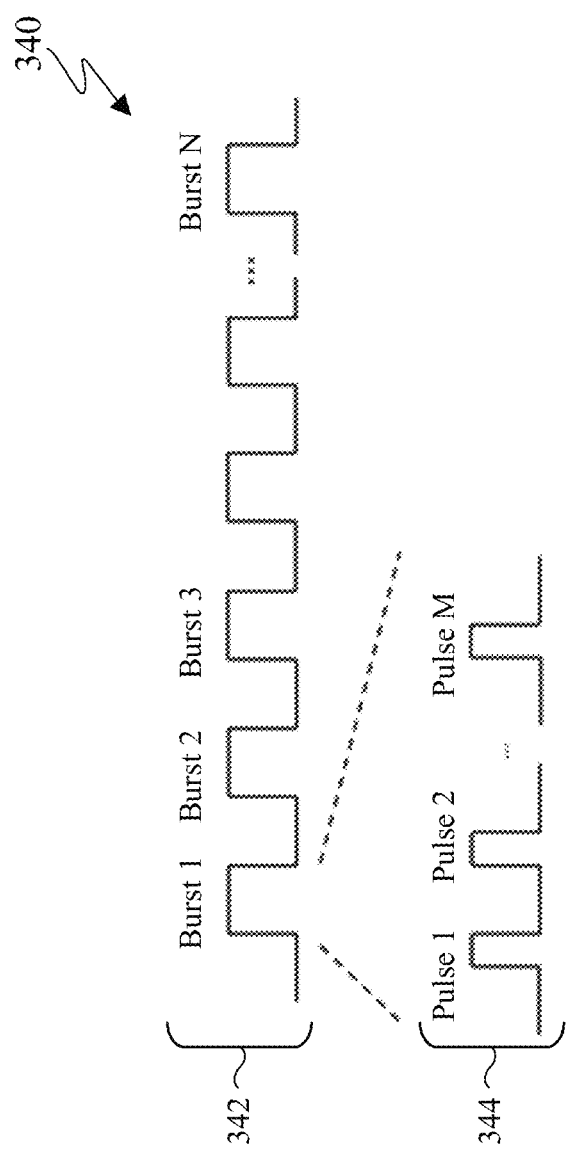
FIG. 3C illustrates an example frame structure in accordance with an embodiment of this disclosure.

FIG. 3A illustrates an example architecture of a monostatic radar signal in accordance with an embodiment of this disclosure. FIG. 3B illustrates an example of a radar based authentication of a user in accordance with an embodiment of this disclosure. FIG. 3C illustrates an example frame structure 340 in accordance with an embodiment of this disclosure. The embodiments of FIGS. 3A, 3B, and 3C are for illustration only and other embodiments could be used without departing from the scope of this disclosure.

FIGS. 3A and 3B illustrate an electronic device 300 that includes a processor 302, a transmitter 304, and a receiver 306. The electronic device 300 can be similar to any of the client devices 106-114 of FIG. 1, the server 104 of FIG. 1, or the electronic device 200 of FIG. 2. The processor 302 is similar to the processor 240 of FIG. 2. Additionally, the transmitter 304 and the receiver 306 can be included within the radar transceiver 270 of FIG. 2.

The transmitter 304 transmits a signal 314 to the target object 308. A target object 308 is located a distance 310 from the electronic device 300. In certain embodiments, the target object 308 of FIG. 3A is the user 320 of FIG. 3B when the electronic device 300 is performing biometric authentication. When the transmitter 304 transmits a signal 314, towards the target object 308, the signal 314 is reflected off of the target object 308 and received by the receiver 306. The signal 314 of FIG. 3B is a transmitted signal when it is a solid line and a reflected signal when it is a dashed line.

The processor 302 analyzes a time difference 312 from when the signal 314 is transmitted by the transmitter 304 and received by the receiver 306. It is noted that the time difference 312 is also referred to as a delay, as it indicates a delay between the transmitter 304 transmitting the signal 314 and the receiver 306 receiving the signal after is reflected or bounced off of the target object 308. Based on the time difference 312, the processor 302 derives the distance 310 between the electronic device 300, and the target object 308. When multiple signals, such as the signal 314 are transmitted and received, a mapping of the target object 308 can be derived by the processor 302. The mapping indicates a surface of the target object 308.

Monostatic radar is characterized for its delayed echo as the transmitter 304 of the radar signal and the receiver 306 of the radar signal essentially at the same location. In certain embodiments, the transmitter 304 and the receiver 306 are co-located either by using a common antenna or nearly co-located but use separate but adjacent antennas. Monostatic radars are assumed coherent such that the transmitter 304 and the receiver 306 are synchronized via a common time reference Pulse radar is generated as a realization of a desired radar waveform, modulated onto a radio carrier frequency, and transmitted through a power amplifier and antenna, such as a parabolic antenna. In certain embodiments, the antenna is omnidirectional. In other embodiments, the antenna is focused into a particular direction. When the target object 308 is within the field of view of the transmitted signal and within a distance 310 from the radar location, then the target object 308 will be illuminated by RF power density (W/m$^2$), $p_t$, for the duration of the transmission. Equation (1) describes the first order of the power density, $p_t$.

Referring to Equation (1), $P_T$ is the transmit power (W). $G_T$ describes the transmit antenna gain (dBi) and $A_T$ is an effective aperture area (m$^2$). A represents the wavelength of the radar signal RF carrier signal (m), and R corresponds to the distance 310 between the antenna and the target object 308. In certain embodiments, effects of atmospheric attenuation, multi-path propagation, antenna loss and the like are negligible, and therefore not addressed in Equation (1).

The transmit power density impinging onto the target object 308 surface can cause reflections depending on the material, composition, surface shape and dielectric behavior at the frequency of the radar signal. In certain embodiments, only direct reflections contribute to a detectable receive signal since off-direction scattered signals can be too weak to be received by at the radar receiver. The illuminated areas of the target with normal vectors pointing back at the receiver can act as transmit antenna apertures with directives (gains) in accordance with their effective aperture areas. Equation (2), below, describes the reflective back power.

$$P_{refl} = p_t A_t G_t \sim p_t A_t r_t \frac{A_t}{\lambda^2/4\pi} = p_t RSC \qquad \text{Equation (2)}$$

In Equation (2), $P_{refl}$ describes the effective isotropic target-reflected power (W). The term, $A_t$ described the effective target area normal to the radar direction (m$^2$). The term $r_t$ describes the reflectivity of the material and shape, which can range from [0, 1]. The term $g_t$ describes the corresponding aperture gain (dBi). RSC is the radar cross section (m$^2$) and is an equivalent area that scales proportional to the actual reflecting area-squared inversely proportional with the wavelength-squared and is reduced by various shape factors and the reflectivity of the material itself. Due to the material and shape dependency, it is difficult to deduce the actual physical area of a target from the reflected power, even if the distance 310 to the target object 308 is known.

The target reflected power at the receiver location results from the reflected power density at the reverse distance 310 collected over the receiver antenna aperture area. Equation (3), below, describes the received target reflected power. It is noted that $P_R$ is the received target reflected power (W) and $A_R$ is the receiver antenna effective aperture area (m$^2$). In certain embodiments, $A_R$ is the same as $A_t$.

$$P_R = \frac{P_{refl}}{4\pi R^2} A_R = P_T \cdot RSC \frac{A_T A_R}{4\pi \lambda^2 R^4} \qquad \text{Equation (3)}$$

A radar system can be used as long as the receiver signal exhibits sufficient signal-to-noise ratio (SNR). The value of SNR depends on the waveform and detection method. Equation (4), below, describes the SNR. It is noted that kT is the Boltzmann constraint multiplied by the current temperature. B is the radar signal bandwidth (Hz). F is the receiver noise factor which is a degradation of the receive signal SNR due to noise contributions of the receiver circuit itself.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \qquad \text{Equation (1)}$$

$$SNR = \frac{P_R}{kT \cdot B \cdot F} \qquad \text{Equation (4)}$$

When the radar signal is a short pulse of duration or width, $T_p$, the delay or time difference 312 between the transmission and reception of the corresponding echo is described in Equation (5). τ corresponds to the delay between the transmission and reception of the corresponding echo and equal to Equation (5). c is the speed of light propagation in the air. When there are multiple targets at different distances, individual echoes can be distinguished only if the delays differ by at least one pulse width. As such, the range resolution of the radar is described in Equation (6). A rectangular pulse of a duration $T_P$ exhibits a power spectral density as described in Equation (7) and includes a first null at its bandwidth as shown in Equation (8). The range resolution of a radar signal fundamental connected with the bandwidth of the radar waveform is expressed in Equation (9).

$\tau = 2R/c$　　　　　　　　　　　　　　　Equation (5)

$\Delta R = c\Delta\tau/2 = cT_P/2$　　　　　　　　　　Equation (6)

$P(f) \sim (\sin(\pi f T_p)/(\pi f T_p))^2$　　　　　　　Equation (7)

$B = 1/T_p$　　　　　　　　　　　　　　Equation (8)

$\Delta R = c/2B$　　　　　　　　　　　　　Equation (9)

Depending on the radar type, various forms of radar signals exist. One example is a Complex Impulse Response (CIR). CIR measures the reflected signals (echoes) from potential targets as a function of distance at the receive antenna module, such as the radar transceiver 270 of FIG. 2. In certain embodiments, CIR measurements are collected from transmitter and receiver antenna configurations which when combined can produce a multidimensional image of the surrounding environment. The different dimensions can include the azimuth, elevation, range, and Doppler.

The example frame structure 340 of FIG. 3C illustrates a frame with multiple bursts 342. For example, the example frame structure 340 includes burst 1, burst 2, burst 3, through bust N. Each bust includes multiple pulses 344, such as pulse 1, pulse 2 through pulse M. In certain embodiments, different transmit and receive antenna configurations activate for each pulse or each burst. In certain embodiments, different transmit or receive antenna configurations activate for each pulse or each burst. It is noted that although the example frame structure 340 illustrates only one burst type, multiple burst types can be defined in the same frame, where each burst type includes a different antenna configuration.

Raw radar measurement can be based on a pulse compression radar signal. For example, the frame structure 340 can represent an example timing diagram of a radar measurement. Time is divided into multiple frames, and each frame is further divided into bursts 342. Several pulses 344 are transmitted by the radar transmitter in each burst 342. In certain embodiments, each pulse or burst may have a different transmit/receive antenna configuration corresponding to the active set of antenna elements and corresponding beamforming weights. For example, each of the M pulses in a burst has a different transmit and receive antenna pair, and each of the bursts 342 all repeat the same pulses. As such, all of the signals from all the pulses within a burst provide a complete scan of the radar field of view, and the repetitions across the bursts provide a way to capture the temporal variation. The temporal variation can be considered Doppler information. The example frame structure 340 illustrates uniform spacing between pulses and bursts. In certain embodiments, any the spacing, even non-uniform spacing, between pulses and bursts can be used.

An example radar measurement may be a three-dimensional (3D) CIR matrix. The first dimension corresponds to the burst index, the second dimension corresponds to the pulse index, and the third dimension corresponds to the delay tap index. The delay tap index can be translated to the measurement of range or equivalently the flight time received signal (the time duration between transmitting and receiving the signal).

Although FIGS. 3A, 3B, and 3C illustrate electronic device 300 and radar signals various changes can be made to FIGS. 3A, 3B, and 3C. For example, different antenna configurations can be activated. FIGS. 3A, 3B, and 3C do not limit this disclosure to any particular radar system or apparatus.

Figure 4A:
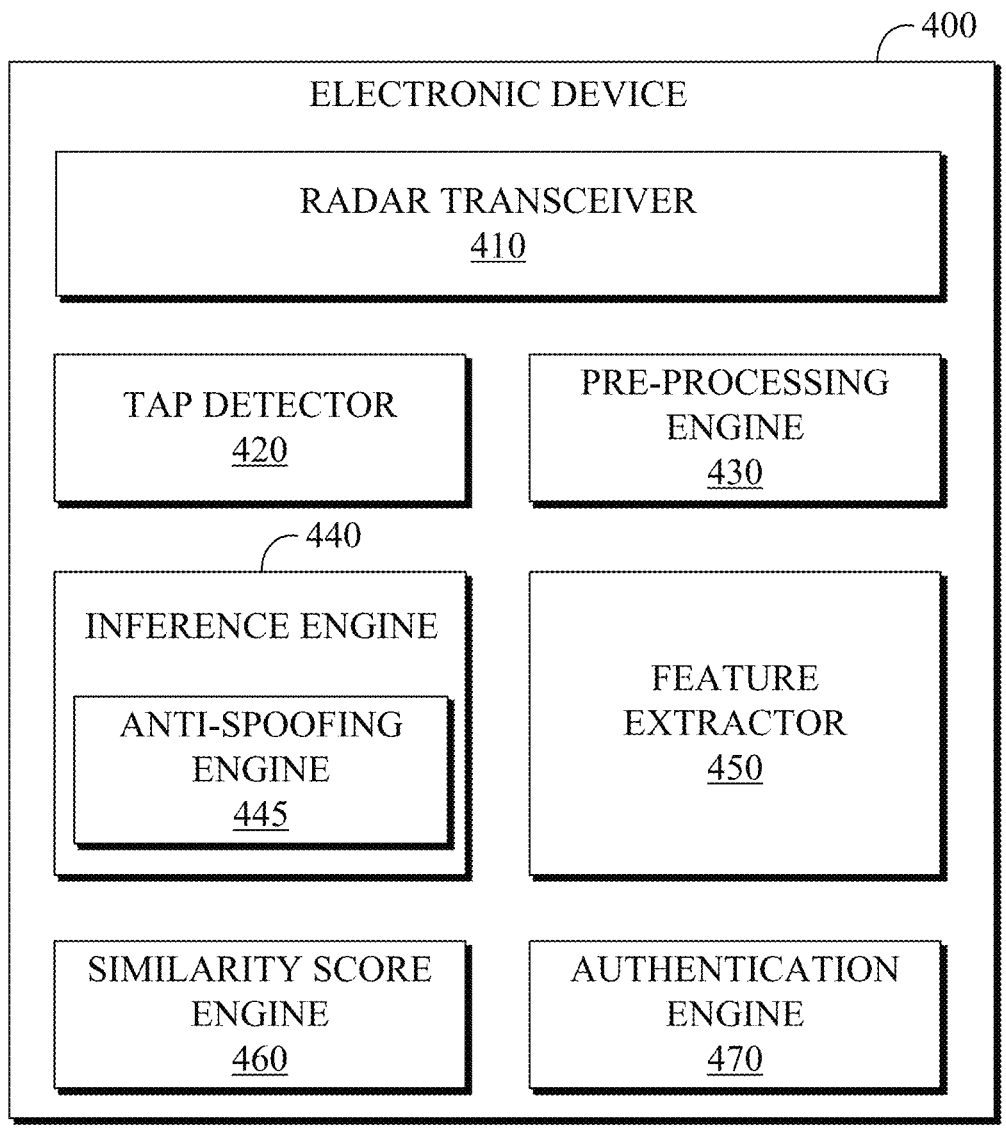
FIG. 4A illustrates a block diagram of an electronic device for radar based authentication in accordance with an embodiment of this disclosure.
Figure 4B:
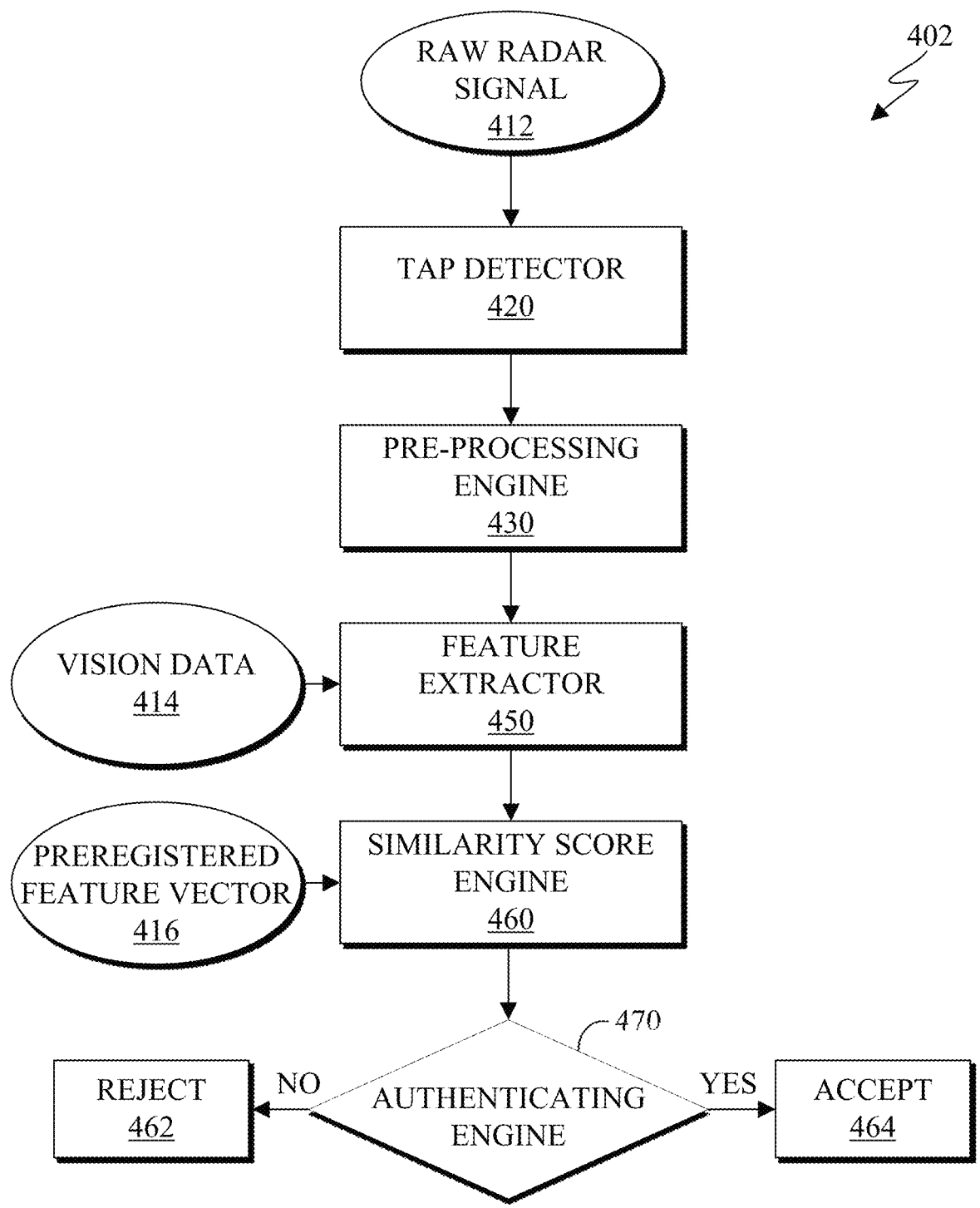
FIGS. 4B and 4C illustrate flowcharts for radar based authentication in accordance with an embodiment of this disclosure.
Figure 4C:
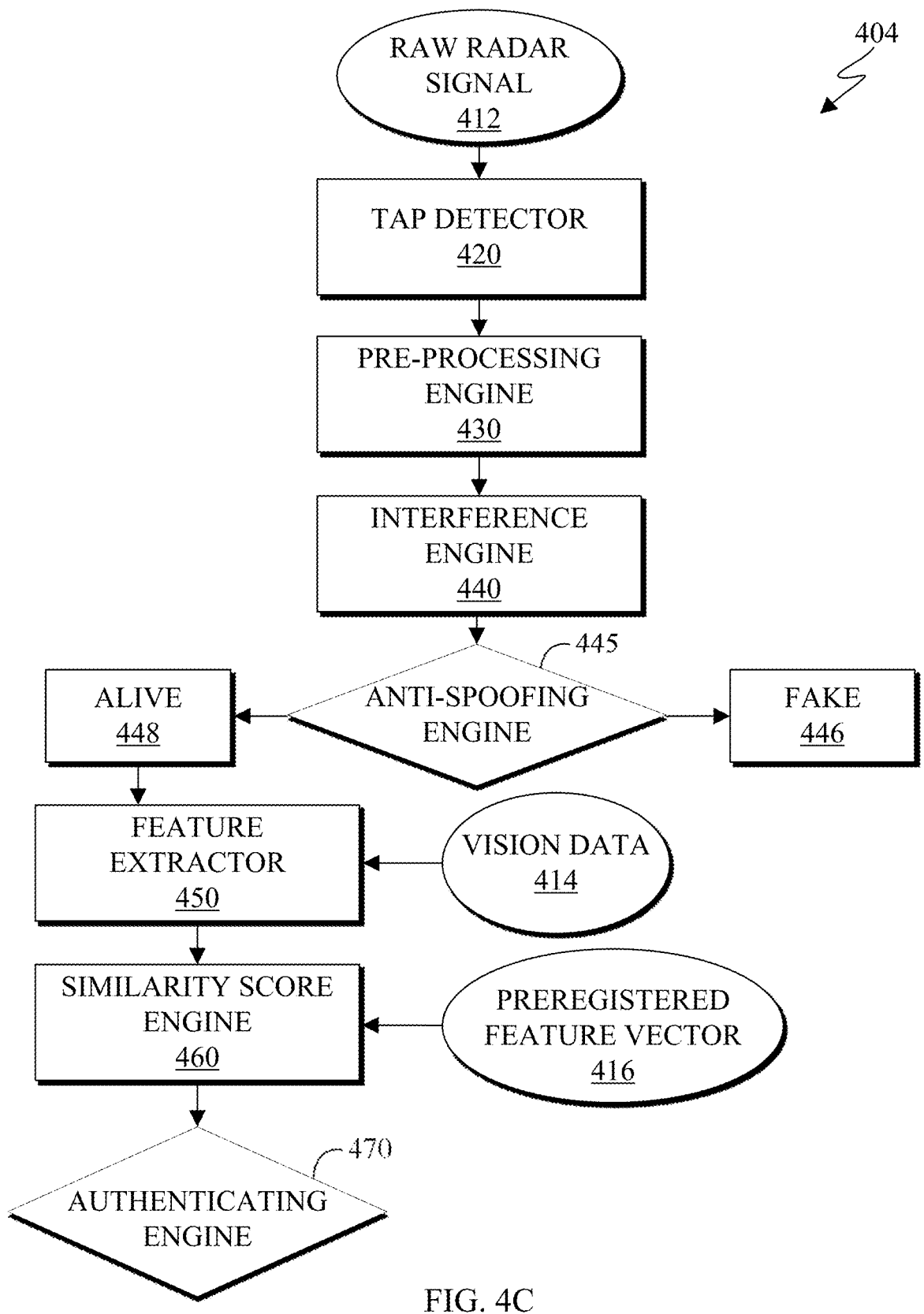

FIG. 4A illustrates a block diagram of an electronic device 400, in accordance with an embodiment of this disclosure. FIGS. 4B and 4C illustrate flowcharts 402 and 404, respectively, for radar based authentication in accordance with an embodiment of this disclosure. As shown in the flowchart 402 anti-spoofing is not performed. As shown in the flowchart 404 anti-spoofing is performed. FIGS. 5A-10 illustrates further examples, of the various components for radar based authentication in accordance with an embodiment of this disclosure. The embodiments of the electronic device 400, the flowchart 402, and the flowchart 404, as shown in FIGS. 4A, 4B and 4C and the components thereof, as shown in FIGS. 5A-10, are for illustration only. Other embodiments can be used without departing from the scope of the present disclosure.

The electronic device 400 can be configured similar to any one of the client device 106-114 of FIG. 1, the server 104 of FIG. 1, the electronic device 300 of FIGS. 3A and 3B, and can include internal components similar to that of electronic device 200 of FIG. 2. As shown, the electronic device 400 includes a radar transceiver 410, a tap detector 420, a pre-processing engine 430, an inference engine 440, a feature extractor 450, a similarity score engine 460, and an authentication engine 470. In certain embodiments, the electronic device 400 can include additional components that are not shown in FIG. 4A or include less components than shown in FIG. 4A. For example, the inference engine 440 can be omitted from the electronic device 400. In certain embodiments, the tap detector 420, the pre-processing engine 430, the inference engine 440, the feature extractor 450, the similarity score engine 460, and the authentication engine 470 represent a single processor or a combination of processors, similar to the processor 240 of FIG. 2 and the processor 302 of FIG. 3.

The electronic device 400 and the flowcharts 402 and 404 and the descriptions thereof describe embodiments of biometrically authenticating a user by comparing feature vectors generated by radar signals reflecting off of user to previously registered feature vectors of the user. For example, the flowcharts 402 and 404 describe the process of authenticating a user based on the raw radar signals that the radar transceiver 410 transmits and receives.

The radar transceiver 410 can be similar to the radar transceiver 270 of FIG. 2 and include the transmitter 304 and the receiver 306 of FIGS. 3A and 3B. The radar transceiver 410 can include an antenna array. The radar transceiver 410 generates a radar signal similar to the signal 314 of FIGS. 3A and 3B. The radar signal generated by the radar transceiver 410 can have a frame structure similar to the example frame structure 340 of FIG. 3C. The signals emitted from the radar transceiver 410 are not within the visible spectrum of light and therefore are not observable by the user. After transmitting radar signals, the radar transceiver 410 receives raw radar signals 412 that are reflected off of a target object. The raw radar signals 412 are used for authenticating a user.

For example, the radar transceiver 410 transmits and receives numerous radar signals, similar to the signal 314 of FIGS. 3A and 3B using different antenna configurations. Based on the time difference between sending and receiving numerous signals, a processor, such as the processor 302 of FIG. 3 can map out the different depths of the face of the user. The radar transceiver 410 can extract a reflection signature, from the signals that are transmitted towards the user, reflected off of the users face, and detected by the receiver. In certain embodiments, if the user is wearing a mask, the radar signals, emitted and received by the radar transceiver 410, can pass through the mask and reflect off the face of the user providing the raw radar signals 412, corresponding to the user wearing the mask.

As illustrated in the flowcharts 402 and 404, the tap detector 420 receives the raw radar signals 412. The tap detector 420 identifies the signals of interest from the raw radar signals 412. For example, the tap detector 420 identifies the radar signals that include the biometric information of the user from the whole radar signal. To identify the signals of interest, the tap detector 420 first collects the raw radar signals 412 from the different antenna configurations (such as different pulses) and then combines the raw signals in order to identify the signals of interest.

In certain embodiments, the tap detector 420 combines the raw radar signals into a one dimensional signal and then identifies the signals of interest (region of interest) from the combined signals. In certain embodiments, the tap detector 420 combines the raw radar signals into a multi-dimensional signal and then identifies the signals of interest from the combined signals. After the raw radar signals are combined, the tap detector 420 uses a rise in CIR to identify and then select the signals of interest. FIGS. 5A through 5K describe identifying the signals of interest in greater detail below.

The pre-processing engine 430 then processes the signals of interest to produce an input for the inference engine 440 or the feature extractor 450. The pre-processing engine 430 reshapes the input, standardizes the reshaped input, and then normalizes the input. In certain embodiments, the pre-processing engine 430 reshapes the input and standardizes the reshaped input, but does not normalize the input. In certain embodiments, the pre-processing engine 430 reshapes the input and does not standardize or normalize the input.

A radar signal can be represented as complex number, such as a+bi, where 'a' is the real portion and 'b' is the imaginary portion of the radar signal. The magnitude (m) of the radar signal is described in Equation (10) and the phase ($\varphi$) of the radar signal is described in Equations (11).

$$m = \sqrt{a^2 + b^2} \qquad \text{Equation (10)}$$

$$\varphi = \arctan\left(\frac{b}{a}\right) \qquad \text{Equation (11)}$$

In certain embodiments, a frame of the raw radar signal input is represented by a shape described in two dimensions. For example, the raw radar signal that is received by the pre-processing engine 430 can have the shape of [number of bursts*number of antenna pairs×number of taps]–2 dimensions. The pre-processing engine 430 modifies and reshapes the received raw radar signal into the shape of [number of bursts*number of antenna pairs×number of taps]–3 dimensions. From this radar signal the real part, imaginary part, magnitude, and phase can be identified and stacked together along the third dimension to form the final shape of the radar input. In certain embodiments, the shape of the radar input is [number of bursts×number of antenna pairs×(number of taps*number of values)]–3 dimensions. Where, the number of values can one or more of (i) the real part of the value (a), (ii) the imaginary part of the value (b), (iii) the magnitude of the value (m) (as described in Equation (10)), or (iv) the phase of the value ($\varphi$) (as described in Equation (10)). For example, the radar input shape can be [10 bursts×10 antenna pairs×(6 taps*3)], where three represents the real part, the imaginary part and the magnitude of the value.

In certain embodiments, after reshaping the input, the pre-processing engine 430 standardizes the input along the first dimension (the burst dimension). The pre-processing engine 430 standardizes the input along the first dimension as described by Equation (12). In Equation (12), 'z' is the new value, 'x' is the current value, 'm' is the mean and 'S' is the standard deviation along the first dimension. That is, each frame can be used to generate one mean and one standard deviation along the burst dimension and are used later for standardization. In certain embodiments, the input is standardized along the second dimension and third dimension (corresponding to the antenna and tap dimension), based on Equation (12).

$$z = \frac{x - m}{S} \qquad \text{Equation (12)}$$

After standardizing the input, the pre-processing engine 430 can normalize the input. In certain embodiments, the pre-processing engine 430 uses Sigmoid Function, described in Equation (13), below, to normalize the input. For example, using Equation (13) the pre-processing engine 430 normalizes the input such that the radar signal value is in the (0,1) range. In certain embodiments, the pre-processing engine 430 uses Tan H function, described in as Equation (14), below, to normalize the input. For example, using Equation (14) the pre-processing engine 430 normalizes the input such that the value is in the (−1,1) range. In certain embodiments, the pre-processing engine 430 uses a combination of the Sigmoid Function and the Tan H function. For example, the pre-processing engine 430 uses the Sigmoid Function, described in as Equation (13) to normalize the real, imaginary, and magnitude values, and the Tan H function, described in as Equation (14), to normalize the phase.

$$S(x) = \frac{1}{1 + e^{-x}} \qquad \text{Equation (13)}$$

$$f(x) = \tanh(x) = \frac{e^x - e^{-x}}{e^x + e^{-x}} \qquad \text{Equation (14)}$$

In certain embodiments, the pre-processing engine 430 uses differentiation on the tap dimension to improve the signature visibility of the radar signal. Equation (15) below describes the differentiation on the tap dimension.

$$X_i = x(t_{i+1}) - x(t_i), \text{ where } 0 \leq i \leq n-1 \qquad \text{Equation (15)}$$

In certain embodiments, the pre-processing engine 430 one or more of the following equations as input parameters to the feature extractor 450. Equation (16) describes $t_i$ in the delay domain (dap). Equations (17) and (18) are different magnitude differentiations.

$$\text{Angle }(x(t_{i+1}) * conj(x(t_i))) \quad \text{Equation (15)}$$

$$|x(t_{i+1})| - |x(t_i)| \quad \text{Equation (16)}$$

$$\frac{|x(t_{i+1})|}{|x(t_i)|} \quad \text{Equation (17)}$$

In certain embodiments, the selected tap index information generated from the tap detector 420 can also be input to the feature extractor 450. In certain embodiments, the range information generated from proximity sensing can also be input to the feature extractor 450. The selected tap index (a kind of range information) or the range information generated by proximity provides context for the extracted features and helps the feature extractor 450 adaptively function with respect to different ranges.

In certain embodiments, the pre-processing engine 430 generates an input for the feature extractor 450, as shown in the flowchart 402. That is, in certain embodiments, the inference engine 440 is not included in the electronic device, such that anti-spoofing is not performed. In certain embodiments, the pre-processing engine 430 generates an input for the inference engine 440, as shown in the flowchart 404. In certain embodiments, the pre-processing engine 430 generates one input that can be used by the inference engine 440 and the feature extractor 450.

The inference engine 440 includes an anti-spoofing engine 445. The inference engine 440 and the anti-spoofing engine 445 identify the authenticity of the biometric samples included in the input generated by the pre-processing engine 430. The inference engine 440 and the anti-spoofing engine 445 identify whether the source of the biometric sample is a live human or a fake representation. A fake representation can include a person wearing a mask imitating the physical appearance of the authorized user.

In certain embodiments, the radar signals can be used to generate a 3D tensor. The 3D tensor is composed of the depth information and angle information in the azimuth and elevation. In certain embodiments, a 3D tensor is generated by applying a beamforming method at each delay tap. Example beamforming methods include the maximum ratio combining (MRC), the Capon beamforming, and the zero-forcing beamforming (and its variance such as the minimum mean squared error beamforming). Applying the beamforming for each delay tap generates a 3D tensor where each pixel has a coordinate defined by the delay (i.e., the depth), the azimuth, and the elevation angle. The pixels can contain the amplitude of the resulting complex numbers after the beamforming or some further processing could be applied. For example, a constant false alarm rate (CFAR) detection can be applied on the pixels that are produced after the beamforming. Applying a CFAR detection reduces clutter, noise, or both. After CFAR detection, the amplitude of the pixel could be used directly. Alternatively, if a binary input is desirable, a threshold is be applied to each pixel, where if the pixel is larger than the threshold, the value of the pixel will be set to one and if the pixel is smaller than or equal to the threshold, the value of the pixel will be set to zero.

The 3D tensor can be used as an input to a machine learning model (similar to those described in greater detail below) that can learn to predict whether the biometric source is a live or a reproduction (fake). The characteristics of the input can indicate whether the target object, corresponding to the biometric source, is a live source or a reproduction of the biometric source, such as a picture based on the depth. For example, the depth of a live source of a live source is higher in value than that of a picture. FIG. 7G, described in greater detail below, illustrates an example diagram of the electronic device determining whether the target object is alive or fake based on the depth Additionally, in certain embodiments, a Siamese Neural Network (SNN) can be trained to distinguish a specific person from his/her reproduced biometric representation such as pictures, mask, etc., by using radar signals only. Unlike regular Neural Network architecture, SNN is designed to predict the similarity between two different inputs. Therefore, using this special architecture enables the system to adapt and generalize to work well on all devices without the need to retrain the predictive model for each specific device.

If the biometric source passes the anti-spoofing test, the next module in the pipeline will be activated to perform the authentication. Otherwise, the biometric source is rejected and classified as a fake representation.

In addition to the radar signals that capture the biometric information of the user, the inference engine 440 also uses the radar signals the main biometric input for anti-spoofing. Radar signals captured from a live human source as compared to the signals captured from a fake representation of an authorized user contain characteristics that can be differentiated from each other. Radio frequency based liveness detection increases the security of biometric authentication. For example, vision based authentication systems compare the preregistered images of the authorized user to the visual appearance of a person requesting for authorization to access the electronic device. The inference engine 440 can compare the received radar signals to the radar signals of preregistered user to identify whether the material both sets of radar signals are reflected off of is similar. The inference engine 440 can also identify, via the received radar signals, whether the radar signals are reflected off of skin, a photograph, or a screen. Based on the material that reflects the radar signals back to the radar transceiver 410, the inference engine 440 identifies if the target object, which reflected the radar signals, is a fake representation of the user.

The inference engine 440 generates a set of probabilities for determining the authenticity of the biometric samples. Based on the probabilities generated by the inference engine 440, the anti-spoofing engine 445 classifies whether the source is alike or fake. FIGS. 7A-7D, described below, illustrates example processes of the inference engine 440. FIG. 7E, described below, illustrates an example method for detecting whether the target object is a fake representation of the user. FIG. 7F, described below, illustrates an example process of the anti-spoofing engine 445.

The feature extractor 450 extracts feature vectors from the radar signal input, generated by the pre-processing engine 430. In certain embodiments, the feature extractor 450 extracts feature vectors from the radar signal input after the inference engine 440 identifies whether the source of the biometric information is alive. In certain embodiments, the feature extractor 450, using one or more machine learning techniques, such as a neural network, to extract feature vectors from the input. FIGS. 8A-8D, described in greater detail below, illustrate various embodiments of the feature extractor 450.

In certain embodiments, the feature extractor 450 receives vision data 414. The vision data 414 is a photographic image of a user that is captured by a camera associated with the electronic device 400. The vision data 414 can provide additional information that the feature extract can use when generating feature vectors.

In certain embodiments, the feature extractor 450 is a neural network. For example, the neural network can be a SNN and use a loss function, such as a Constructive Loss function or a Triplet Loss function.

A neural network is a combination of hardware and software that is patterned after the operations of neurons in a human brain. Neural networks can be a standalone system, external to the electronic device 400, or included in the electronic device 400. Neural networks solve and extract information from complex signal processing, pattern recognition, or pattern production. Pattern recognition includes the recognition of objects that are seen, heard, felt, and the like.

A neural network can have a parallel architecture. Information that is represented, processed, and stored by a neural network can vary. The inputs to a neural network are processed as patterns that are distributed over discrete processing elements, rather than binary numbers. Structurally, a neural network involves a large number of processors that operate in parallel and are arranged in tiers. For example, the first tier receives raw input information, and each successive tier receives the output from the preceding tier. Each tier is highly interconnected such that each node in tier n can be connected to multiple nodes in tier n−1 (such as the nodes inputs) and in tier n+1 that provides input for those nodes. Each processing node includes a set of rules that it was originally given or developed for itself over time.

A convolutional neural network (CNN) is a class of artificial neural networks. A CNN includes an input layer and an output layer, as well as multiple hidden layers. Each hidden layer of a CNN can include one or more pooling layers, one or more normalization layers, one or more fully connected (dense) layers, and one or more convolution layers. The pooling layers combine the outputs of neuron clusters at one layer into a single neuron for the next sequential layer. For example, if the pooling layer is a maximum pooling layer, the pooling layer identifies a maximum value from each cluster of neurons at a prior layer and provides the identified maximum values to the next layer. In another example, if the pooling layer is an average pooling layer, the pooling layer identifies the average value from each cluster of neurons of the prior layer and provides the identified average values to the next layer. Pooling layers can be local pooling layers, global pooling layers, or a combination thereof. Normalization layers normalize the outputs from one layer and input the normalized values into the next layer. Fully-connected layers of a CNN connect neurons in one layer to neurons in another layer. In some embodiments, the fully-connected layers can connect every neuron in one layer to every neuron in another layer.

Convolution layers account for a large percentage of the computations of a neural network. A convolution layer applies a convolution operation to its input in order to generate a result. The result is then passed to the next layer for another convolution operation. The convolution process imitates the response of an individual neuron of a human to visual stimuli. For example, each convolutional neuron can process data only for its respective field.

A neural network can be initially trained. Training typically involves providing a specific input to the neural network and instructing the neural network what output is expected. As a particular example, a neural network can be trained to identify when a user interface object is to be modified. For instance, a neural network can receive initial inputs, such as data from observable features. By providing the initial answers, the training allows a neural network to adjust how the neural network internally weighs a particular decision to perform a given task. In some embodiments, the neural network can also receive feedback data. Feedback data allows a neural network to improve various decisions and weighing processes of subsequent tasks by removing false positives which can increase the accuracy and efficiency of each decision. As a result, neural networks are adaptable such that a neural network can modify its outputs based on the initial training and feedback data.

A learning algorithm can be used to train a neural network to provide particular results. For the learning algorithm to effectively train a neural network the input signals to a neural network should be pre-processed and relevant to the particular learning algorithm. The learning algorithm uses training data to train the feature extractor 450 to perform and accomplish a particular task, such as extract feature vectors from the input generated by the pre-processing engine 430 that useful in authenticating the user. Examples of learning algorithms include machine learning, statistical learning, and the like. FIGS. 9A-9H, described in greater detail below, illustrate various embodiments for training the feature extractor 450.

Figure 10:
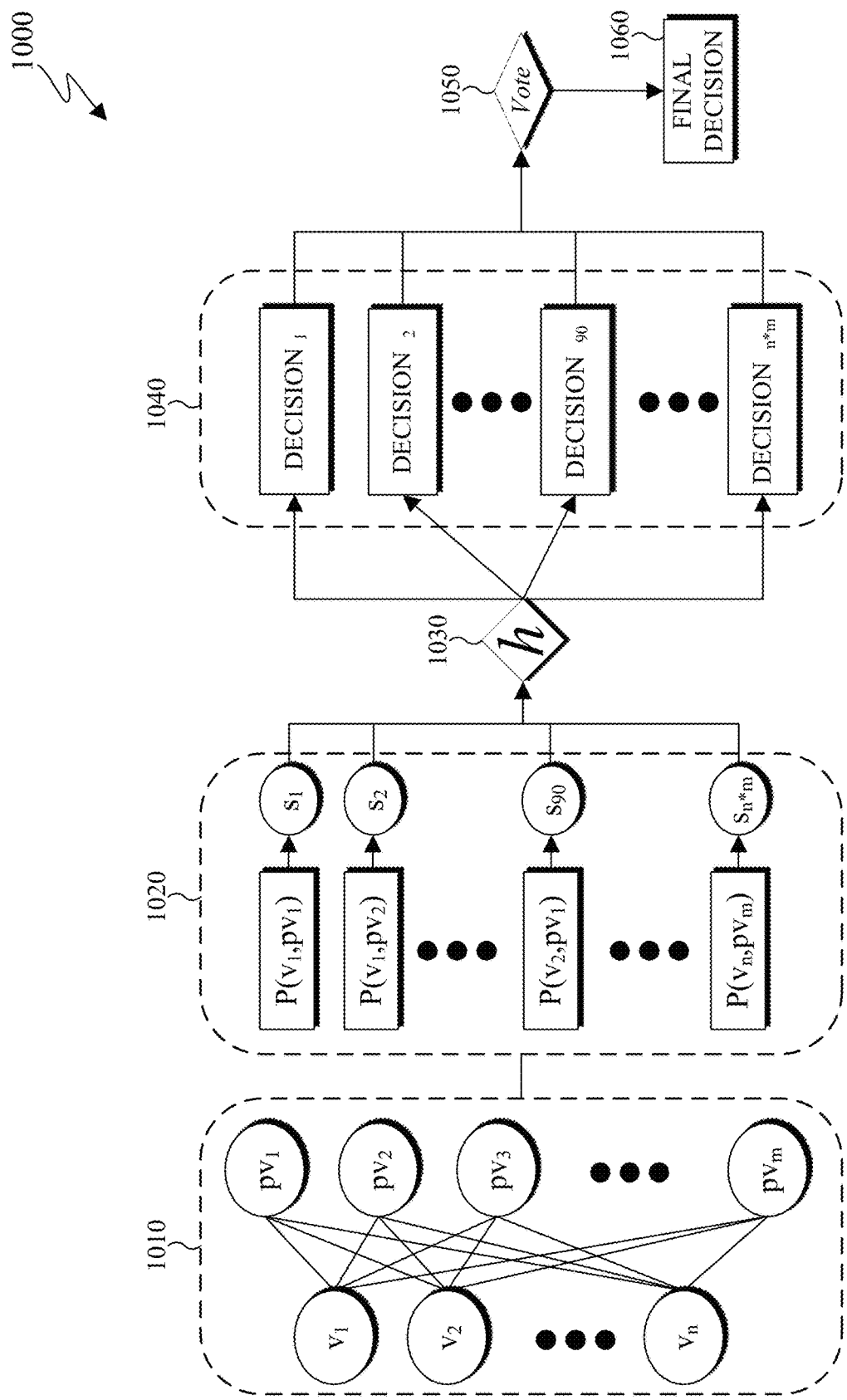
FIG. 10 illustrates a block diagram for authenticating a user in accordance with an embodiment of this disclosure.

After the feature vectors are extracted, via the feature extractor 450, the similarity score engine 460 compares two feature vectors (a feature vector extracted from the received radar signals and a preregistered feature vector 416 that is associated with the preregistered user data) and generates a similarity score. FIG. 10, described in greater detail below, describes generating the feature vector pairs and generating a similarity score.

In certain embodiments, the similarity score engine 460 generates multiple feature vector pairs. A feature vector pair includes a feature vector that is extracted from the input, and based on the received radar signals, while the other feature vector is from a preregistered feature vector 416 that is generated from the registered biometric data of an authorized user. The preregistered user data is created when the user registers their particular biometric radar signature with the electronic device 400. The preregistered feature vectors 416 can be extracted by the feature extractor 450 from the preregistered user data. For example, the feature extractor 450 can generate the preregistered feature vectors 416 from an input based on a set of ground truth radar signals during the initial set up of the authentication system. The preregistered user data along with the preregistered feature vectors 416 can be stored in memory of the electronic device 400. In certain embodiments, the similarity score engine 460 ensures that number of feature vector pairs is odd, in order to avoid a deadlock during the authentication process.

The similarity score engine 460 then generates a similarity score for each feature vector pair. For example, the similarity score engine 460 compares the two feature vectors of a single feature vector pair. In certain embodiments, the similarity score engine 460 can generate a score based on how similar one feature vector is (such as the feature vector generated from the received radar signals 412) to the other feature vector (such as one of the preregistered feature vector 416) within a feature vector pair. In certain embodiments, the similarity score engine 460 can generate a score based on how different (or distant) one feature vector is to the other feature vector within a feature vector pair.

When the similarity score represents the distance between the feature vector of the received radar signals and from the preregistered feature vectors 416, the similarity score engine 460 identifies the Euclidian distance between the two feature vectors. Equation (18) describes the Euclidian distance between the two feature vectors. The similarity score engine 460 then converts the identified distance, to generate a similarity score. For example, Equation (19) describes how the similarity score engine 460, converts the identified distance, to a similarity score. The generated similarity score is in the range of [0,1]. A similarity score is 1 indicates that the feature vectors are identical, while the similarity score of 0 indicates that the feature vectors are completely different. A similarity score between 0 and 1 indicates how close or how distant the two feature vectors are from each other.

$$d(a, b) = \sqrt{\sum_{i=1}^{n} (a_i - b_i)^2} \quad \text{Equation (18)}$$

$$es = \frac{1}{1 + d(a, b)} \quad \text{Equation (19)}$$

When the similarity the score represents the similarity between the feature vector of the received radar signals and from the preregistered feature vectors 416, the similarity score engine 460 identifies the cosine similarity between the two feature vectors. Equation (20) describes the cosine similarity between the two feature vectors. The similarity score engine 460 then converts the identified similarity, to generate an angular distance. For example, Equation (21) describes how the similarity score engine 460, converts the identified similarity, to the angular distance. One minus the angular distance of Equation (21), yields the angular similarity. The angular similarity is in the range of [0,1]. A similarity score is 1 indicates that the feature vectors are identical, while the similarity score of 0 indicates that the feature vectors are completely different. A similarity score between 0 and 1 indicates how close or how distant the two feature vectors are from each other.

$$cs = \frac{a \cdot b}{\max\|a\|_2 \cdot \|b\|_2, \epsilon} \quad \text{Equation (20)}$$

$$ed = \frac{\cos^{-1}(cs)}{\pi} \quad \text{Equation (21)}$$

The authentication engine 470 determines whether to authenticate the user. In certain embodiments, the authentication engine 470 determines whether to authenticate the user based on the multiple similarity scores generated by the similarity score engine 460.

The authenticating engine determines whether a similarity score for a vector pair is above or below a threshold, and assigns a decision accordingly. For example, if the similarity score for a vector pair is above the threshold, then the authentication engine 470 assigns a first decision to that vector pair. Alternatively, if the similarity score for that vector pair is below the threshold, the authentication engine 470 assigns another decision to that vector pair. The authentication engine 470 assigns a decision for each similarity score.

In certain embodiments, the threshold is a fixed value. In certain embodiments, the threshold is adaptive and changes during the authentication process. For example, when the threshold is adaptive, the information used to adjust the threshold is collected from the user and updated. The threshold, denoted as "h," can be updated based on Equation (22). Equation (22) describes that a new threshold, $h_{new}$, is based on the old threshold, $h_{old}$, plus the expression "1," where "1" corresponds to a step size constant that can be a small number less than 1, and "y" corresponds to the ground truth decision.

For instance, if the final decision rejects user (such that the user is not authenticated) the user can be promoted to manually enter one or more credentials to obtain access to the electronic device or data. The threshold can be updated based on the user entering a valid credential, which would indicate that the authentication engine 470 incorrectly rejected the user.

$$h_{new} = h_{old} + l * \left( \frac{\sum_{i=1}^{n} s_i}{n} - y \right) \quad \text{Equation (22)}$$

In certain embodiments, the authentication engine 470 stores a list of ground truth feature vectors for authentication purpose. At first, the list contains some feature vectors that were generated from registered biometric radar signal but over time this list grows with new feature vectors added. Within a short period of time (milliseconds) after the user entered the credentials (such as a PIN number) and the credentials are authenticated, the biometric radar signal of the user will be collected. These collected biometric radar data is paired with the registered biometric radar and paired with each other to generate similarity scores. If the similarity scores are high enough, the collected biometric radar signal will be added to the list. Old feature vectors will be replaced by newer feature vectors as the list approaches a predefined size limit.

The authentication engine 470 then determines which decision (based on comparing the similarity scores to the threshold, h) occurred more often and makes a final decision. The final decision either accepts 464 the user or rejects 462 the user. When the user is accepted 464, the user is authorized and granted access to the requested content. Alternatively, when the user is rejected 462 the user is not granted access to the requested content. For example, if there are more decisions that indicate the user is to be authenticated, then the authentication engine 470 generates a final decision to authenticate the user. However, if there are more decisions that indicate the user is not to be authenticated, then the authentication engine 470 generates a final decision to not authenticate the user. In certain embodiments, the authentication engine 470 determines to authenticate the user based on the decisions of comparing the similarity scores to the threshold, h, and the output of the inference engine 440. FIG. 10, described in greater detail below, describes authenticating the user based on the similarity scores.

Although FIGS. 4A, 4B, and 4C illustrate one example of electronic device 400, its internal components and the flowcharts 402 and 404 for authenticating a user, various changes can be made to FIGS. 4A, 4B, and 4C. For example, various components in FIG. 4A can be combined, further subdivided, or omitted and additional components can be added according to particular needs. For example, the inference engine 440 can be omitted. In another example, a neural network can be included in the electronic device 400.

Figure 5A:
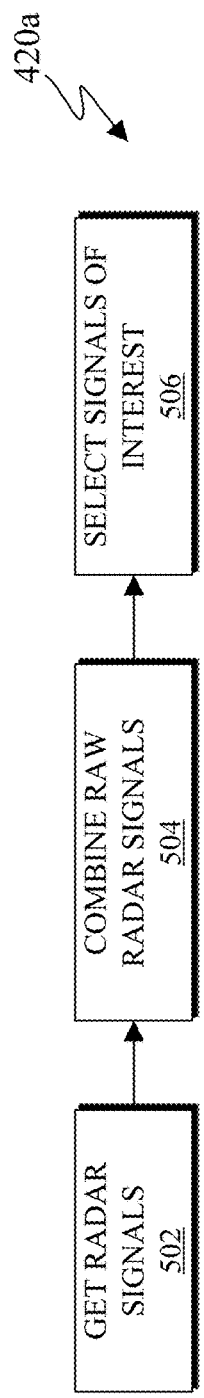
FIG. 5A illustrates an example method for identifying signals of interest in accordance with an embodiment of this disclosure.
Figure 5B:
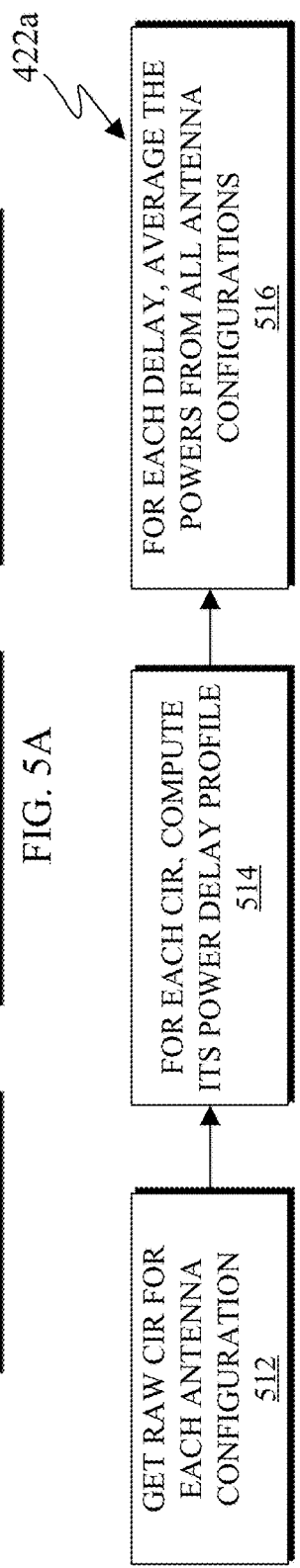
FIGS. 5B, 5C, and 5D illustrate an example method for combining radar signals in accordance with an embodiment of this disclosure.
Figure 5C:
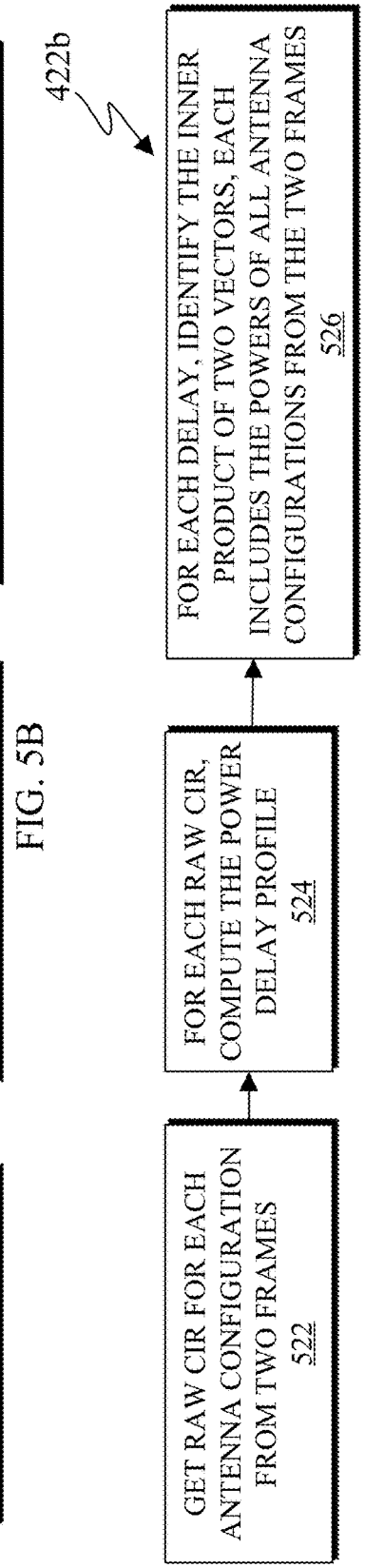
Figure 5D:
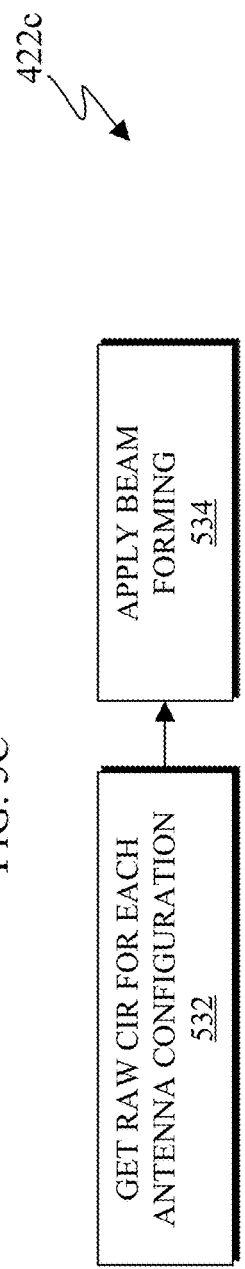

FIGS. 5A-5K illustrate various examples for identify the signals of interest by the tap detector 420 of the FIG. 4A. For example, FIG. 5A illustrates an example method 420a for identifying signals of interest in accordance with an embodiment of this disclosure. For example, FIGS. 5B, 5C, and 5D illustrate example methods 422*a*, 422*b*, and 422*c*, respectively, for combining radar signals in accordance with an embodiment of this disclosure. For example, FIGS. 5E, 5F, 5G, 5H, 5I, 5J, and 5K illustrate example methods 424*a*, 424*b*, 424*c*, 424*d*, 424*e*, 424*f*, and 424*g*, respectively, for identifying signals of interest in accordance with an embodiment of this disclosure. Various changes can be made to FIG. 5A-5K. For example, while various embodiments are shown as a series of steps, various steps could overlap, occur in parallel, or occur multiple times.

FIG. 5A illustrates the method 420*a* describing the overview of the tap detector 420 of FIG. 4. In step 502, the tap detector 420 receives radar signals. The received radar signals (similar to the received radar signals 412 of FIGS. 4B and 4C) can be raw radar signals from different radar configurations. For example, the received radar signals can be collected from different pulses.

In step 504, the tap detector 420 combines the received radar signals. FIGS. 5B, 5C, and 5D, describe various methods for combining radar signals. In certain embodiments, the tap detector 420 combines the raw radar signals into one dimensional (1D) signals. In certain embodiments, the tap detector 420 combines the raw signals into multi-dimensional signals.

The tap detector 420 can combine the received radar signals to facilitate selecting the signals of interest of step 506. FIGS. 5E, 5F, 5G, 5H, 5I, 5J, and 5K describe methods for selecting the signals of interest from the combined radar signals.

FIG. 5B illustrates the method 422*a* for combining the raw radar signals into 1D signals, by averaging a power delay profile. The tap detector 420 derives a statistic or a deterministic function across all raw radar signals in some domain. In certain embodiments, statistics corresponds to the average across all raw radar signals in a domain, while the deterministic function corresponds to taking the maximum across all raw radar signals in a domain. In certain embodiments, the domain can be a delay domain. For example, if the raw radar measurements are the complex CIRs that are received using different antenna configurations, then statistically averaging the power of the CIR can be used to combine the raw radar signals. It is noted that a different statistic or function can be used instead of averaging or identifying a maximum. Similarly, different domains can be used such as a Doppler domain. Additionally, instead of power, the complex numbers could be used directly for combining provided that the combining function can handle complex numbers. In certain embodiments, a different statistical characteristic can be used instead of averaging.

In step 512, the tap detector 420 gathers raw CIR for each antenna configurations. Gathering the raw CIR for each antenna configurations is similar to receiving the raw radar signals 412 of FIGS. 4B and 4C. Each CIR is a 1D signal along the delay domain, which can be translated into a range. In step 514, the power of each CIR tap, such as a delay tap, is computed to generate a 1D power delay profile as seen by each antenna configuration. In step 516, for each delay tap, the CIR powers of all the antenna configurations are averaged to generate the 1D combined radar signals.

In certain embodiments, the tap detector 420 can combine raw radar signals from two or more frames into 1D signals. Combining signals across time provides temporal diversity which can be used to combat a low quality signal capture in from a single frame. For example, to combine the raw radar signals from two or more frames, the tap detector 420 can average the signals across the frames. For another example, to combine the raw radar signals from two or more frames, the tap detector 420 can take the maximum amplitudes across multiple frames.

For example, FIG. 5C illustrates the method 422*b* for combining raw radar signals from two or more frames into a 1D signal. The method 422*b* combines raw radar CIR signals from two frames into a 1D combined radar signal. In step 522, the tap detector 420 gathers the CIRs of the various antenna configurations from the two frames. Gathering the raw CIR for two frames is similar to receiving the raw radar signals 412 of FIGS. 4B and 4C. In step 524, the tap detector 420 identifies the corresponding power delay profiles. In step 526 for each frame, the tap detector 420 forms a vector by stacking all of the power from the different antenna configurations at a fixed delay. For each delay, the inner product of these two power vectors from the two frames is computed to generate the output in a 1D combined radar signals. It is noted that more than two frames can be used to generate the 1D combined radar signal. Similarly, rather than the delay another domain can be used, such as the Doppler domain. Additionally, complex numbers can be used instead of power.

In certain embodiments, the tap detector 420 combines raw radar signals into 2D signals. The tap detector 420 can combine raw radar signals from different antenna configurations to produce multi-dimensional radar signals, by beamforming. The tap detector 420 can use various beam forming methods, such as the maximum ratio combining, the Capon beamforming, zero forcing beamforming, the minimum mean squared error beamforming, MUSIC, ESPRIT, and the like. It is noted that beamforming can be applied in different domains. For example, if beamforming is applied for a fixed delay using all antenna configurations, then a 1D or 2D image in the angular domain can be produced. A 1D image can be represented as an azimuth dimension or elevation dimension, while a 2D image can include both the azimuth dimension and the elevation dimension.

For example, FIG. 5D illustrates the method 422C for combining raw radar signals into a multi-dimensional signal. For example, the tap detector 420 can apply beam forming on the raw CIRs collected from different antennas. In step 532, the tap detector 420 gathers the CIRs of the various antenna configurations. Gathering the raw CIR is similar to receiving the raw radar signals 412 of FIGS. 4B and 4C. In step 534 the tap detector 420 applies beam forming to the frame to produce a 1D or 2D image in the angular domain.

In certain embodiments, the tap detector 420 can combine the raw radar signals that use both the multi-dimensional and 1D. Initially, the tap detector 420 computes and identifies the multi-dimensional radar signals from the raw radar signals. Then the obtained multi-dimensional signals are transformed to generate a 1D combined radar signal. By transforming the multi-dimensional signals increases the flexibility or degree of freedom to match or optimize the signals from the target objects. For example, by transforming the multi-dimensional signals to produce a 1D signal simplifies the process of selecting signals of interest, of step 506 of FIG. 5A, since the selection of signal in 1D can be less computationally demanding.

Figure 5E:
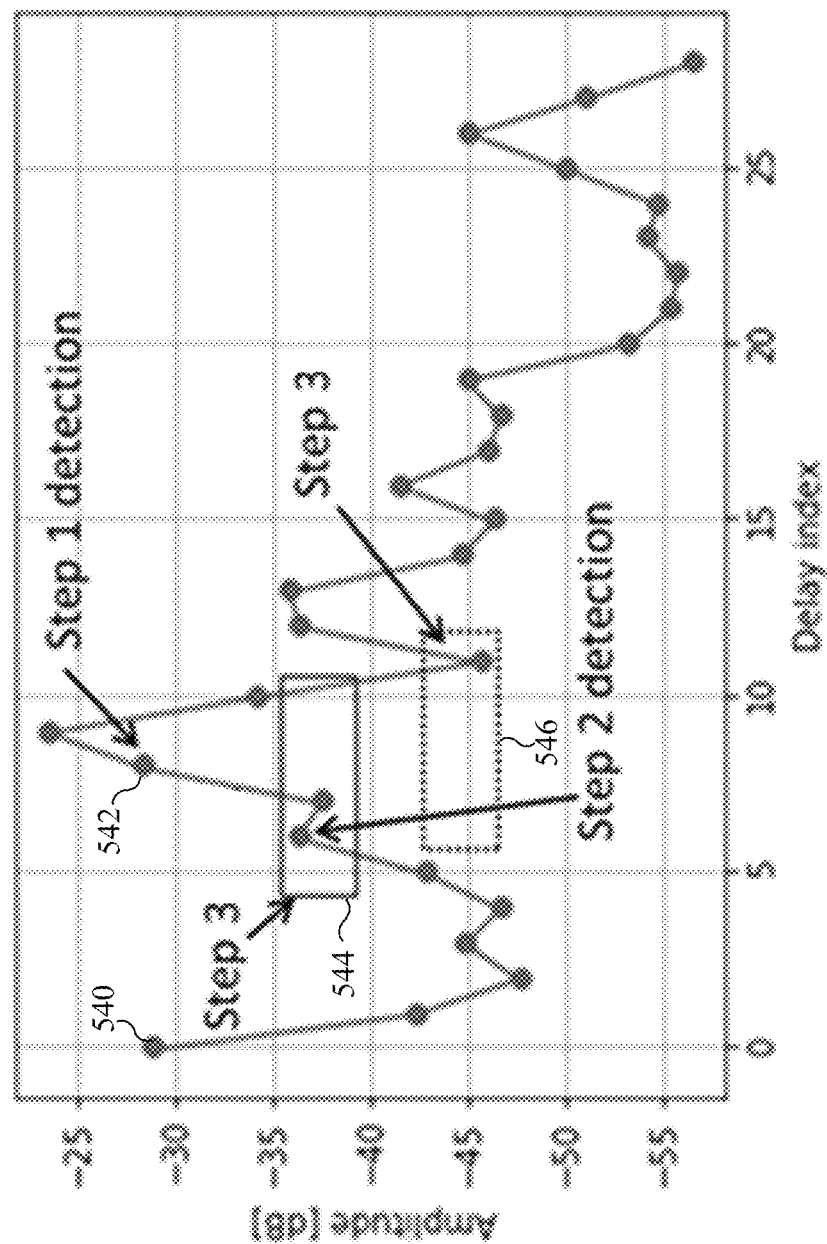
FIGS. 5E, 5F, 5G, 5H, 5I, 5J, and 5K illustrate example methods for identifying signals of interest in accordance with an embodiment of this disclosure.

FIG. 5E illustrates an example graph describing the method 424*a* of FIG. 5B for identifying signals of interest based on energy detection along to delay domain. The graph of FIG. 5E illustrates the CIR power along the delay domain after the signal combining.

The method 424*a* is an example implementation for selecting signals of interest using 1D combined CIR power along the delay domain. Initially the CIRs are received from different pulses, frames, or both pulses and frames. The received CIRs are then combined to produce a 1D output along the delay domain (similar to the method 522a or 422b). The output of the combined CIR is power.

In certain embodiments, after the combined power is obtained, the tap detector 420 performs a three step to select a signal of interest. First, the tap detector 420 identifies the first sample, such as point 542, in the combined CIR power that is larger than a threshold, $P_1$. Second, the tap detector 420 identifies a signal boundary by identifying a first tap. The first tap has a smaller delay than the tap found in step 1 and is larger than a second threshold $P_2$. It is noted that the threshold $P_2$ is smaller than threshold $P_1$. In certain embodiments, the threshold $P_1$ could be set to be 10 dB below the maximum CIR power and $P_2$ could be set to 5 dB below $P_1$ or the noise floor whichever is larger. As illustrated in FIG. 5E, the threshold $P_1$ corresponds to −30 dB, and the threshold $P_2$ corresponds to −40 dB. Third, the tap detector 420 performs an adjustment by considering the sum of total energy. For example, the tap detector 420 compares the sum of power in a sliding widow of K taps, where the range of the first index of the sliding window ranges between $[t_2-k_2, t_2+k_1]$. It is note that $t_2$ is the first tap index found in step two, and $k_1$ and $k_2$ are the adjustment range towards the left and the right of the detected tap $t_2$.

For certain types of radars where the transmitter and receiver antenna modules are in proximity to each other, a strong response directly from the transmitter could be observed such as the CIR power at the delay tap 0 corresponding to point 540. Delay tap 0 (point 540) is the direct leakage signal and excluded from the selection process. In certain embodiments, the tap detector 420 discards the first two taps (such as tap 0 and tap 1) before performing the three step process to select signals of interest. In this example, the threshold $P_1$ is −30 dB, the threshold $P_2$ is −40 dB, K is 6, $k_1$ is 0, and $k_2$ is 1. In step one, the tap detector 420 selects tap 8 (point 542) since this is the first tap (excluding the first two taps) that has a power larger than the threshold $P_1$. In step two, the tap detector 420 selects tap 6, since it is the first tap with a smaller delay that tap 8 and is larger than the threshold $P_2$. Tap 6 is the tentative starting boundary of the signals of interest. In step three, the sum of power over K=6 taps, stating from tap 6 within the window 546 and tap 5 within window 544 are computed and compared. The final selection is the window that results in the highest sum of power. In this example, the final output is window 544, which includes of tap 5 to tap 10.

In certain embodiments, not all three steps are needed and various combinations of the three steps could be used. For example, the tap detector 420 can use step 1, step 3, or steps 1 and 3.

In certain embodiments, the thresholds $P_1$ and $P_2$ are adaptive, such that the thresholds can change. a, the threshold $P_1$ could be chosen according to the maximum CIR power. For instance, $P_1$ can be set to 10 dB below the maximum CIR power. Then $P_2$ can be selected based on the threshold of $P_1$. For instance, $P_2$ can be set to be 5 dB below $P_1$.

For another example, $P_1$ can be set to certain number of dB above the estimated noise floor or clutter level and $P_2$ can be set to be dB level that is below $P_1$, provided that $P_2$ does not fall below the noise floor or clutter level. For instance, $P_2$ can be set a level that is five decibels below $P_1$.

For yet another example of adapting the thresholds, the thresholds, $P_1$ and $P_2$ can be defined as a function, such as a function of the delay tap or another function that is similar to range. For instance, the thresholds, $P_1$ and $P_2$ can be expressed as the functions, $P_1[i]$ and $P_2[i]$, where i denotes the delay tap index. As such it is possible to maintain a level of performance such as detection probability as the propagation distance increases due to a larger delay, since the signal strength will reduce and a smaller threshold is needed to maintain the same detection probability. Therefore, embodiments of the present disclosure can define multiple thresholding functions for, $P_1[i]$ and $P_2[i]$, and accordingly select the necessary threshold functions in order to maintain a constant threshold adaptation.

Figure 5F:
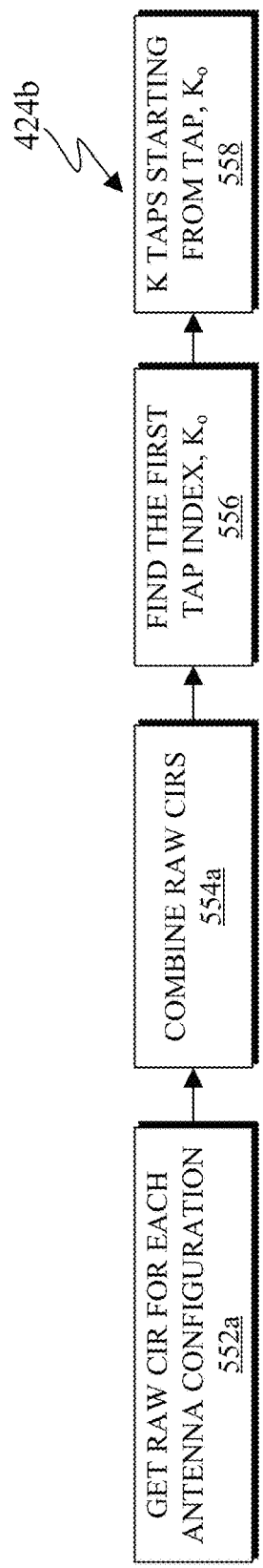

FIG. 5F illustrates the method 424b for selecting signals of interest based on the rise in the CIR power. Steps 552a and 554a can be similar to steps 502 and 504 of FIG. 5A. For example, gathering the raw CIR for different antenna configurations and then combining the raw radar signals can be performed similar to the methods 422a, 422b, and 422c, of FIGS. 5B, 5C, and 5D, respectively. In step 556, the tap detector 420 finds the first tap index $K_0$ where the CIR power increases by more than a threshold $P_3$. That is, the starting boundary of the signals of interest is determined as the first tap where the CIR power increases by more than the threshold $P_3$. In certain embodiments, $P_3$ is preset. In certain embodiments, $P_3$ is adaptively selected based on a function of the signal domain such as $P_3[i]$. In certain embodiments, an additional condition can be included, such that the CIR power is higher than a threshold $P_5$, after the rise of the power by more than $P_3$, to avoid error due to noise. It is noted that $P_5$ is preset or adaptively selected based on a function of the signal domain such as $P_5[i]$. In step 558, once the tap has been detected, the K taps starting from this detected taps are selected.

Figure 5G:
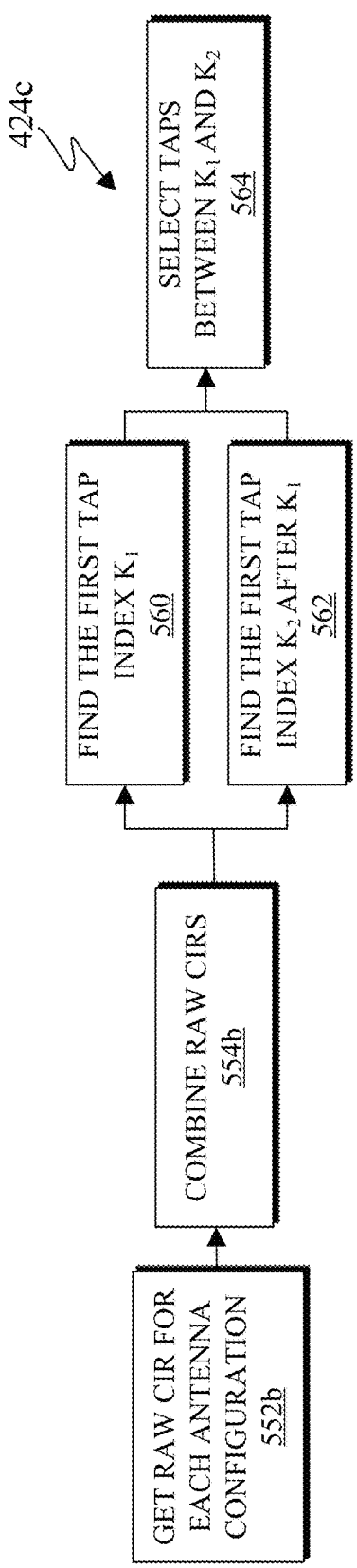

FIG. 5G illustrates the method 424c for selecting signals of interest based on a rise and drop in the radar signal power. Steps 552b and 554b can be similar to steps 502 and 504 of FIG. 5A. For example, gathering and then combining the raw radar signals can be performed similar to the methods 422a, 422b, and 422c, of FIGS. 5B, 5C, and 5D, respectively. In certain embodiments, the end boundary of the signals of interest is identified by a drop in the CIR power. For example, end of the signals could be detected when the CIR power decreases by a threshold $P_4$. The threshold $P_4$, can be adaptively selected and defined as a function of the domain of the combined radar signal, such as $p_4[i]$, with i denotes the domain index. The method 424c describes selecting the signals between the tap selected by the rise in CIR power based on the threshold $P_3$ or $P_3[i]$, of FIG. 5F, and the tap detected by the drop in the CIR power using $P_4$ or $P_4[i]$ as the output of the selection procedure of selecting the signals of interest. For example, in step 560, the tap detector 420 finds or identifies a first tap index $k_1$, where the CIR power increases by more than a threshold $P_3$, similar to that of step 556 of FIG. 5F. In step 562, the tap detector 420 finds or identifies a first tap index $k_2$, after identifying the tap index $k_1$. The tap detector 420 finds or identifies a first tap index $k_2$, where the CIR power drops by more than the threshold $P_4$. In certain embodiments, an additional constraint on the CIR power signal level after the rise and before the drop of the CIR power is used in order to provide additional resistance to noise. In step 564, the tap detector 420 uses the rise and drop in the radar power signal to select the signals of interest. For example, the tap detector 420 select the signals of interest that are between $k_1$ and $k_2$.

In order to detect the end of the signals of interest, the tap detector 420 need not have prior knowledge of the number of taps to be selected. For example, if the number of taps to be selected is known then only the starting boundary maybe detected using the threshold $P_3$ or $P_3[i]$. If the number of taps to be selected is unknown, then the ending boundary can be detected using the threshold $P_4$ or $P_4[i]$. By identifying the ending boundary the tap detector 420 can verify against the prior knowledge as well as provide an additional detection integrity test. For example, a warning could be issued when the detected signal boundaries contain a larger number of taps than the known (or preset) number of taps.

Figure 5H:
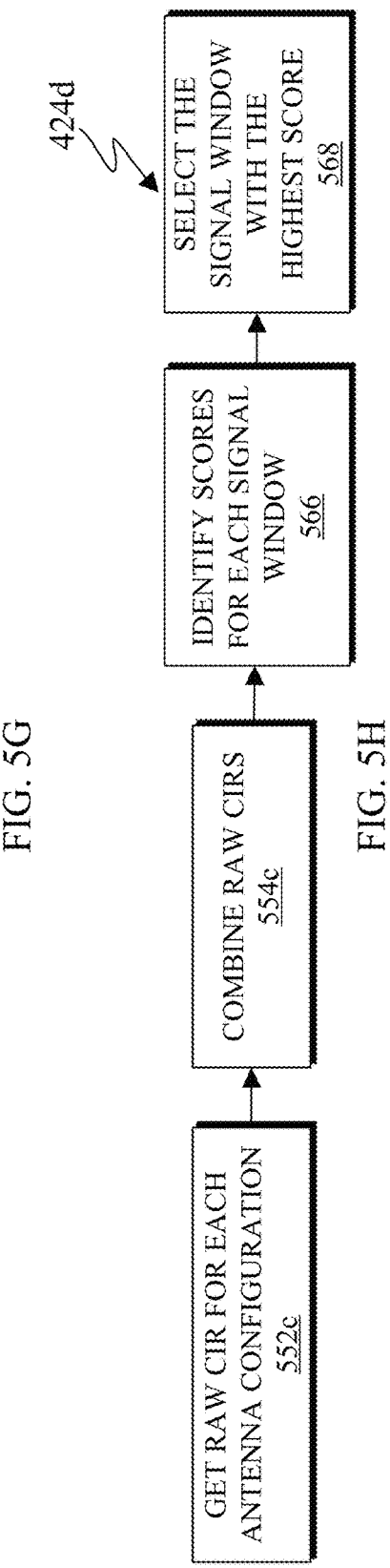

FIG. 5H illustrates the method 424d for selecting signals of interest using machine learning. The method 424d uses prediction scores from a learning model over a sliding window from tap $k_1$ to tap $k_2$, where each signal includes the length K. In certain embodiments, certain types of applications such as face authentication, anti-spoofing, or gesture recognition, the target include certain signatures or patterns in the measured CIRs. When signatures or patterns are present in the measured CIRs, machine learning approach can be used to select the signals of interest.

Steps 552c and 554c can be similar to steps 502 and 504 of FIG. 5A. For example, gathering and then combining the raw radar signals can be performed similar to the methods 422a, 422b, and 422c, of FIGS. 5B, 5C, and 5D, respectively. A machine learning model can be trained to compute a score for each signal window of a certain length K. In certain embodiments, a score predictor derives the score for each window starting at tap $k_1$ until tap $k_2$ for a 1D radar signal. The length of each window is K taps. For example, in step 566, the tap detector 420 identifies scores for each signal window started at tap $k_1$ until tap $k_2$. In step 568, after identifying the scores, tap detector 420 selects the signal window with the highest score, as the signal of interest. Various types of learning models could be used for this purpose. For example, any classifier, such as the support vector machine, random forest, neural network, and the like, or any techniques used in recommender systems such as collaborative filtering methods can be used. If the machine learning classifier does not output a score, then the metric computed before deciding the classes is used as the score.

In certain embodiments, step 554c is optional based on the type of machine learning used to select the signals of interest. As such, the tap detector 420 may not fix the size of the window K. Accordingly, the number of selected taps are included in the leaning model the generated the score.

Figure 5I:
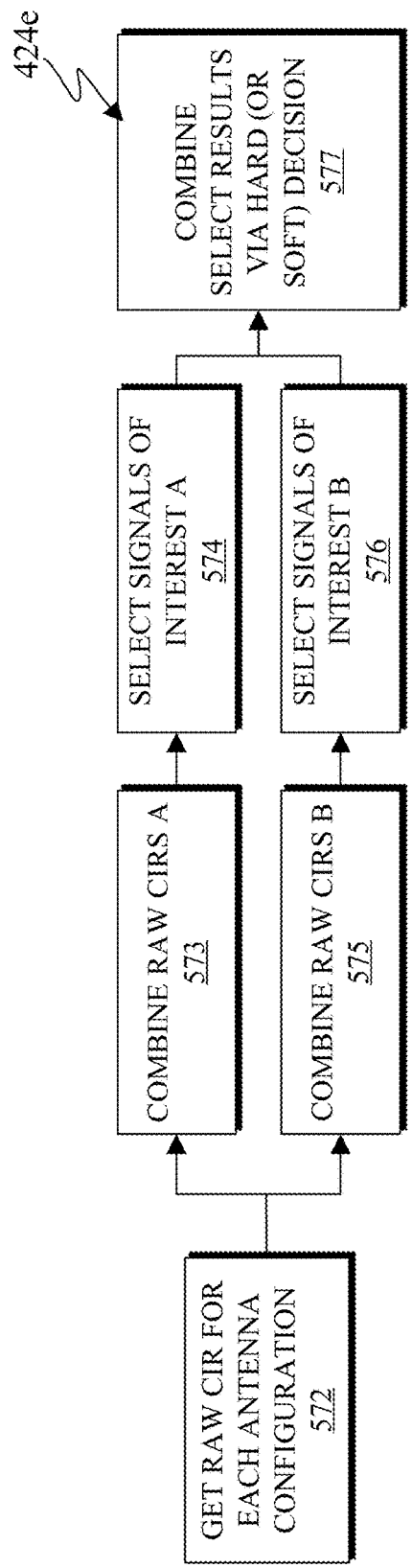

The various embodiments for selecting the signals of interest can run in parallel as each embodiment can use the same input. Afterwards, the various outputs can be combined to produce another selection of the signals of interest. FIG. 5I illustrates the method 424e for selecting the signals of interest by using multiple selection branches in parallel and thereafter combining the outputs from the multiple branches. Although FIG. 5I illustrates two branches, any number of branches can be used in parallel.

Step 572 can be similar to step 502 of FIG. 5A. For example, gathering the radar signals can be performed similar to the methods 422a, 422b, and 422c, of FIGS. 5B, 5C, and 5D, respectively. Steps 573 and 575 can be similar to step 504 of FIG. 5A. for example, gathering and then combining the raw radar signals can be performed similar to the methods 422a, 422b, and 422c, of FIGS. 5B, 5C, and 5D, respectively. Steps 573 and 575 can be the same combining method or different combining methods. If the combining methods of steps 573 and 575 are the same, the splitting could be done after the CIR combining to avoid redundant computation.

In step 577 the selected results of steps 573 and 575 can be a hard decision. In certain embodiments, a hard-decision approach outputs the selection only if all the selections from the different branches match. In certain embodiments, a hard-decision approach outputs the selection that has the highest level of confidence. Different metrics can be used as the confidence level, such as the gap to the thresholds, some function of the gaps to the threshold and the noise floor or radar clutter level.

Alternatively, in step 577 the selected results of steps 573 and 575 can be a soft decision. A soft-decision approach performs a weighted average of the start boundaries and end boundaries of the selected signals from the different branches, where the weights are computed from the confidence levels of each branch.

Figure 5J:
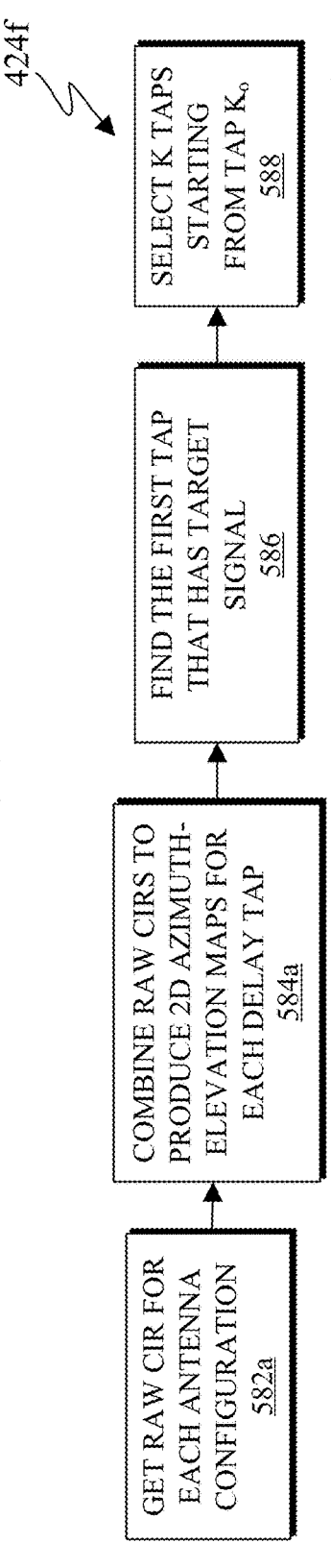
Figure 5K:
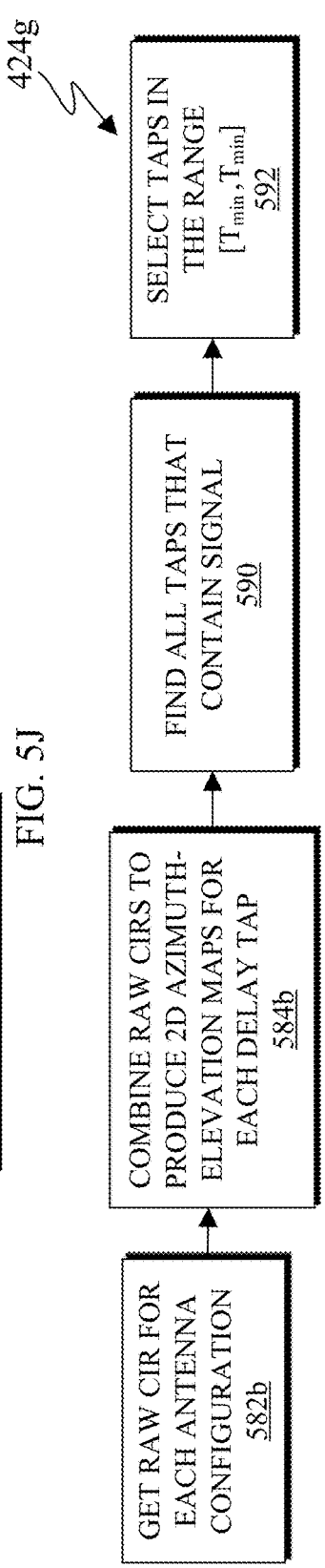

FIGS. 5J and 5K illustrate the methods 424f and 424g, respectively, for selecting signals of interest using multi-dimensional radar signals. In certain embodiments, an azimuth-elevation map is used when selecting signals of interest from multi-dimensional radar signals. In particular, the method 424f describes selecting the signals of interest using 2D azimuth-elevation map. The method 424g describes selecting the signals of interest using 2D azimuth-elevation map while determining the number of taps to be selected.

The multi-dimensional radar signals can include an azimuth-elevation map for each delay tap. The target object can produce distinctive patterns in the combined radar signals, which the tap detector 420 identifies and uses to determine whether a delay tap includes signals of the target object. For example, when the delay tap includes the signals from the target object, the energy on the azimuth-elevation map is concentrated. As such, a learning model can be trained to classify whether a delay tap contains signals from the target object. The learning model can be a support vector machine, neural network, or the like.

The method 424f describes a trained classifier determining whether a delay tap includes signals from a target object and selecting the signals of interest using the classifier. In step 582a, the tap detector 420 gathers raw CIR for each antenna configuration. For example, the tap detector 420 can gather the raw CIR using different antennas. In step 584a, the tap detector 420 generates a 2D azimuth-elevation map for each delay tap by combining the raw CIRs. In step 586, the tap detector 420 uses the classifier (for detecting if the tap includes the target signal) to identify the first tap, $k_0$, that includes the target signal. In step 588, the tap detector 420 selects K taps starting from that detected tap, $k_0$.

The method 424g is more generalized than the method 424f. For example, the method 424g does not assume the number of taps to select. In step 582b, the tap detector 420 gathers raw CIR for each antenna configuration. For example, the tap detector 420 can gather the raw CIR using different antennas. In step 584b, the tap detector 420 generates a 2D azimuth-elevation map for each delay tap by combining the raw CIRs. In step 590, the tap detector 420 uses the classifier to detect the presence of the target signals to find all of the delay taps that include the target signals. If $t_{min}$ is the smallest delay tap index and $t_{max}$ is the largest delay tap index among the tap, are determined to include the target signals by the classifier, then, in step 592, the tap detector 420 selects taps in the range of $t_{min}$ to $t_{max}$.

The selection criterion of method 424g can be improved if some prior knowledge of the target response is assumed. For example, if the target is a face or a hand, a typical size of such a target can be assumed. Note that the number of taps can be translated to distance. In such a case, rather than selecting the range $t_{min}$ to $t_{max}$, a more sensible selection would be the range $t_{min}$ to min of $(t_{max}, t_{min}+K_{max})$, where $K_{max}$ denotes the number of taps deemed to cover the whole target with a high probability. As such, knowledge of the target objects size or material can be used by the tap detector to increase performance of selecting the signals of interest.

In certain embodiments, a sensor, such as the sensor 265, can be included on the electronic device 400 to further increase the selection of the signals of interest. The sensor data can provide an indication as to the possible location or distance to the target object. For example, depending on the application (such as face authentication, anti-spoofing, gesture or object recognition, and the like) if the tap detector 420 knew the distance that the target of interest is form the radar transceiver 410 can reduce processing requirements when selecting the signals of interest. The distance or location of the target object can also indicate to the tap detector 420 whether the selected signals are likely to be incorrect. For example, the tap detector 420 can determine whether the selected signals of interest are too small or larger based on the size of the target object or the distance from the radar transceiver 410 to the target object. As such, in certain embodiments, if the selection of the signals of interest is larger or smaller by a threshold from the expected interval of distance, then the selection could be rejected, and a new set of radar measurements can be initiated to select new signals of interest.

Although FIGS. 5A-5K illustrate example methods for identifying and selecting signals of interest various changes can be made to FIGS. 5A-5K. FIGS. 5A-5K do not limit this disclosure to any particular method.

Figure 6:
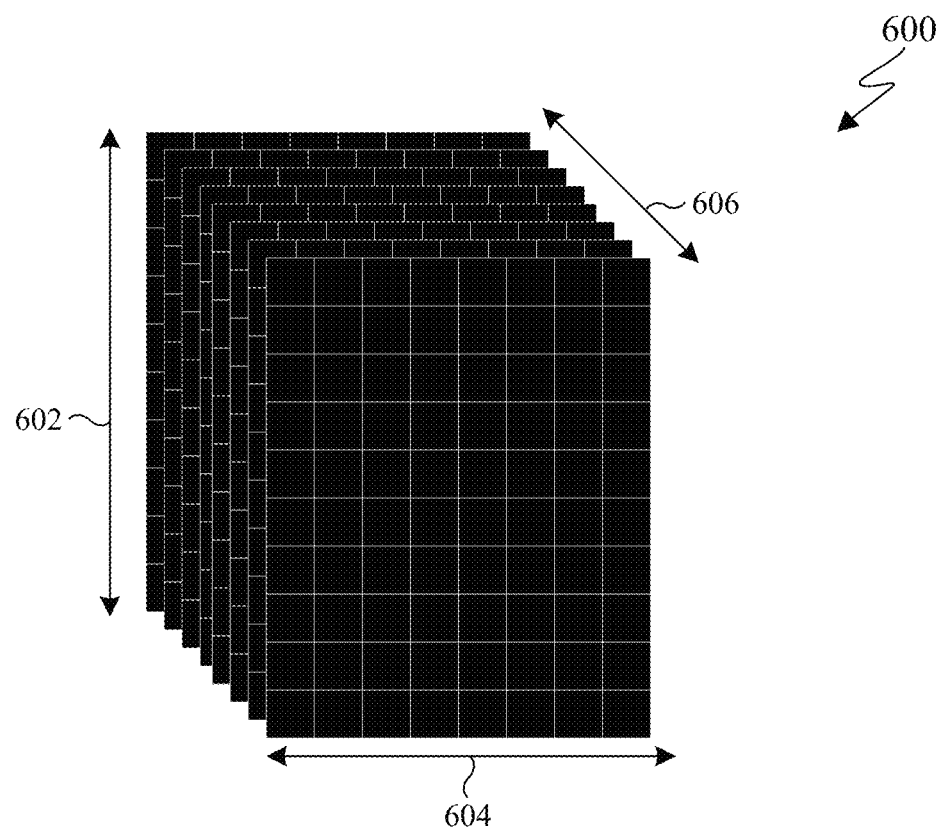
FIG. 6 illustrates an example input tensor in accordance with an embodiment of this disclosure.

The signals of interest that are selected by the tap detector 420 can be provided to the pre-processing engine 430 to generate an input for the inference engine 440, the feature extractor 440 or both. FIG. 6 illustrates an example input tensor 600 generated by the pre-processing engine 430 in accordance with an embodiment of this disclosure.

The input tensor 600 represents an example shape of the radar signal input. The example input tensor 600 illustrates an example input tensor. The input tensor 600 relates three dimensions of a radar signal, (i) the number of the number of antennas 602 of the electronic device 300, (ii) the number of busts 604 (such as the bursts 342 of FIG. 3C) and (iii) the number of antennas times a number of values 606. It is noted that a radar signal can be represented as complex number, such as a+bi, where 'a' is the real portion and 'b' is the imaginary portion of the radar signal. As such, number of values (of the number of antennas times a number of values 356) can one or more of (i) the real part of the value (a), (ii) the imaginary part of the value (b), (iii) the magnitude of the value (m) (as described in Equation (10)), or (iv) the phase of the value (φ) (as described in Equation (10)).

The inference engine 440 generates a set of results that include probabilities for determining the authenticity of the biometric samples. Based on the generated probabilities, the anti-spoofing engine 445 classifies whether the source is live or fake. FIGS. 7A, 7B, 7C, and 7D illustrate example embodiments of the inference engine 440 in accordance with an embodiment of this disclosure. FIG. 7E illustrates an embodiment for detecting whether the target object is a fake representation of the user in accordance with an embodiment of this disclosure. FIG. 7F illustrates an example anti-spoofing engine 760 in accordance with an embodiment of this disclosure. Although FIGS. 7A-7F illustrates associated with the tap detector 420 various changes can be made to FIG. 7A-7F. For example, while various embodiments are shown as a series of steps, various steps could overlap, occur in parallel, or occur multiple times.

Figure 7A:
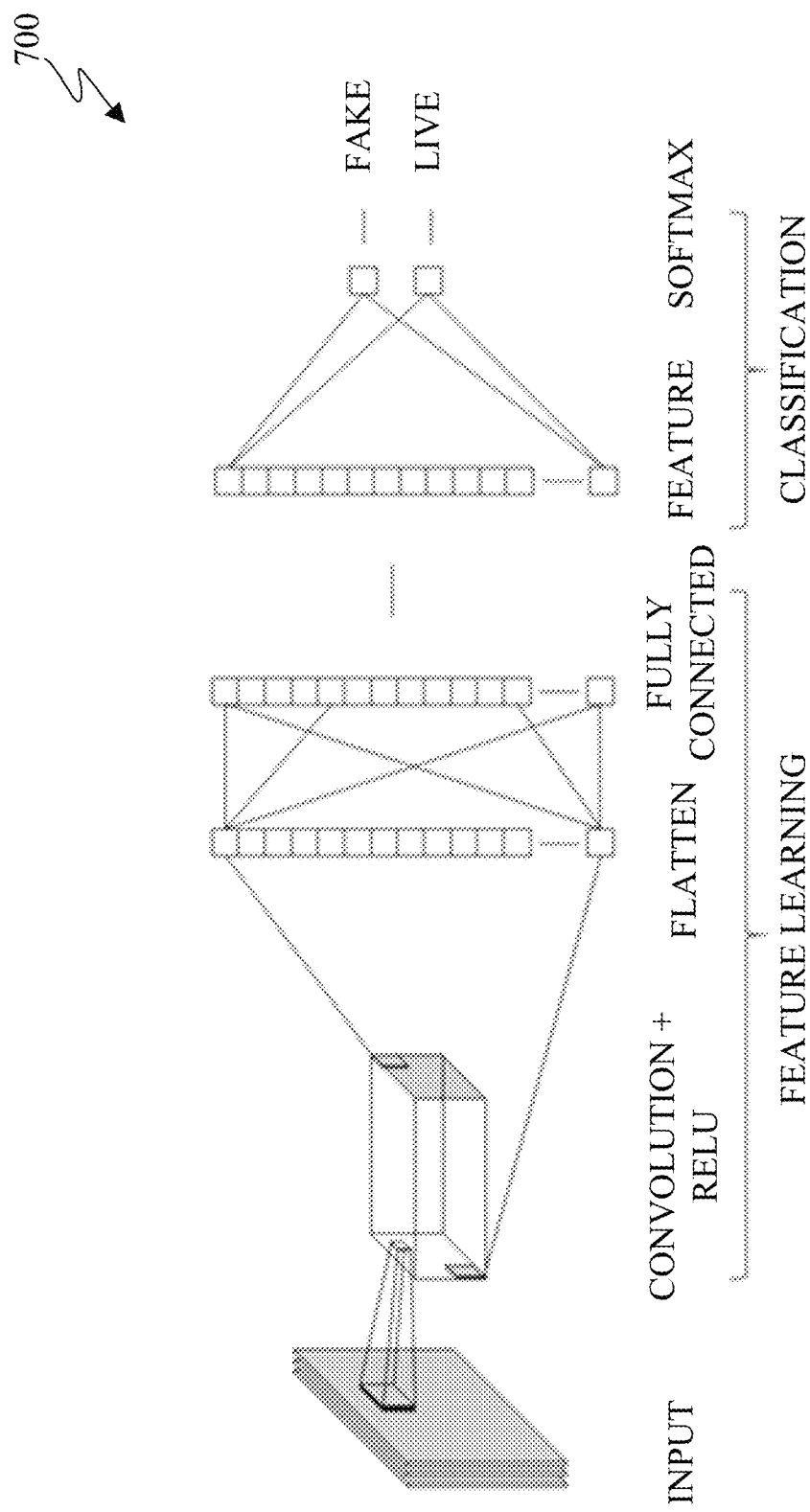
FIGS. 7A, 7B, 7C, and 7D illustrate embodiments of an example inference engine in accordance with an embodiment of this disclosure.

FIG. 7A illustrate the example inference engine 700 in accordance with an embodiment of this disclosure. The inference engine 700 can be similar to the inference engine 440 of FIG. 4A. The inference engine 700 is a Convolution Neural Network (CNN) which classifies whether the radar biometric sample is live or fake. A CNN learns a binary classification task, such as whether the radar biometric sample is live or fake. The CNN can use a Cross Entropy Loss Function, described in Equation (23), below. In the Cross Entropy Loss Function of Equation (23) the variable y is the class indicator and p is the predicted probability of the sample that belongs to the first class.

$$L=-y(y\log(p)+(1-y)\log(1-p))$$ Equation (23)

Figure 7B:
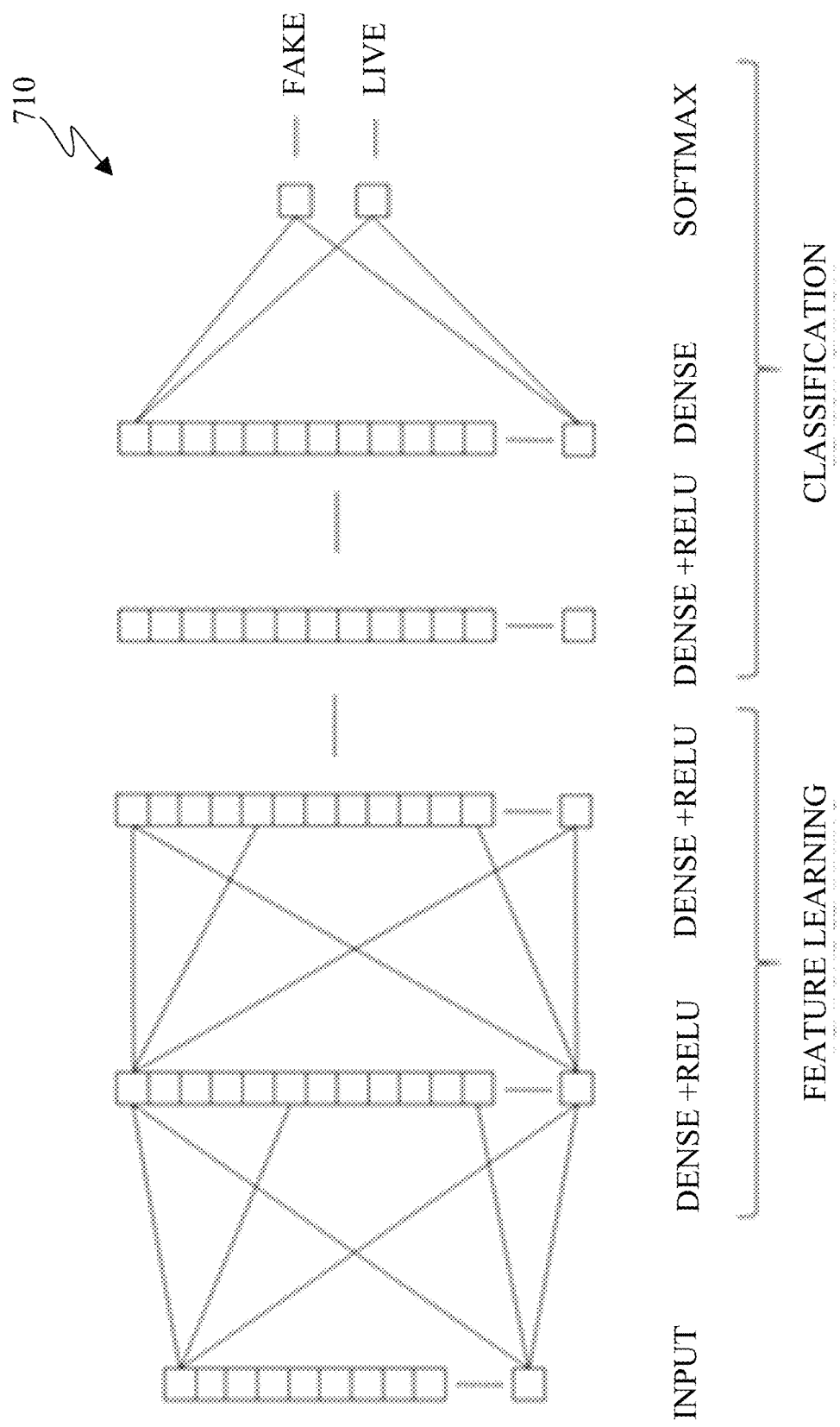

FIG. 7B illustrates the example inference engine 710 in accordance with an embodiment of this disclosure. The inference engine 710 can be similar to the inference engine 440 of FIG. 4A. The inference engine 700 is a Multi-Layer Perceptron.

The input into a Multi-Layer Perceptron is an array of values. As such, the pre-processing engine 430 modifies the tensor input to correspond with a Multi-Layer Perceptron. For example, the example input tensor 600 is modified to be an array, representing the number of antennas, number of bursts, or number of antennas and number of values. FIG. 7B illustrates a radar input tensor that is flattened to be used in the Multi-Layer Perceptron.

Figure 7C:
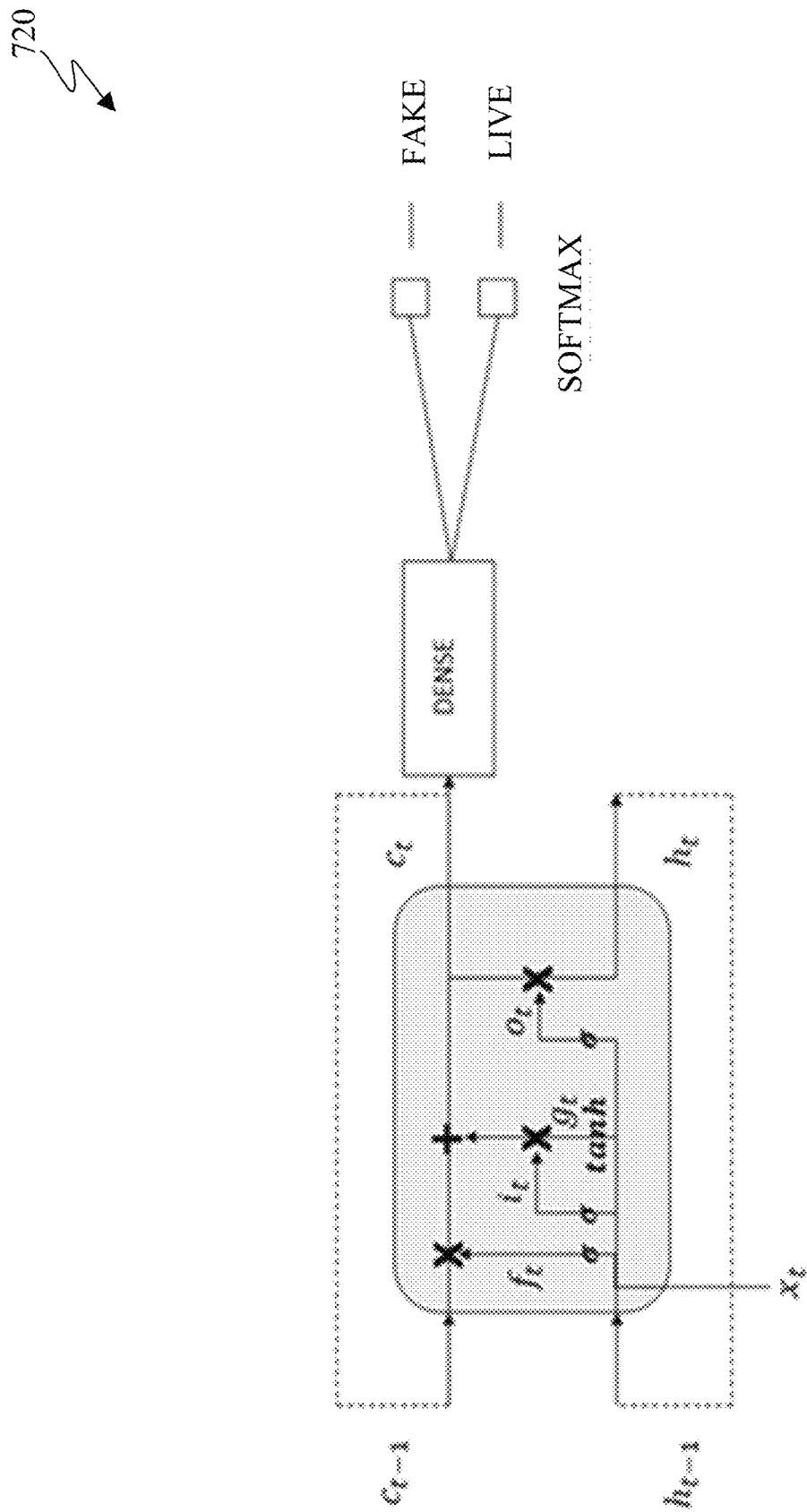

FIG. 7C illustrate the example inference engine 720 in accordance with an embodiment of this disclosure. The inference engine 720 can be similar to the inference engine 440 of FIG. 4A.

The inference engine 720 is a Long-Short Term Memory (LSTM) Neural Network. LSTM is a special type of Recurrent Neural Network (RNN) that exhibit temporal dynamic behavior and possess significant memory capability that is designed specifically to deal with time series input. LSTM takes in data in multiple time steps and make a decision after all the data correspondent to each time step are fed in. Similar to the Multi-Layer Perceptron, the input data is reshaped into a time series. As such, the pre-processing engine 430 reshapes the radar input so that the number of burst is correspondent to the number of time steps or the number of frames is correspondent to the number of time steps.

Figure 7D:
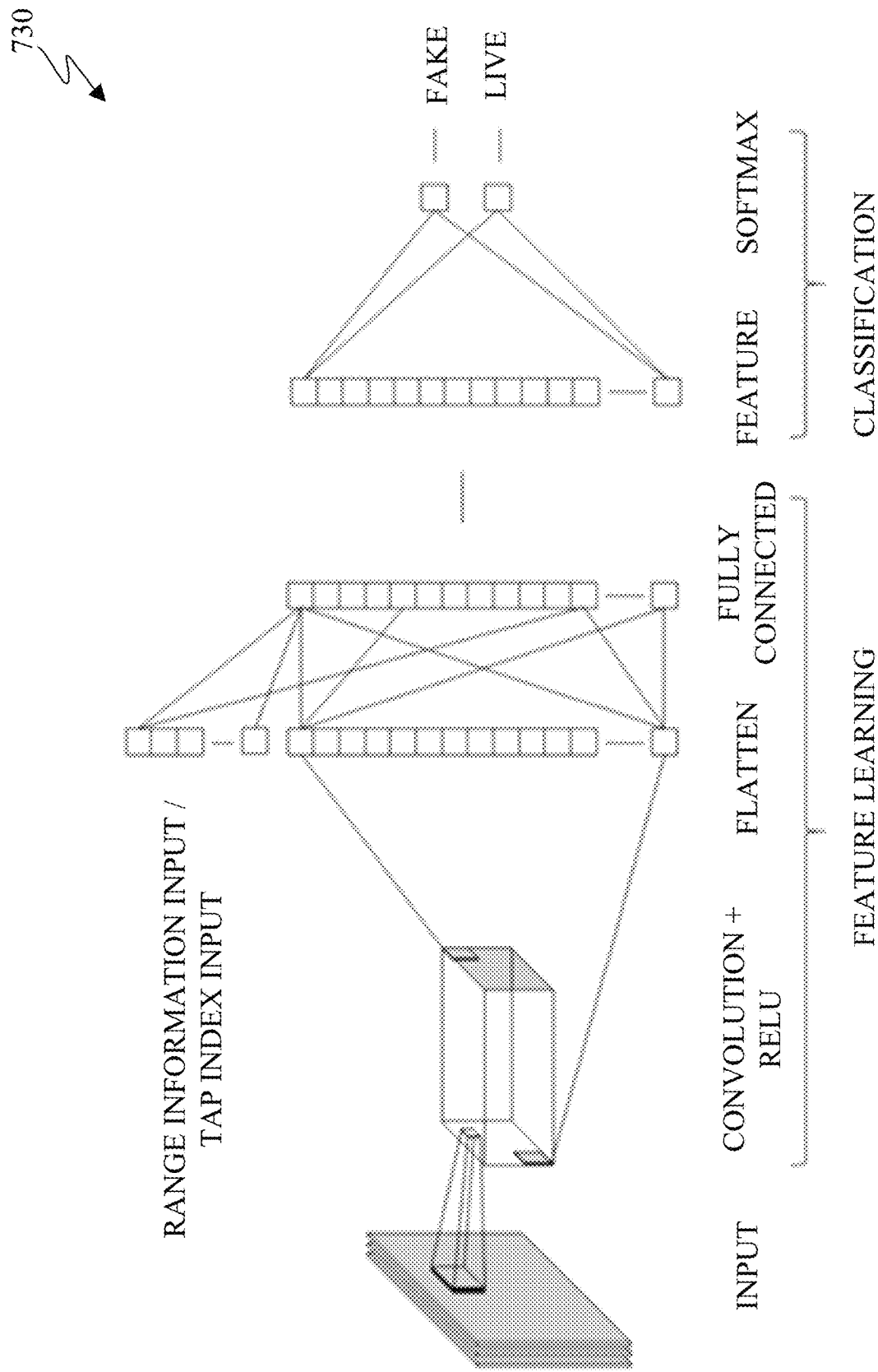
Figure 7E:
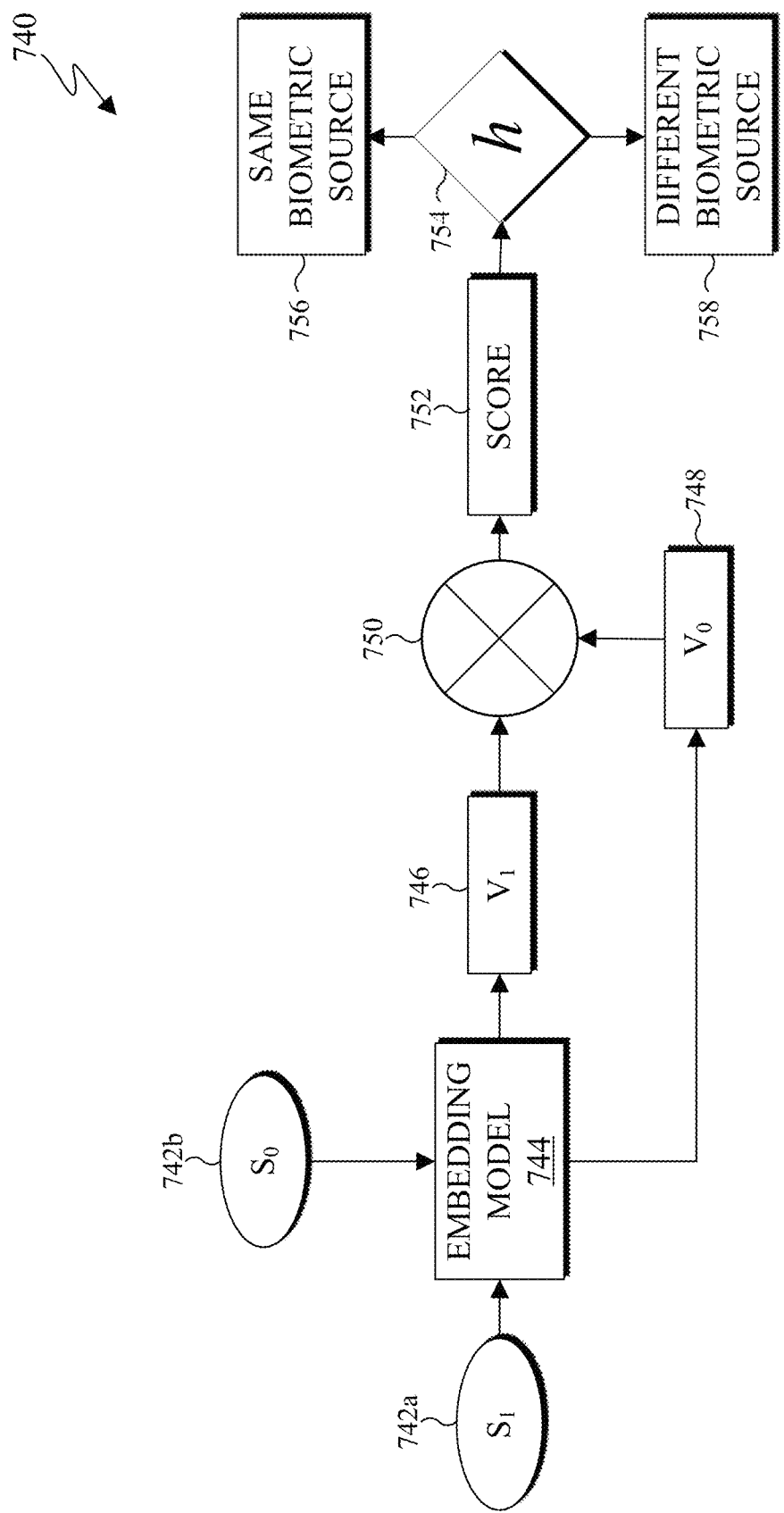
FIG. 7E illustrates an embodiment for detecting whether the target object is fake in accordance with an embodiment of this disclosure.
Figure 7F:
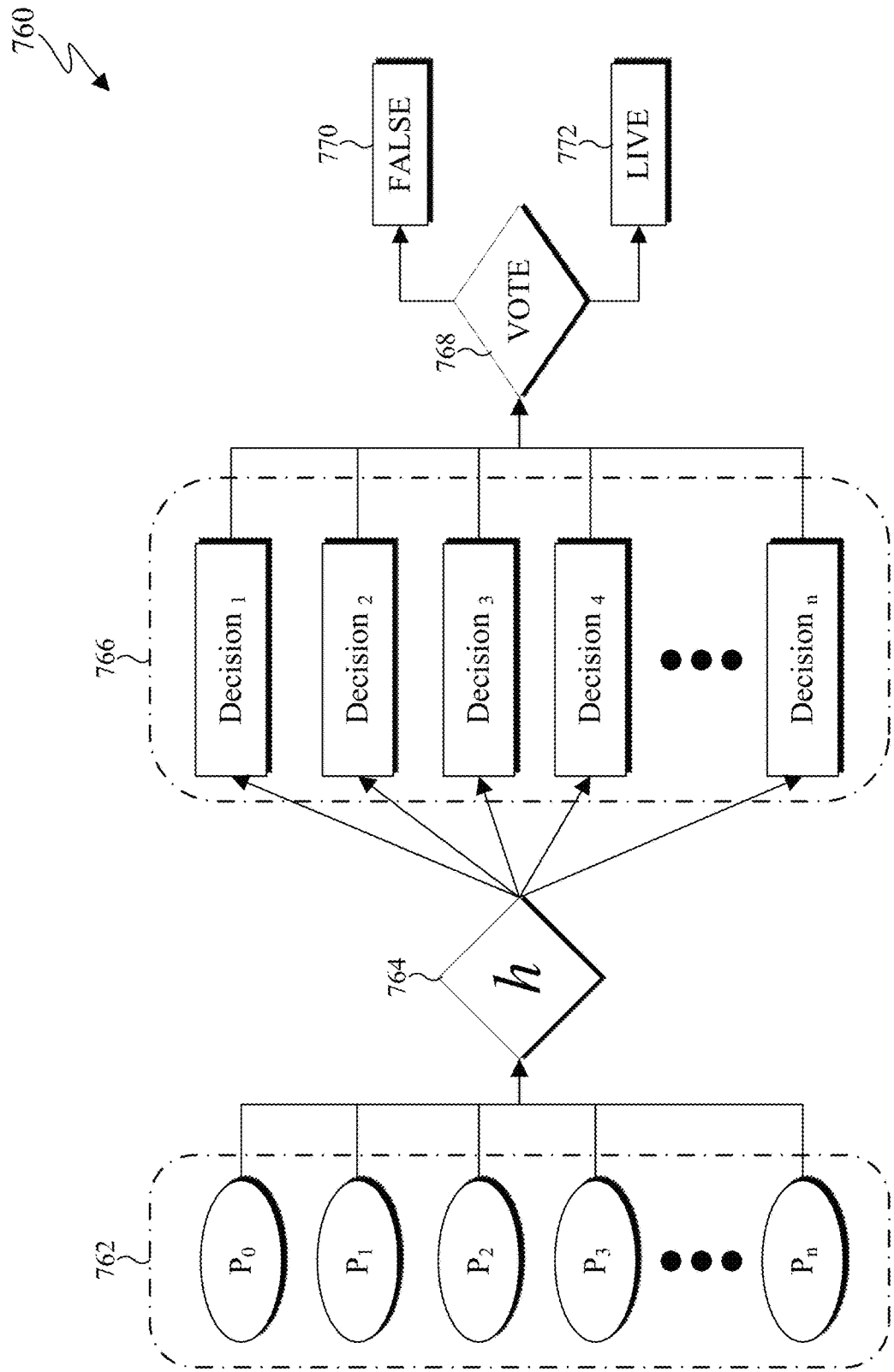
FIG. 7F illustrates an example anti spoofing engine in accordance with an embodiment of this disclosure.
Figure 7G:
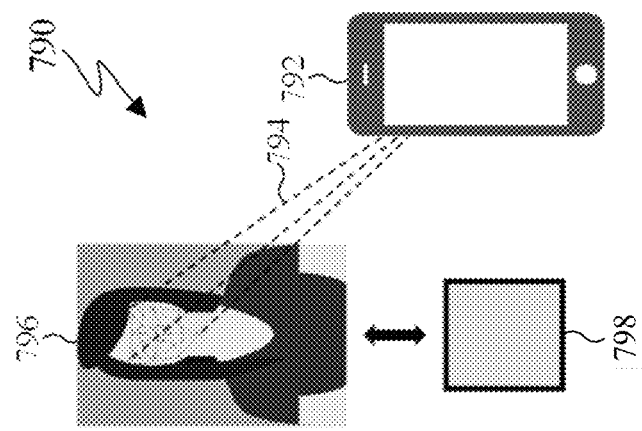
FIG. 7G illustrates example determinations of whether the biometric source is live or fake in accordance with an embodiment of this disclosure.
Figure 7G:
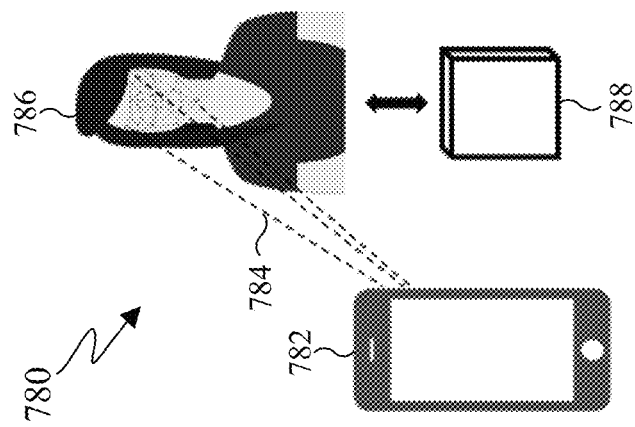

In certain embodiments, adding the tap index or range information to the inference engine 440 can improve the performance of the inference engine 440. FIG. 7D illustrates the example inference unit 730 in accordance with an embodiment of this disclosure. The inference engine 730 can be similar to the inference engine 440 of FIG. 4A. The inference engine 730 is designed to use radar signal and tap index to improve performance. The inference unit 730 includes the tap index input or the range information input into the first dense layer. As such, the tap index provides information of the region of interest decreases training time and improves accuracy.

In certain embodiments, the inference engine 440 uses embedding learning. Embedded learning can be used to train the inference engine 440 to differentiate biometric radar signals that are not from the same biometric source. For example, the inference engine 440 that uses embedding learning can compare the registered biometric radar signals of the user, stored in the electronic device, to samples the sampled radar signals to identify if the source is alive or fake.

FIG. 7E illustrates the inference engine 740 in accordance with an embodiment of this disclosure. The inference engine 740 can be similar to the inference engine 440 of FIG. 4A. The inference engine 740 uses embedding learning.

The input $S_0$ 742b is the preregistered biometric radar signal of the user (similar to the preregistered feature vectors 416 of FIGS. 4B and 4C) and the input $S_1$ 742a is the captured signals of the user at the time of requesting authentication. The embedding model 744 maps the input $S_1$ 742a from a high dimension to lower dimension values Vi 746. At 750, the inference engine 740 matches the lower dimension values Vi 746 with $V_0$ 748, where $V_0$ 748 is identified from the preregistered biometric radar signal $S_0$ 742b of the user. Matching Vi 746 with $V_0$ 748 generates a vector pair. That is, the vector pair can include one feature vector of the preregistered biometric radar signal and one feature vector of the radar signals. The inference engine 740 generate a score 752 based on matching Vi 746 with $V_0$ 748. The score 752 can be a similarity score. The inference engine 740 then compares the score 752 with a threshold 754. Based on comparing the score 752 with a threshold 754, the inference engine 740 can identify and classify whether the biometric source of the preregistered user data and the sampled radar signals are from the same biometric source 756 or from different biometric sources 758. In certain embodiments, if the preregistered user data and the sampled radar signals are from the same biometric source 756, then the inference engine 740 generates a portability indicating that the sampled target object is likely to be live. Alternatively, if the preregistered user data and the sampled radar signals are from different biometric sources 758, the inference engine 740 generates a portability indicating that the sampled target object is likely fake.

FIG. 7F illustrates the anti-spoofing engine 760 in accordance with an embodiment of this disclosure. The anti-spoofing engine 760 can be similar to the anti-spoofing engine 445 of FIG. 4A.

The anti-spoofing engine 760 obtains the set of probabilities 762 that are generated by the inference engine 440. The anti-spoofing engine 760 then compares each of the probabilities 762 to a threshold 764. The threshold 764 can be similar to the threshold 754. Based comparing comparison each probability of the probabilities 762 to the threshold 764, the anti-spoofing engine 760 generate the decisions 766 which classify the respective probabilities as live or fake, in order to reject or accept each vector pair. The anti-spoofing engine 760 then analyzes each of the classifications associated with each of the vector pair and performs a decision, such as voting 768, to make a final decision. The final decision indicates whether the current sampled radar signals are false 770 or live 772. That is, the final decision indicates whether the source of the sampled radar signals is live 772 or not alive, such as a mask. In certain embodiments, the voting 768 is performed for the multiple decisions 766 and stored in a decision buffer.

In certain embodiments, the voting 768 is a majority based vote, such that the maximum occurring value is chosen as the output of the anti-spoofing engine 445. Equation (24), described describes the decision output of the anti-spoofing engine 445 when the voting 768 is based on a majority. Equation (24) describes that the output, $Decision_{ASU}$, is the most occurring value of the decision 1 through decision n.

$$Decision_{ASU} = mode\{decision_1, decision_2, \ldots, decision_n\} \quad \text{Equation (24)}$$

$$Decision_{ASU} = \underset{i}{\mathrm{argmax}} \sum_{j=1}^{n} w_j \chi_A(Decision_j = i) \quad \text{Equation (25)}$$

In certain embodiments, the voting 768 is based on a weighted voting scheme. Equation (25), describes assigning weights of recent values that are higher than the weights assigned to previously occurring values. In Equation (25), above, $W_3$ is the weight associated with the Jth decision. $X_a$ is the characteristic function [Decision=i∈A], where A is the set of labels fake and live FIG. 7G illustrates an example determination of whether the biometric source is live or fake. In particular, the FIG. 7G describes a determination 780 and a determination 790. The determination 780 represents a determination that the target object is a live source while the determination 790 represents a determination that the target object is a fake.

The electronic devices 782 and 784 are similar to any of the client devices 106-114, the electronic device 300 of FIGS. 3A and 3B, the electronic device 400 of FIG. 4A, and include internal components similar to that of the electronic device 200 of FIG. 2. The electronic devices 782 and 784 respectively emit radar signals 784 and 794 towards a target object (similar to the target object 308 of FIG. 3A and the user 320 of FIG. 3B), such as a user 786 or the reproduction 796. The radar signals 784 and 794 are similar to the signal 314 of FIGS. 3A and 3B.

The electronic device 782 emits the radar signals 784 towards the user 786 to determine whether to authenticate the user. Based on the reflected signals, the electronic device 782 generates a 3D input tensor. The electronic device 782 generates the 3D input tensor since the face of the user 786 includes various contours or depth. Since the input tensor is three dimensions, indicating the target object has depth, the electronic device 782 determines that the target object is a live source. In contrast, the electronic device 792 emits the radar signals 794 towards the reproduction 796 of the user 786 to determine whether to authenticate the user. Based on the reflected signals, the electronic device 792 generates a flat input tensor. The electronic device 792 generates the flat input tensor, since reproduction 796 corresponds to a picture of the face of the user 786. The reproduction 796 is flat and does not include various contours or depth that a live source would possess. As such, the electronic device 792 determines that the target object is a fake representation.

Figure 8A:
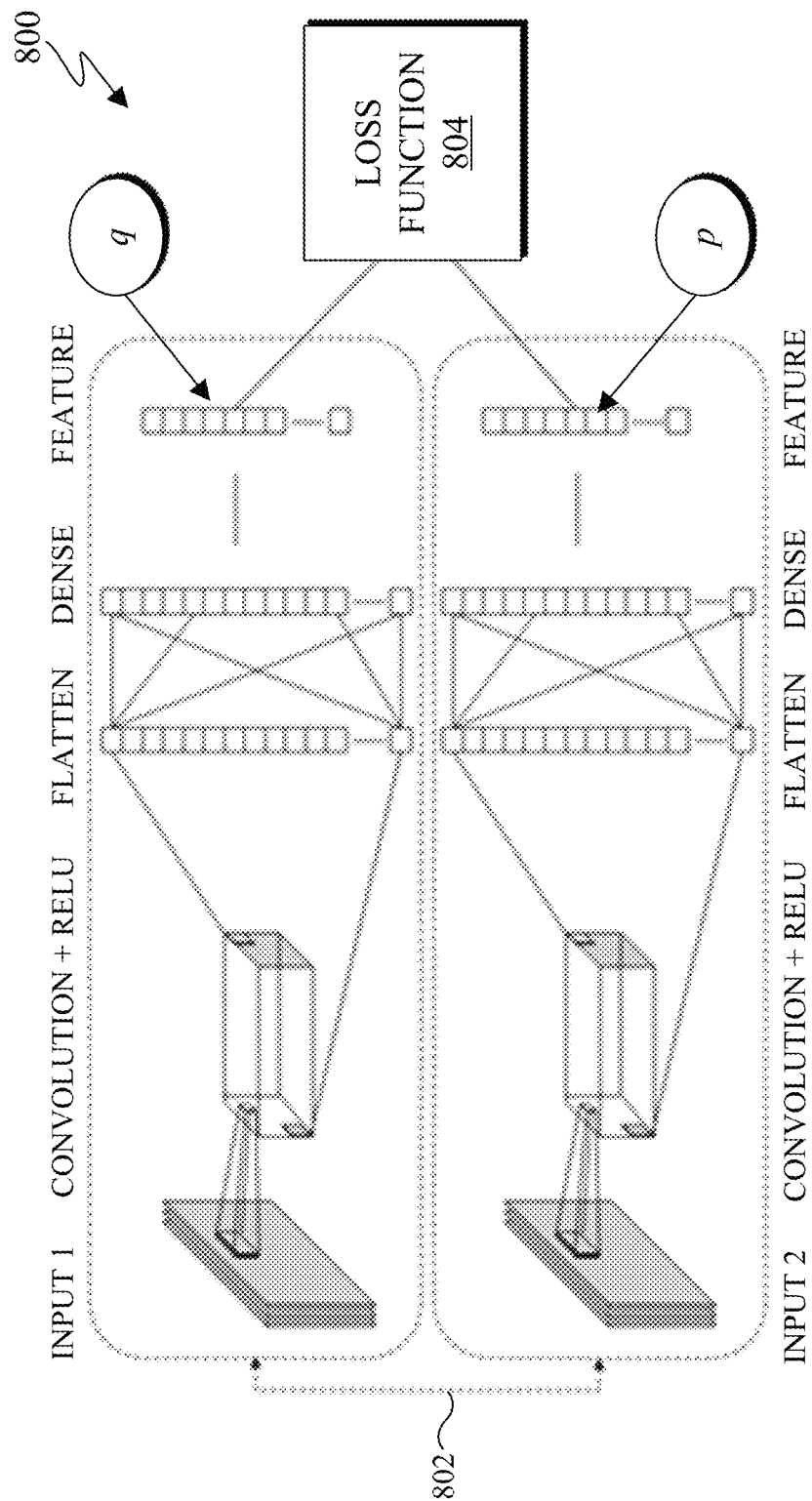
FIGS. 8A, 8B, 8C, and 8D illustrate example feature extracting engines in accordance with an embodiment of this disclosure.
Figure 8B:
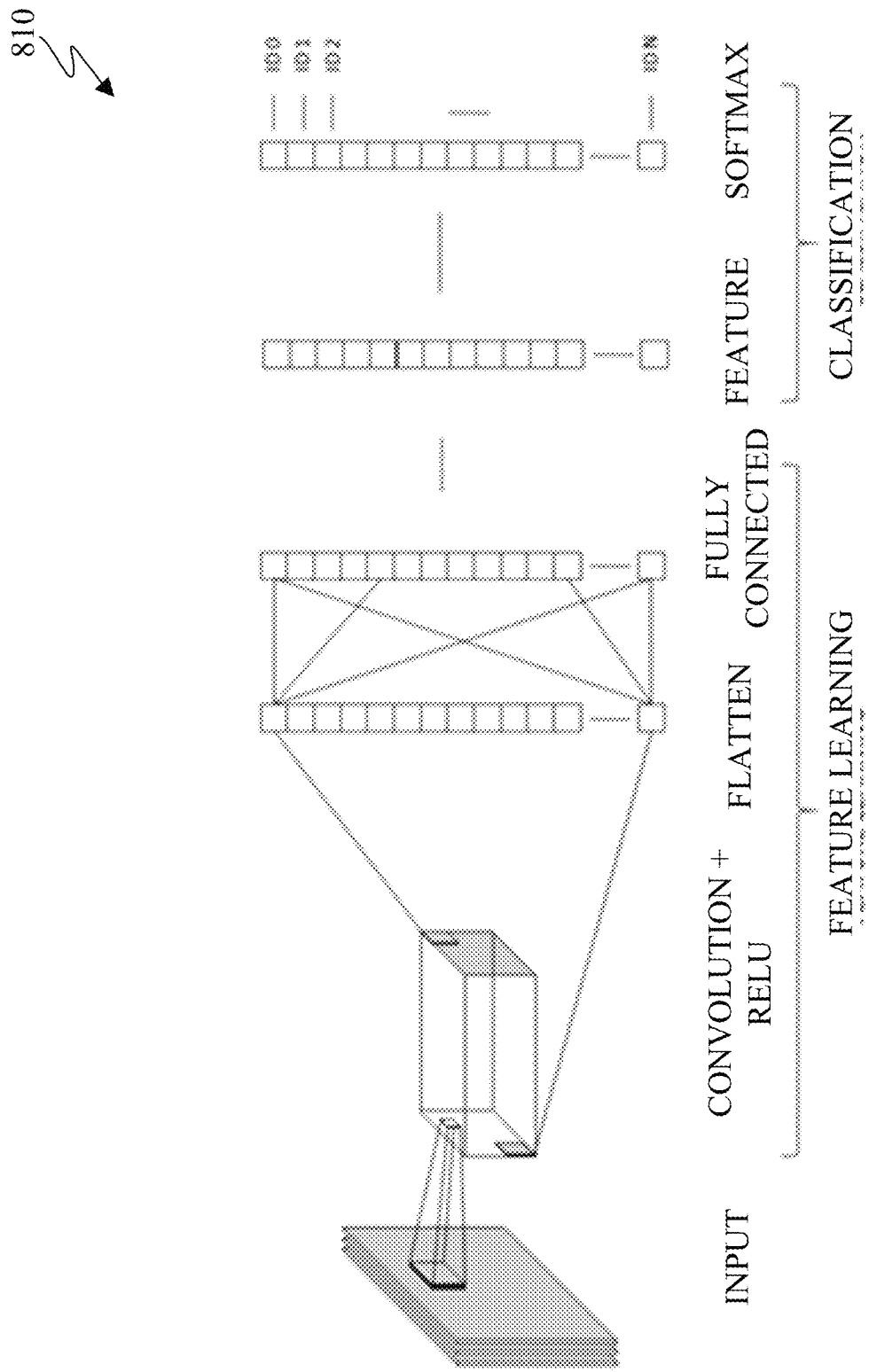
Figure 8C:
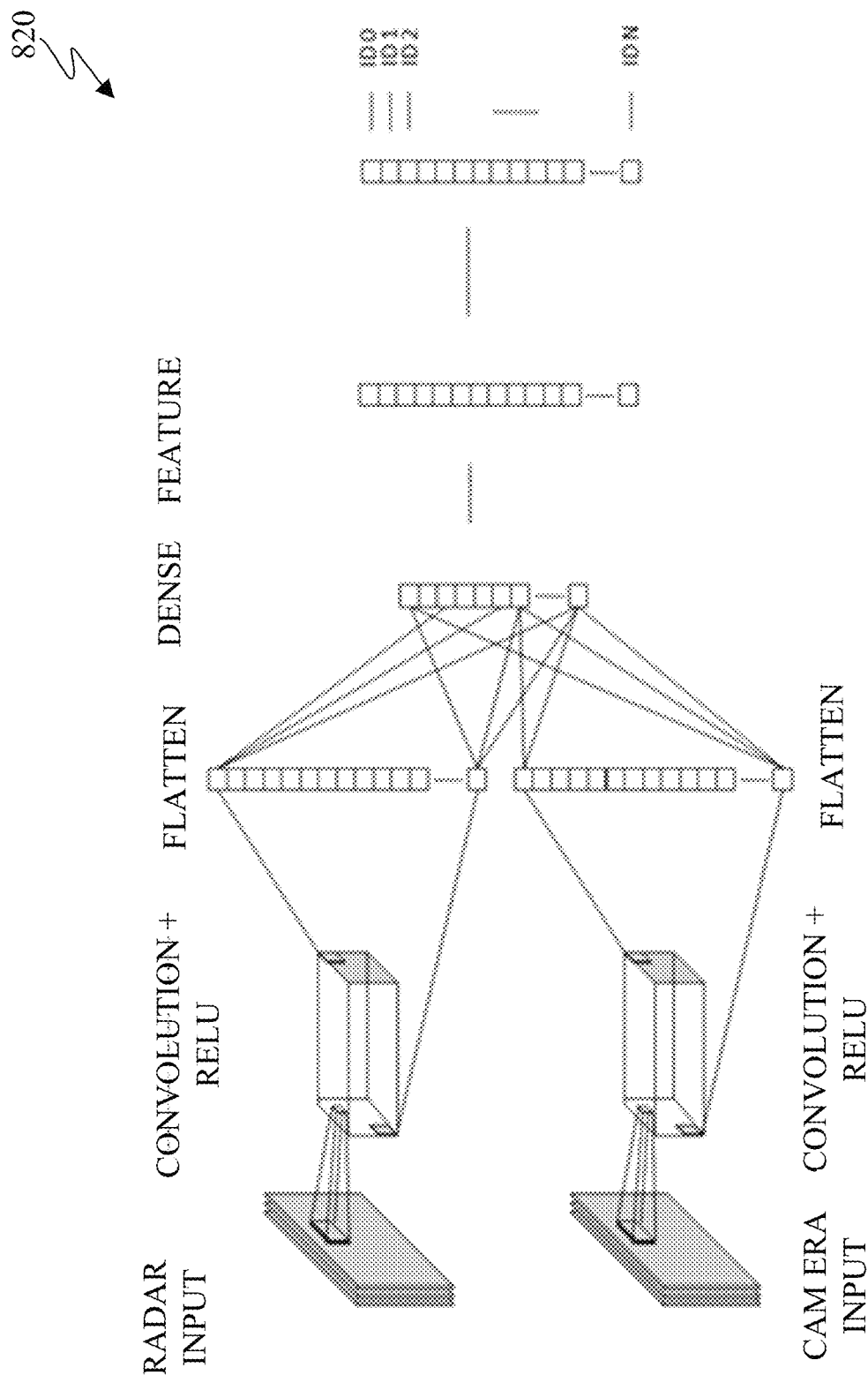
Figure 8D:
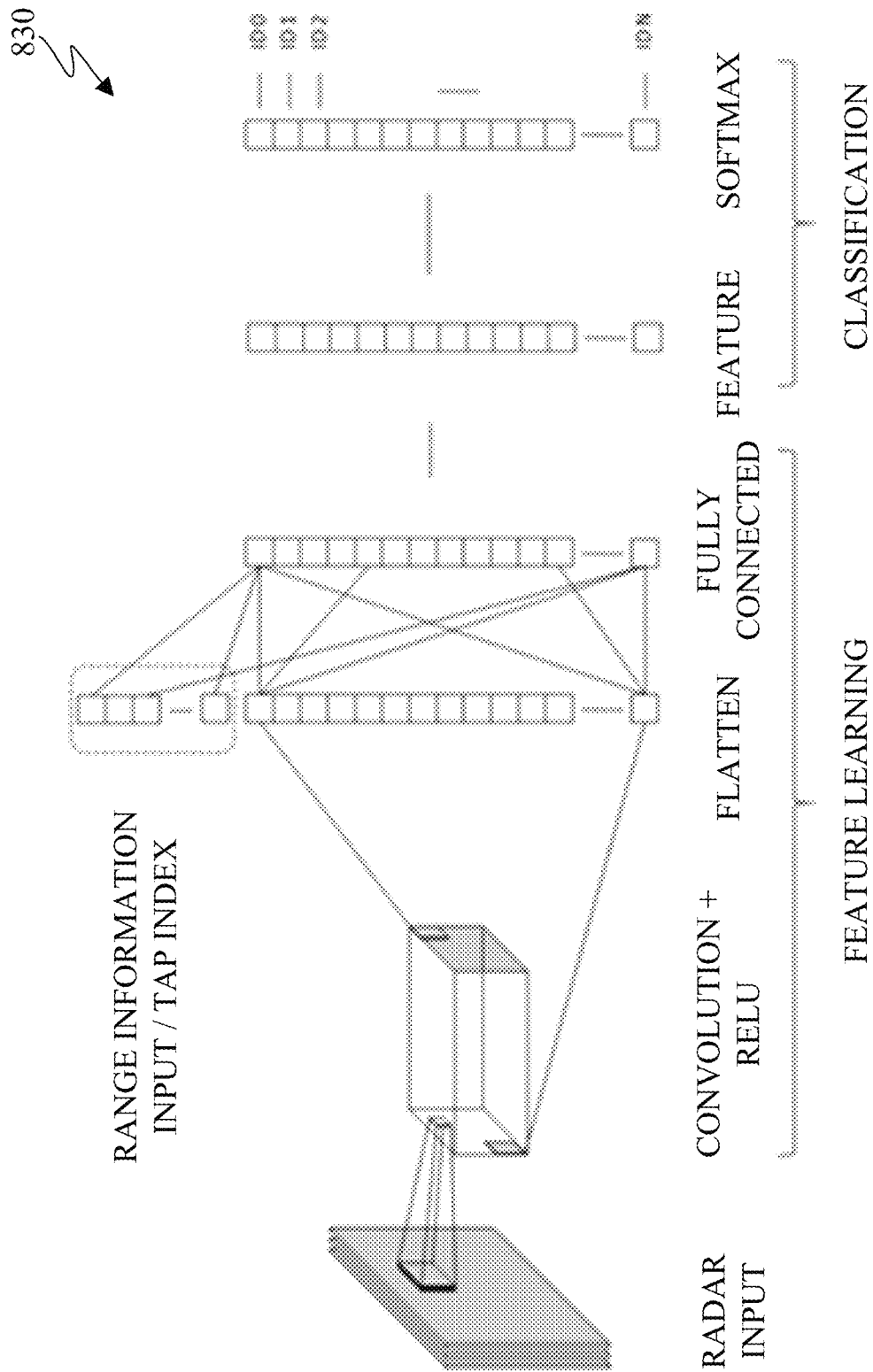

FIGS. 8A, 8B, 8C, and 8D illustrate example embodiments of the feature extractor 450 in accordance with an embodiment of this disclosure. FIG. 8A illustrates the feature extractor 450 implemented using a Siamese Network 800 (similar to a SNN) in accordance with an embodiment of this disclosure. FIG. 8B illustrates the feature extractor 450 implemented using an artificial neutral network 810 in accordance with an embodiment of this disclosure. FIGS. 8C and 8D illustrate modified feature extractors 820 and 830, respectively, in accordance with an embodiment of this disclosure. Although FIGS. 8A-8D illustrates associated with the feature extractor 450 various changes can be made to FIG. 8A-8D. For example, while various embodiments are shown as a series of steps, various steps could overlap, occur in parallel, or occur multiple times.

In certain embodiments, the feature extractor 450 is an artificial neural network. An artificial neural network can be the Siamese Network 800 and use a loss function 804, as illustrated in FIG. 8A. The Siamese Network 800 includes branches 802 which perform metric learning using a loss function 804. As illustrated, the Siamese Network 800 includes two branches, such as a top branch and a bottom branch, as illustrated. In certain embodiments, the branches 802 are identical. In certain embodiments, the loss function 804 is a Constructive Loss Function, described in Equation (26), below, or a Triplet Loss Function, described in Equation (28), below. The neural network can later be used to extract features from the biometric radar data using only one of the two branches of the Siamese Network 800. The Siamese Network 800 also illustrates two feature vectors, that of the feature vector q associated with the top branch and the feature vector p associated with the bottom branch.

In certain embodiments, the Constructive Loss Function, representing the loss function 804, is implemented in the Siamese Network 800. The Constructive Loss Function is described in Equation (26), below. In Equation (26), the variable, Y, denotes the distance between the feature of two samples, and whether the two samples are in the same close or not in the same class. The variables q and p, denote the Euclidian distance, described in Equation (27), below, between the feature vectors p and feature vectors q. It is noted that Equation (27) modifies Equation (18) with respect to the feature vectors p and feature vectors q.

$$\text{Constructive Loss} = (1-Y)\frac{1}{2}(d(q,p))^2 + (Y)\frac{1}{2}\{\max(0, m - d(q,p))\}^2 \quad \text{Equation (26)}$$

$$\text{Euclidian distance} = \sqrt{\sum_{i=1}^{n}(q_i - p_i)^2} \quad \text{Equation (27)}$$

In certain embodiments, the Triplet Loss Function, representing the loss function 804, is implemented in the Siamese Network 800. A Triplet Loss Function compares a baseline input, referred to as an anchor, to a positive input and a negative input. The distance between the baseline input to the positive input is minimized while the distance between the base line input and the negative input is maximized. The Triplet Loss Function is described in Equation (28), below. In Equation (28) the variable, d, denotes the distance between feature vector a and feature vector p. The feature vector a, is the feature vector generated from the anchor sample. The feature vector p, is the feature vector generated using the positive sample. It is noted that the feature vector p is in the same class as the anchor sample. The feature vector n, is the feature vector generated using the negative sample. It is noted that the feature vector n is in a different class as the anchor sample.

$$\text{Triplet Loss} = \max(d(a,p) - d(a,n) + \text{margin}, 0) \quad \text{Equation (28)}$$

In certain embodiments, the feature extractor 450 is an artificial neural network 810, as illustrated in FIG. 8B. For example, a conventional artificial neural network can be used to model the feature extractor 450. The artificial neural network 810 learns a multi label classification task, which is used to extract feature vectors from the biometric radar data. For training purposes, different loss functions can be used by the artificial neural network 810. For example, a Softmax loss function, Large Margin Softmax Loss Function, or an Angular Softmax Loss Function can be used.

In certain embodiments, the feature extractor 450 is a modified neural network 820, as illustrated in FIG. 8B. The modified neural network 820 includes two branches where each branch takes a type of input, such as a radar signal input and a vision data 414 of FIGS. 4B and 4C that is captured by the camera of the electronic device 400. The modified neural network 820 can fuse the data and learn to extract features from both types of data which can increase the performance of the feature extractor.

In certain embodiments, the feature extractor 450 is modified neural network 830, as illustrated in FIG. 8D. The modified neural network 830 can receive tap index information or range information. For example, the modified neural network 830 can use both radar signal and a tap index. The modified neural network 830 concentrates the tap index input or range information input to the first dense layer of the feature extractor. As such, the tap index can provide the context information of input data and help speed up the training as well as improving the accuracy of the feature extracting process.

FIGS. 9A-9H illustrate example embodiments of training a neural network in accordance with an embodiment of this disclosure. Various changes can be made to FIGS. 9A-9H. For example, while various embodiments are shown as a series of steps, various steps could overlap, occur in parallel, or occur multiple times.

Figure 9A:
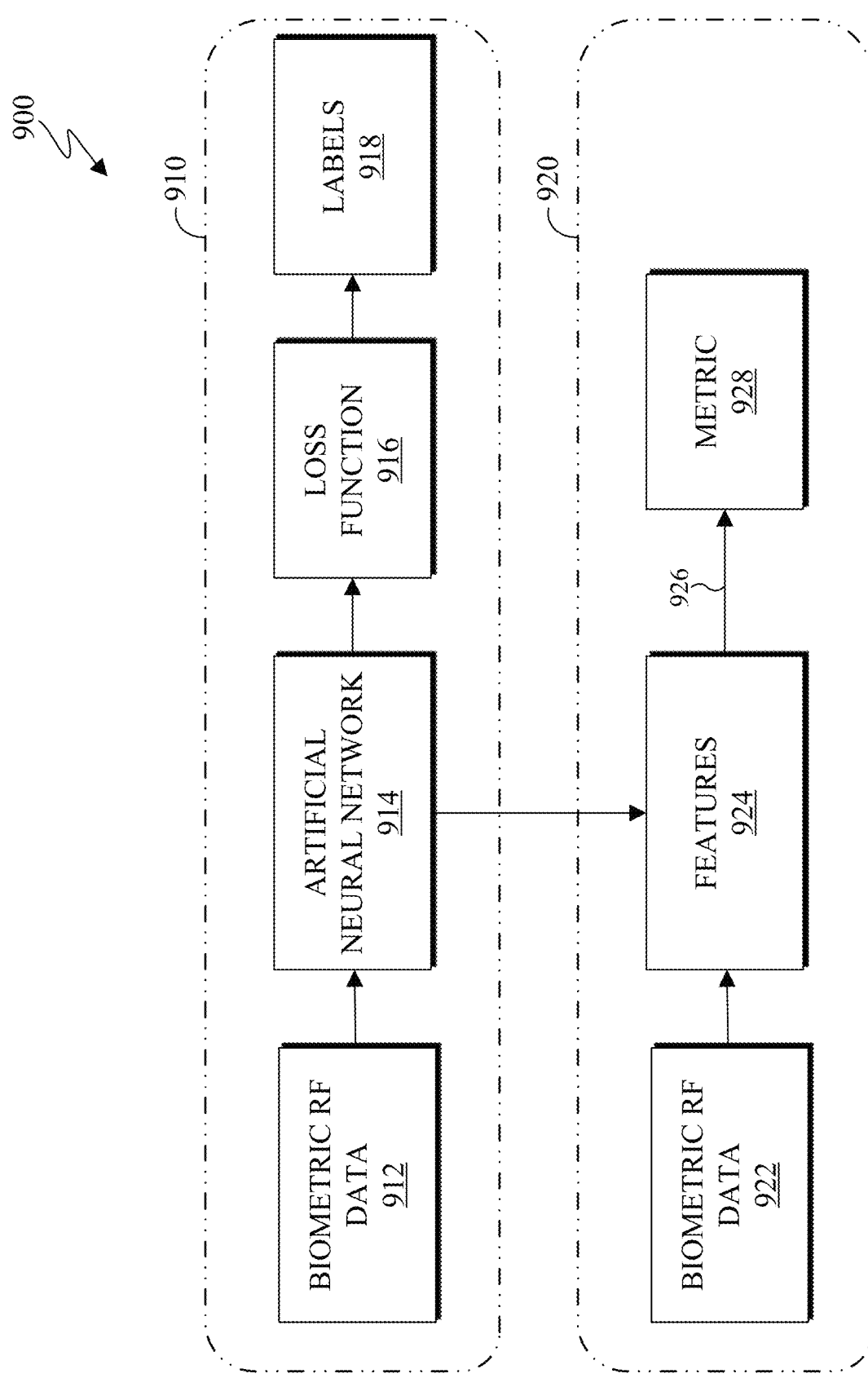
FIGS. 9A, 9B, 9C, 9D, 9E, 9F, 9G, and 9H illustrate example methods for training the feature extracting engines in accordance with an embodiment of this disclosure.

FIG. 9A illustrates an example training method 900 for training a neural network, such as the feature extractor 450 of FIG. 4A, in accordance with an embodiment of this disclosure. In certain embodiments, training is conducted as a classification task where the number of biometric identifiers in the training data is the number of classes. As the number of identifiers (and classes) increase, so too does the generalization of the model increase.

The training method 900 includes training element 910 and a testing element 920. The artificial neural network 914 followed by the loss function 916 processes the biometric radio frequency data 912, in order to generate labels 918. The artificial neural network 914 generates features 924. The biometric radio frequency data 922 is compared with the features 924 to generate a similarity score 926. The metric 928 is used to analyze the similarity score 926 and improve the overall outcome of the artificial neural network 914.

Finding relevant signals for training a neural network depends on the domain of the source. For example, if the source is an image captured by a camera, then the image pixels corresponding to the face of the subject are the most relevant for authentication purposes. The pixels corresponding to the face can be selected and used for training a neural network. With respect to radar based authentication, raw radar signals are not geometrically interpretable without pre-processing, as pre-processing enables the electronic device to infer the angular information with respect to the radar reference origin. However, pre-processing increases noise or result in information loss. Noise can be introduced due to the imperfection of the weights used to combine the signals from the different receivers, while information loss can be due to the limitation of the pre-processing method. While using raw signals ensure no information loss or noise enhancement the raw signals can render a learning solution inefficient since the learning model has to be very large or needs an enormous amount of training data to cope with the variability.

In certain embodiments, a learning model is divided into multiple smaller models with specifically designed scenarios. By defining each model for a specific scenario the learning solution is more efficiently implemented.

Figure 9B:
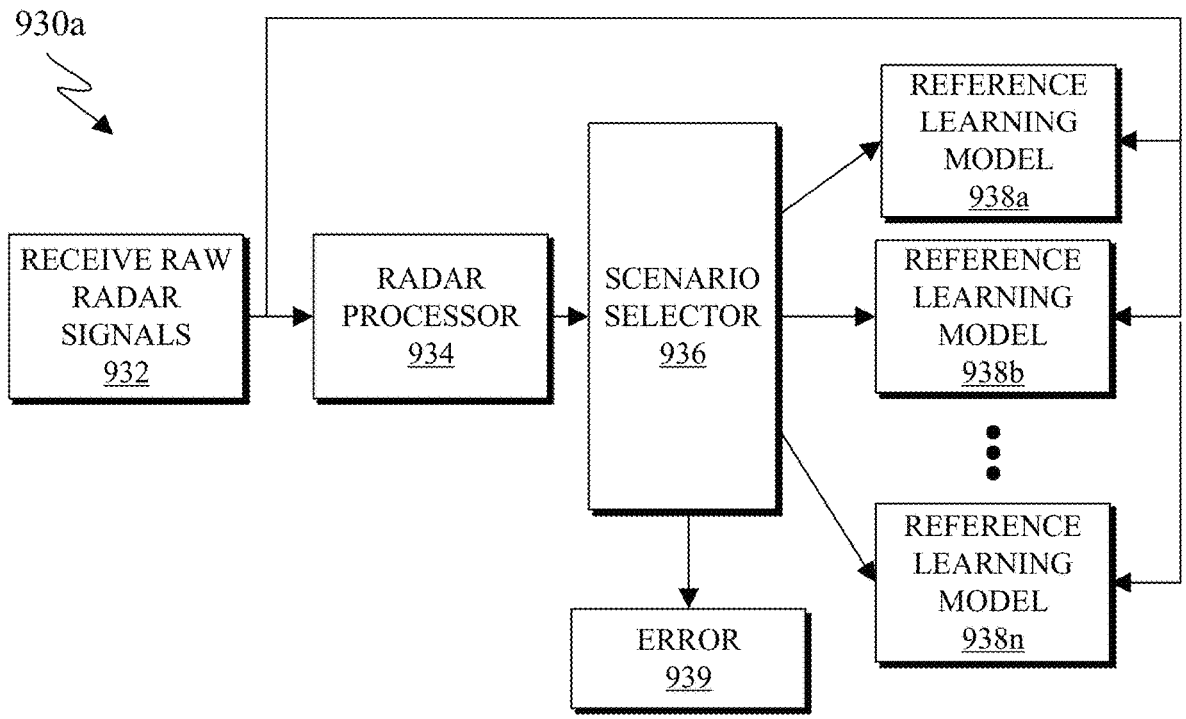
Figure 9C:
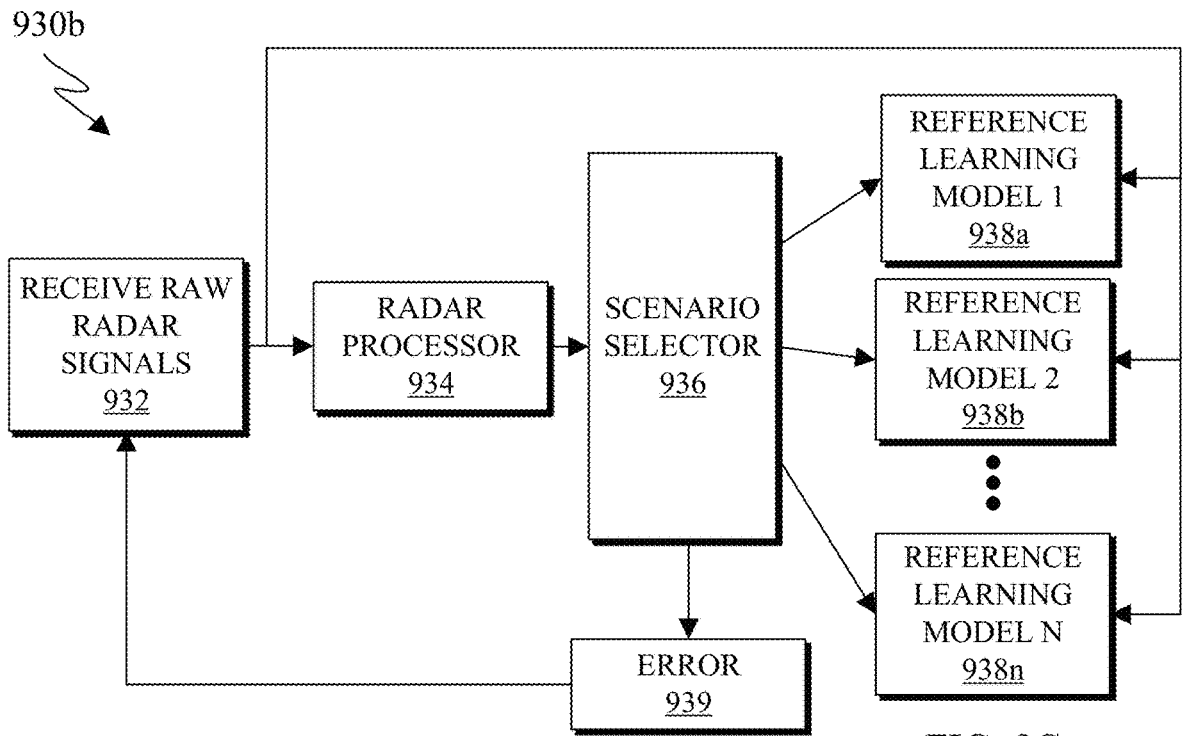

For example, FIGS. 9B and 9C illustrate learning solutions 930a and 930b, respectively. The learning solutions 930a and 930b include of learning models 938a-938n that uses a radar signal processing to identify the scenario in which the radar signals were captured.

The learning solutions 930a and 930b receive raw radar signals 932. The raw radar signals are input into a radar processor 934. The radar processor 934 conducts signal processing such as beamforming array processing, target range estimation, target angle estimation, and the like. The radar processor 934 can extract information that is used by the scenario selector 936 to determine which scenario, of multiple scenarios, corresponds to the captured raw radar signals. Once the scenario is identified, one of the N learning models, such as reference learning model 938a, reference learning model 938b, reference learning model 938n is invoked. The processed radar information by the radar processor 934 is used to identify the scenario and the learning models 938a-938n uses the raw radar signals 932.

If the extracted information does not fit any of the scenarios for the learning models 938a-938n, then an error 939 is declared. When the error 939 is declared, the learning solution 930b, can instruct the user to make an adjustment with respect to capturing the raw radar signals. For example, the learning solution 930b can instruct the user to move the electronic device closer or further away from the target object.

Figure 9D:
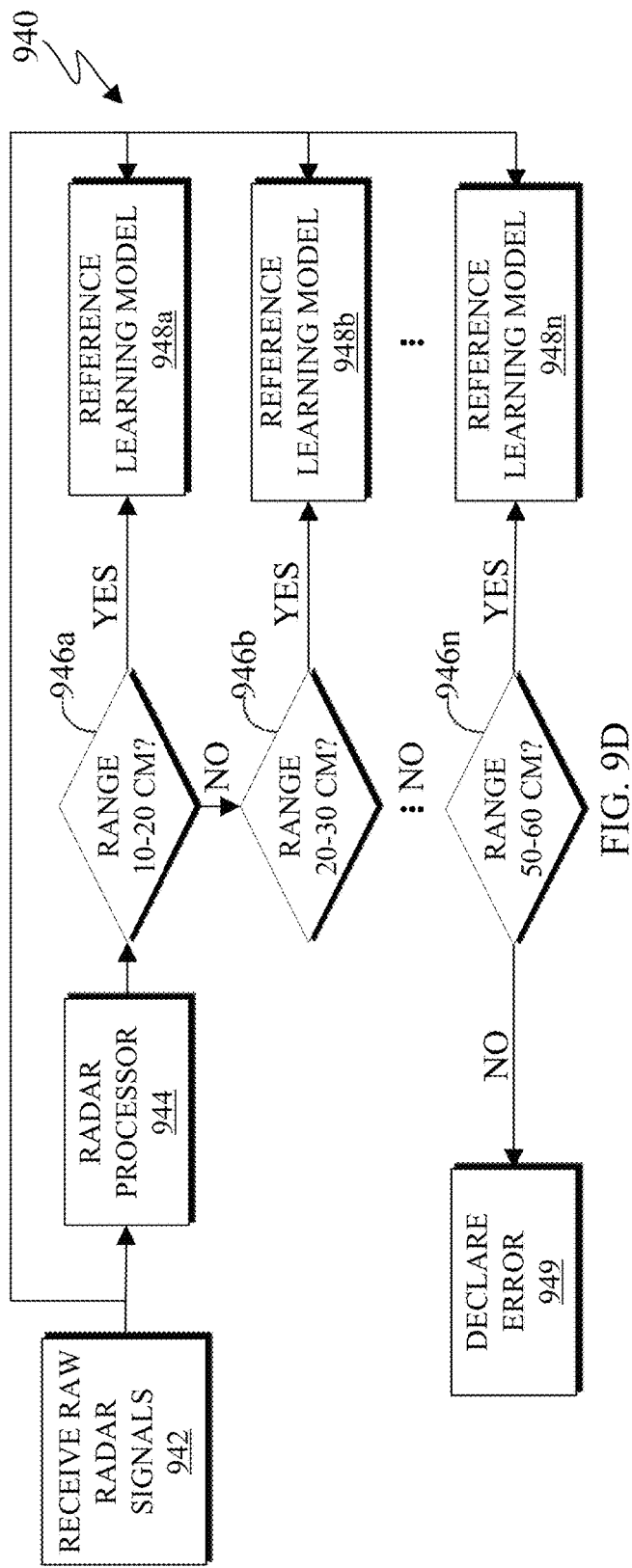

FIG. 9D illustrates an example learning solution 940. The learning solution 940 is similar to the learning solutions 930a and 930b. The learning solution 940 uses a range estimate for the scenario identification. The learning solution 940 receives raw radar signals 942. A radar processor 944 (similar to the radar processor 934), processes the raw radar signals 942 to estimate the range between the electronic device and the user. The range is similar to the distance 310 of FIGS. 3A and 3B. In certain embodiments, to identify the range, the radar processor 944 compares the received signal strength along the delay (equivalently the range) domain against a threshold and the first delay tap exceeding the threshold is used to compute the range estimate. In certain embodiments, to identify the range, the radar processor 944 generates a radar map, such as a range-Doppler map, and applies a target detection algorithm such as the constant false alarm rate (CFAR) algorithm.

After the radar processor 944 identifies the range, the learning solution 940 selects a learning model 948a-948n based on the range intervals 946a-946n. FIG. 9D illustrates a range interval size of 10 CM, however other intervals can be used. After the range interval is determined, the learning model corresponding to the range interval will be used. For example, if the identified range is 15 CM, then the reference learning model 948a is selected and the raw radar signals 942 are provided to the selected reference learning model 948a. For another example, if the identified range is 25 CM, then the reference learning model 948b is selected and the raw radar signals 942 are provided to the selected reference learning model 948b. That is, the processed radar information is used to identify the scenario and the learning models 948a-948n use the raw radar signals for training the neural network.

In certain embodiments, instead of the radar processor 944 identifying the range, other metrics can be used. For example, the radar processor 944 can identify the angle, a maximum Doppler, the average signal to noise ratio (SNR) of the signals, and the like.

Figure 9E:
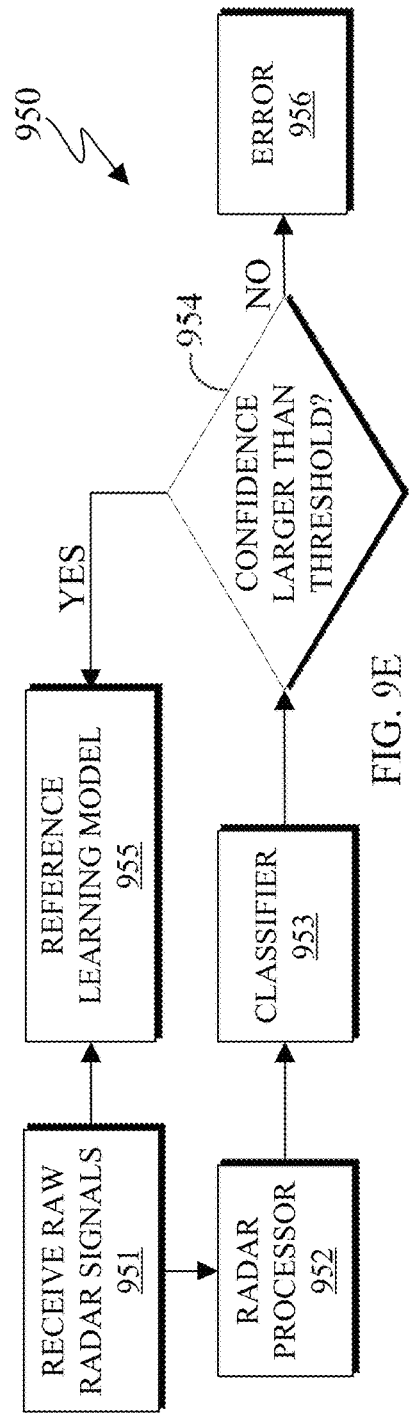

In certain embodiments, instead of using a specific distance, such as the range intervals 946a-946n, a classifier can be trained to identify a scenario from a set of scenarios. For example, FIG. 9E illustrates an example learning solution 950 using a machine learning classifier.

The learning solution 950 is similar to the learning solutions 930a, 930b, and 940. The learning solution 950 receives raw radar signals 951. A radar processor 952 (similar to the radar processor 934 and 944), processes the raw radar signals 951, and extracts radar information. The classifier 953 can be trained to identify a scenario among a set of scenarios. The classifier 953 can be the k nearest neighbor (kNN), a random forest, a support vector machine, neural network classifiers, and the like. The classifier selects a scenario which would correspond to a learning model, such as the learning models 948a-948n. The classifier also includes a confidence level of its selection. The decision 954 determines whether the confidence level is above a threshold. When the confidence level is above the threshold, then then the classification is likely accurate and the reference learning model 955 is selected, and the raw radar signals 951 are provided to the selected reference learning model 955. When the confidence level is below the threshold, then then the classification is likely inaccurate and the error 956 is declared.

In certain embodiments, the classifier 953 is a binary classifier and the reference learning model 955 represents a single learning model. For example, if the result of the determination is positive, then the raw radar signals 951 are inputted into the reference learning model 955. If the result of the determination is negative, the learning solution 950 can provide instruction to the user to make adjustment and a new set of raw radar measurement is collected. This process can be repeated until the scenario falls in the reference scenario or until the number of trials reaches a threshold. When the process repeats enough times to trigger the threshold, an error is output.

In certain embodiments, a learning solution can include a single model for a specific scenario and user feedback is provided to the user to make adjustment such that the captured radar signals will fall into the predefined scenario. As such, the raw radar signals are received and the radar processor extracts the information. The learning solution then determines whether the extracted radar information is within the reference scenario. In certain embodiments, the learning solution determines whether the extracted radar information is within the reference scenario based on distance by comparing the distance against some threshold or radius, by defining the neighborhood of the reference scenario in the space of the extracted radar information. If the extracted radar information is within the reference scenario then the radar signals are inputted into the reference learning model. However, if the extracted radar information is not within the reference scenario then the learning solution can provide instruction to the user to make adjustment and a new set of raw radar measurement is collected. This process can be repeated until the scenario falls in the reference scenario or the maximum number of trials exceeds a certain threshold and an error could be output.

Figure 9F:
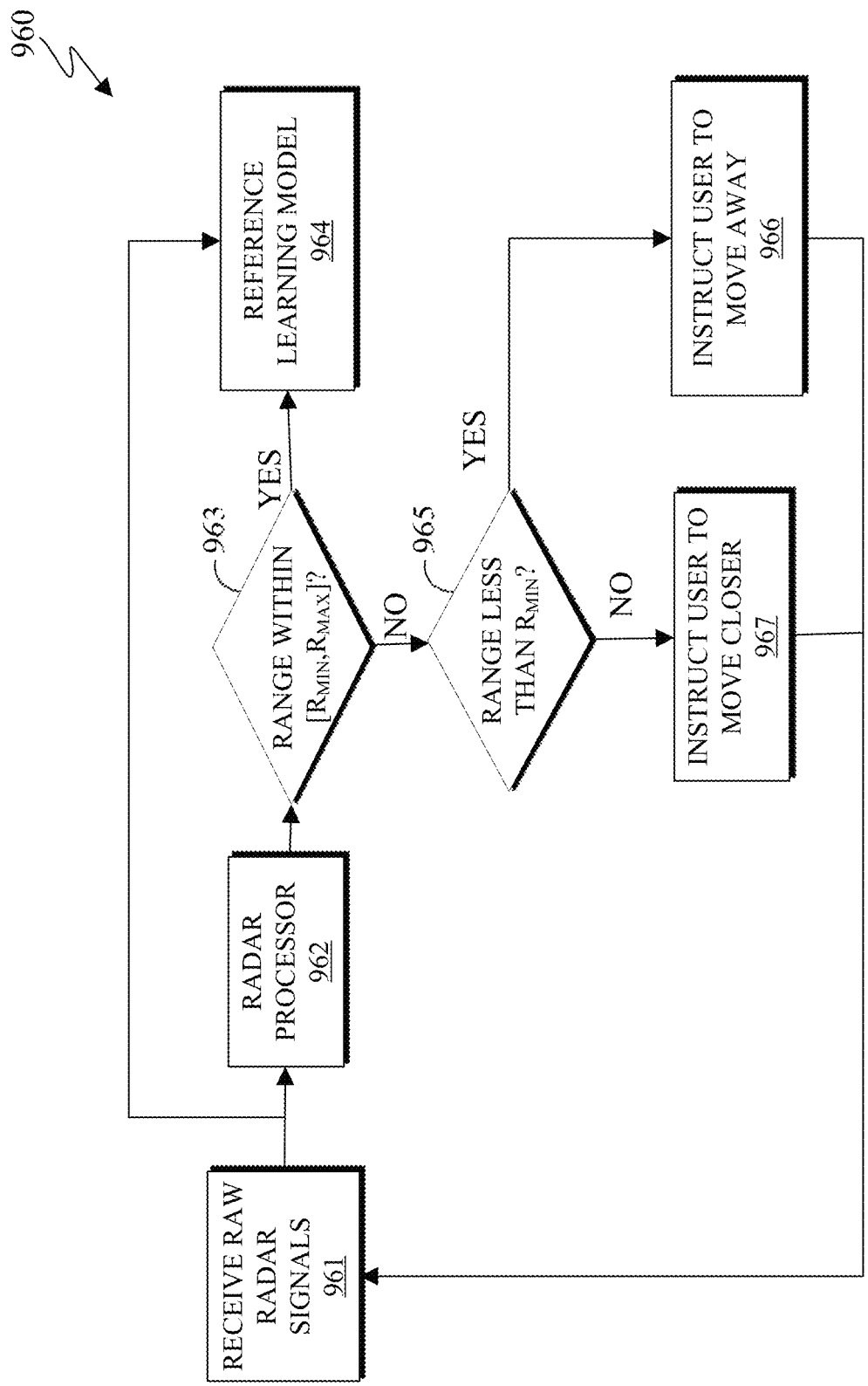

FIG. 9F illustrates an example learning solution 960 in accordance with an embodiment of this disclosure. The learning solution 960 includes a single learning model, reference learning model 964 within a range interval 963. Various changes can be made to the learning solution 960, such as including additional learning reference models.

The learning solution 960 receives raw radar signals 961. A radar processor 962 (similar to the radar processor 934, 944, and 952), processes the raw radar signals 961, and extracts radar information. In certain embodiments, the extracted radar information is a range estimate. The range estimate can be used as a metric for determining the scenario. The learning solution 960 includes only a single learning model, reference learning model 964 within the range interval 963. The range interval 963 determines whether the extracted radar information is within the range of $R_{min}$ and $R_{max}$. In certain embodiments, $R_{min}$ and $R_{max}$ represent distances such as 20 cm and 50 cm, respectively. If the extracted radar information is within the range of $R_{min}$ and $R_{max}$, then the raw radar signals 961 are within the reference learning model 964. As such, the raw radar signals 961 can be input into the reference learning model 964. If the extracted radar information is not within the range of $R_{min}$ and $R_{max}$, then the raw radar signals 961 are not within the reference learning model 964.

In decision 965, the learning solution 960 determines whether the extracted radar information is less than $R_{min}$. If the extracted radar information is less than $R_{min}$ then in step 966, the learning solution 960 instructs the user to move away from the electronic device. For example, extracted radar information is less than $R_{min}$ then the user is too close to the radar transceiver 410 and the learning solution 960 will output an instruction to the user to move away from the device. If the extracted radar information is not less than $R_{min}$ then in step 967, the learning solution 960 instructs the user to move closer the electronic device. For example, extracted radar information is greater than $R_{max}$ then the user is too far from the radar transceiver 410 and the learning solution 960 will output an instruction to the user to move closer to the device. After the adjustment a new set of raw radar signals 961 are collected and the whole process is repeated.

A maximum number of trials can be imposed by the learning solution 960. For example, if the number of trials exceeds the maximum number allowed, an error could be issued.

In certain embodiments, the range interval 963 can be an angular interval instead of a linear distance. The radar processor 962 can extract radar information corresponding to an angular interval. For example, the extracted radar signals can be within the Doppler spectrum such as a range-azimuth or range-Doppler map. When the extracted radar signals are not within the range interval 963, the learning solution 960 can instruct the user move or change positions with respect to the current position or pose of the user. The instructions can provide specific movement, such as instructing the user to move closer or further away from the electronic device as well as move towards the left or right of the electronic device. The instructions can simply instruct the user to move, without providing any specifics.

Figure 9G:
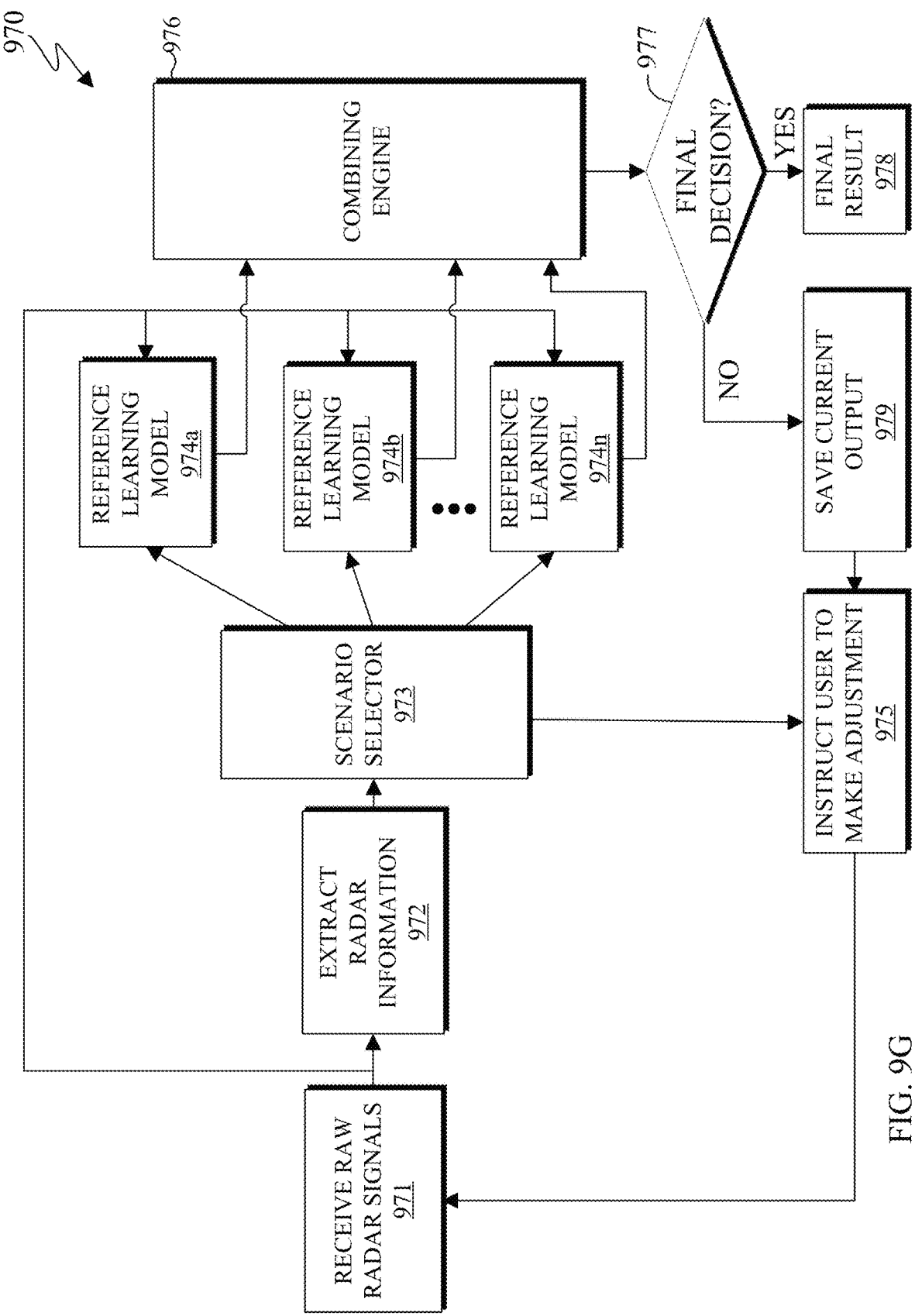

Even if the processed radar signals indicate that the raw radar signals fall within a particular reference learning model, the raw radar signals may lack enough information to provide a particular result from the reference learning model. FIG. 9G illustrates the learning solution 970 for combining outputs in accordance with an embodiment of this disclosure. The learning solution 970 leverages the request for user adjustment 975 as well as combining outputs from the reference learning models 974a-974n.

The learning solution 970 receives raw radar signals 971. A radar processor 972 (similar to the radar processor 934, 944, 952, and 962), processes the raw radar signals 971, and extracts radar information. The scenario extractor 973 uses the extracted information to select a learning model from the reference learning models 974a-974n. If the extracted information does not fall within one of the scenarios defined by the scenario extractor 973, the learning solution 970 request for user adjustment 975. After the request for user adjustment 975, new raw radar signals 971 are received.

The combining engine 976 combines the outputs of the learning models 971a-971n with previously saved outputs. The final decision 977 determines whether the combined outputs, of the combining engine 976, meet the criteria for the final result 978.

In certain embodiments, the final decision 977 determines whether the current output of the combining engine 976 meets the criteria for the final output by comparing a confidence level of the output with a threshold. In certain embodiments, the final decision 977 determines whether the current output of the combining engine 976 meets the criteria for the final output, by determining whether a pre-defined number of trials have occurred When the criterion of the final decision 977 is met, the combined result of the combining engine 976 is output as the final result 978. When the criterion of the final decision 977 is not met, the in step 979, the current output from the learning model corresponding to the current scenario is saved to the memory. The learning solution 970 generates a request for user adjustment 975, and the process starts over again as new raw radar signals 971 are received.

Figure 9H:
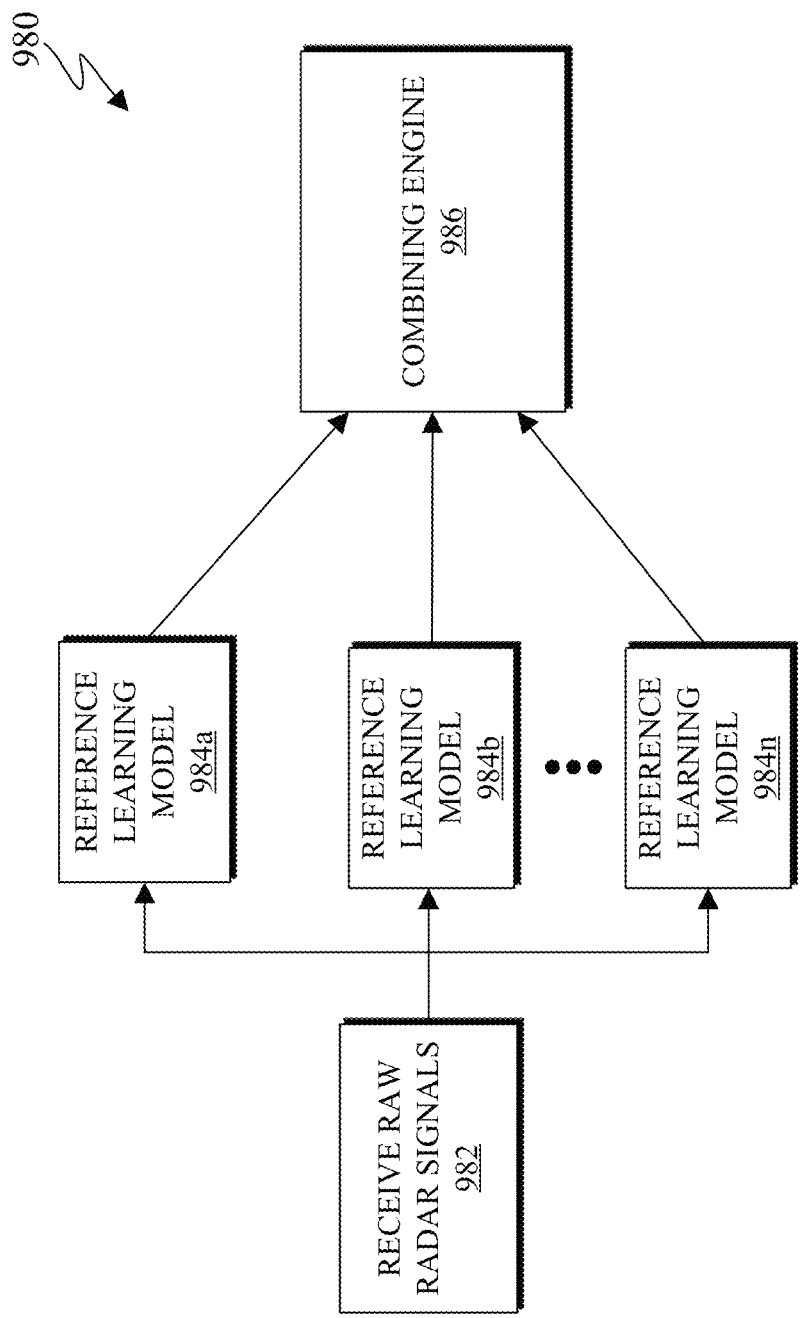

FIG. 9H illustrates an example learning solution 980 where multiple reference learning models 984a-984n run concurrently without particular scenarios being selected in accordance with an embodiment of this disclosure. In certain embodiments, multiple reference learning models run concurrently without selecting particular scenarios based on the processed data. For example, N reference learning models can be defined and trained for N scenarios.

The learning solution 980 receives raw radar signals 982. As illustrated, the learning solution 980 is omitted. The raw radar signals 982 are then input into the reference learning models 984a-984n that concurrently run. The combining engine 986 combines the outputs from the N reference learning models to generate the final result. In certain embodiments, the combining engine 986 applies a weighted average based on the confidence levels associated with the outputs from each of the reference learning models 984a-984n. The combining engine 986 can then applies a use a soft-max decision to the weighted averages to generate the final output.

In certain embodiments, the learning solution 980 can request an adjustment from the user, similar to the user adjustment 975 of FIG. 9G, when the confidence levels from the reference learning models 984a-984n is below a threshold. For example, if the outputs of the reference learning models 984a-984n indicate that the current scenario does not belong to any of the reference learning models 984a-984n, as indicated by all of the confidence levels being below a threshold, the learning solution 980 can request an adjustment from the user, and additional raw radar signals 982 are received.

FIG. 10 illustrates a block diagram 1000 for authenticating a user in accordance with an embodiment of this disclosure The block diagram 1000 illustrates the similarity score engine 460 creating feature vector pairs 1010, generating the similarity scores 1020, and the authentication engine 470 determining whether to authenticate the user, in accordance with an embodiment of this disclosure.

Each similarity scores is associated with a feature vector pair. Once of the feature vectors, of a feature vector pair, is from the received radar signals and extracted via the feature extractor 450 and denoted as 'v.' The other feature vector is from a preregistered feature vector 416 that is generated from the registered biometric data of an authorized user, and denoted as 'pv' (similar to the preregistered feature vectors 416 of FIGS. 4B and 4C).

The authentication engine 470 uses a threshold, denoted as 'h' 1030 to assign decisions 1040 to each of the feature vector pairs, based on the scores assigned to each of the feature vector pairs. The decisions 1040 are with accept or reject. In certain embodiments, the threshold is empirically determined. A vote 1050 is performed based on the decisions 1040 to make the final decision 1060 with respect to authenticating the user. In certain embodiments, the number of feature vector pairs is odd, to prevent a deadlock with respect to the voting.

Figure 11:
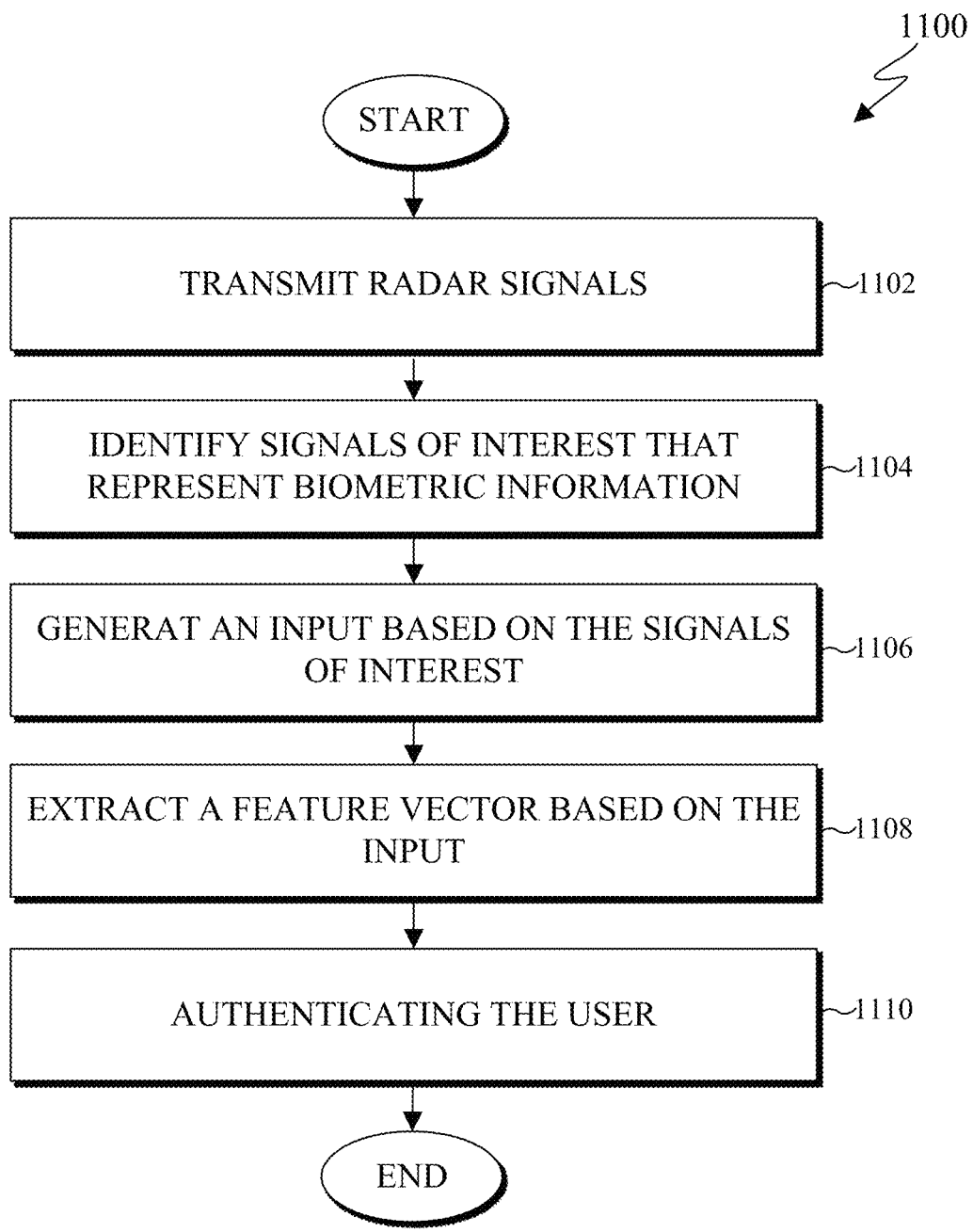
FIG. 11 illustrates an example method for authentication in accordance with an embodiment of this disclosure.

FIG. 11 illustrates a method 1100 for authenticating a user using radar signals in accordance with an embodiment of this disclosure. The method 1100 can be performed by the server 104 or any of the client devices 106-114 of FIG. 1, the electronic device 200 of FIG. 2, electronic device 300 of FIG. 3, the electronic device 400 of FIG. 4, or any other suitable device or system. For ease of explanation, the method 1100 is described as being performed by the components of the electronic device 400 of FIG. 4. The embodiments of FIG. 11 are for illustration only. Other embodiments can be used without departing from the scope of this disclosure.

In step 1102, the electronic device transmits radar signals. The radar signals can be transmitted via the radar transceiver 270 of FIG. 2, the transmitter 304 of FIG. 3, or the radar transceiver 410 of FIG. 4A. At least one of the radar signals is transmitted towards a target object, such as a face of the user for authentication purposes.

In step 1104, the electronic device identifies signals of interest. For example, a tap detector, such as the tap detector 420 of FIG. 4A, identifies the signals of interest from the received reflections of the radar signals transmitted in step 1102. The signals of interest include biometric information of the user. In certain embodiments, the identified signals are extracted from the received radar signals and used for authenticating the user.

To identify the signals of interest the tap detector 420 combines the raw radar signals from the different antenna configurations (such as different pulses). In certain embodiments, the tap detector 420 combines the raw radar signals into a one dimensional signal. For example, the tap detector 420 combines the raw radar signals by averaging the power delay profile. For another example, the tap detector 420 combines the raw radar signals by correlating between two different measurements. For instance, the tap detector 420 identifies the power delay profile for each raw CIR. Then the tap detector 420 for identifies an inner product of two vectors for each delay, where each includes the powers of the antennas configurations from the two frames. In certain embodiments, the tap detector 420 combines the raw radar signals into a 2D signal. For example, For example, the tap detector 420 combines the raw radar signals by beam forming.

The tap detector 420 then identifies and selects the signals of interest from the combined radar signals. In certain embodiments, the electronic device 400 detects a rise in CIR to identify and then select the signals of interest.

In step 1106, the electronic device 400 generates an input based on the signals of interest. The electronic device 400 pre-processes the signals of interest, such that feature vectors can be extracted from the signals of interest. A pre-processor, such as the pre-processing engine 430 of FIG. 4A modifies the signals of interest. For example, the pre-processing engine 430 can reshape the signals of interest to enable feature a neural network to extract vectors from the signals. The pre-processing engine 430 can standardize the reshaped input. The pre-processing engine 430 can also normalize the reshaped input.

In certain embodiments, the electronic device 400 determines whether genuineness of the radar sample. The inference engine 440 and the anti-spoofing engine 445 determines whether the target object that the radar signals, transmitted in step 1102, are reflected off of indicate that the target object is a live or fake. The inference engine 440 and the anti-spoofing engine 445 classify the target object as fake when the radar signals that reflect off of the target object indicate that the target object is an image of the user or a mask representing the user. The inference engine 440 and the anti-spoofing engine 445 classify the target object as live when the radar signals that reflect off of the target object indicate that the target object includes skin or other biological characteristics.

The inference engine 440 and the anti-spoofing engine 445 compare the reflected radar signals, transmitted in step 1102, to a set of pre-registered radar signals. The radar transceiver 410 of the electronic device, transmits the radar signals in step 1102 and receives the transmitted radar signals after they reflect off of a surface. The reflected signals can indicate the material that reflected the radar signals. For example, the inference engine 440 and the anti-spoofing engine 445 identify whether the material that the received radar signals are reflected off of is similar to the material indicated by the pre-registered user data. The inference engine 440 and the anti-spoofing engine 445 classify the target object as alive when the material that the received radar signals are reflected off of matches the material indicated by the pre-registered user data. Alternatively, the inference engine 440 and the anti-spoofing engine 445 classify the target object as fake when the material that the received radar signals are reflected off of does not match the material indicated by the pre-registered user data For example, the inference engine 440 generates a set of probabilities based on the input generated by the pre-processing engine 430 and the anti-spoofing engine 445 determines whether to classify the target object as alive or fake, based on the generated set of probabilities.

In step 1108, the electronic device 400 extracts feature vectors from the input. For example, the feature extractor 450 of FIG. 4A, extracts feature vectors from the input generated by the pre-processing engine 430. In certain embodiments, the feature extractor 450 is a neural network.

In certain embodiments, the feature extractor 450 can receive data from a photographic image of the user. The feature extractor 450 can extract features from both the photographic image and the received input that is based on the radar signals transmitted in step 1102.

In certain embodiments, the electronic device 400 identifies the distance between the radar transceiver 410 and the user. Based on the distance between the radar transceiver 410 and the user, the electronic device selects a particular model for extracting the feature vectors. The feature extractor 450 can include multiple models, where each model is trained to extract feature vectors based on the scenario.

In step 1110, the electronic device 400 authenticates the user by comparing the extracted features of step 1108 with preregistered user data. A similarity score engine 460 generates a score that indicates the distance between extracted features of step 1108 with preregistered user data. For example, the similarity score engine 460 can create multiple feature vector pairs where each pair includes one of the extracted features of step 1108 with one feature vector from the preregistered user data. An authentication engine 470 determines whether each similarity score associated with each of the multiple feature vector pairs is above a threshold.

When the similarity score associated with one of the feature vector pairs is above the threshold a first decision is assigned to the feature vector pair. For example, a similarity score associated with one of the feature vector pairs that is above the threshold can indicate that the two feature vectors (one from the extracted feature based on the received raw data, and one from the preregistered user data) are similar.

When the similarity score associated with one of the feature vector pairs is below the threshold a second decision is assigned to the feature vector pair. For example, a similarity score associated with one of the feature vector pairs that is below the threshold can indicate that the two feature vectors (one from the extracted feature based on the received raw data, and one from the preregistered user data) are not similar.

When the quantity of assigned decisions indicate that more the feature vectors pairs are similar than not similar the authentication engine 470 determines to authenticate the user. When the quantity of the assigned decisions indicate that more the feature vectors pairs are not similar than the quantity of decisions that indicate the feature vectors pairs are similar, then the authentication engine 470 determines to not authenticate the user.

In certain embodiments, the authentication engine 470 receives the results from the inference engine 440 and the anti-spoofing engine 445 when determining whether to authenticate the user. For example, the authentication engine 470 can perform a weighted average of the similarity scores of the feature vectors with the results of the authentication engine 470, which indicate whether the user is live or fake.

When the authentication engine 470 determines to not authenticate the user, the electronic device 400 can instruct the user to reposition the electronic device with respect to the user to and starts at step 1102 again. The electronic device 400 can also instruct the user to use another form of authentication in order to access the electronic device 400, the program, application, or files.

Although FIG. 11 illustrates one example of a method 1100 for authenticating a user using radar signals, various changes may be made to FIG. 11. For example, while shown as a series of steps, various steps in FIG. 11 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
a memory configured to store preregistered user data;
a radar transceiver; and
a processor operably connected to the memory and the radar transceiver, the processor configured to:
transmit, via the radar transceiver, radar signals,
identify signals of interest that represent biometric information of a user based on reflections of the radar signals received by the radar transceiver,
generate an input based on the signals of interest that include the biometric information,
determine, from the input, whether the signals of interest represent a living object,
after a determination that the signals of interest represent the living object, extract, using a neural network, a feature vector from the input, and
authenticate the user based on comparison of the feature vector to a threshold of similarity with the preregistered user data.

2. The electronic device of claim 1, wherein:
the electronic device further comprises a camera configured to capture an image of the user; and
the processor is further configured to extract the feature vector based on both the image and the input, wherein the input is based on the radar signals.

3. The electronic device of claim 1, wherein the neural network is configured to generate the feature vector from the input and a photographic image of the user.

4. The electronic device of claim 1, wherein:
the feature vector is one of a plurality of feature vectors;
the preregistered user data includes a set of pre-generated feature vectors; and
to authenticate the user, the processor is configured to:
identify feature vector pairs that include one of the plurality of feature vectors and one of the set of pre-generated feature vectors, respectively,
generate similarity scores for the feature vector pairs, respectively,
determine whether each of the similarity scores are above the threshold of similarity,
assign first decisions accepting one or more of the feature vector pairs having similarity scores above the threshold of similarity, respectively,
assign second decisions rejecting one or more of the feature vector pairs having similarity scores below the threshold of similarity, respectively, and
determine to authenticate the user when a quantity of the first decisions is larger than a quantity of the second decisions.

5. The electronic device of claim 1, wherein the processor is configured to:
receive, via the radar transceiver, raw radar signals associated with different antenna configurations from the reflections of the radar signals;
combine the raw radar signals; and
select the signals of interest from the combined raw radar signals.

6. The electronic device of claim 1, wherein:
the preregistered user data includes preregistered radar signals that are reflected off of the user;
the processor is further configured to:
receive a set of received radar signals that are reflected off of an object;
identify whether a material that the set of received radar signals and the preregistered radar signals are reflected off of is different, and determine whether to classify the object as alive or fake based on the material that the set of received radar signals and the preregistered radar signals are reflected off of is different; and to authenticate the user, the processor further configured to authenticate the user when a score based on the feature vector and the preregistered user data is above the threshold of similarity and the object is classified as alive.

7. The electronic device of claim 1, wherein the processor is further configured to:
identify a distance between the electronic device and the user, and
select a model based on the distance between the electronic device and the user, wherein the feature vector is extracted based on the model.

8. A method comprising:
transmitting, via a radar transceiver, radar signals;
identifying signals of interest that represent biometric information of a user based on reflections of the radar signals received by the radar transceiver;
generating an input based on the signals of interest that include the biometric information;
determining, from the input, whether the signals of interest represent a living object;
after a determination that the signals of interest represent the living object, extracting, using a neural network, a feature vector from the input; and
authenticating the user based on comparison of the feature vector to a threshold of similarity with preregistered user data.

9. The method of claim 8, further comprising
capturing, via a camera, an image of the user; and
extracting the feature vector based on both the image and the input, wherein the input is based on the radar signals.

10. The method of claim 8 wherein the neural network generates the feature vector from the input and a photographic image of the user.

11. The method of claim 8, wherein:
the feature vector is one of a plurality of feature vectors;
the preregistered user data includes a set of pre-generated feature vectors; and
authenticating the user comprises:
identifying feature vector pairs that include one of the plurality of feature vectors and one of the set of pre-generated feature vectors, respectively,
generating similarity scores for the feature vector pairs, respectively,
determining whether each of the similarity scores are above the threshold of similarity,
assigning first decisions accepting one or more of the feature vector pairs having similarity scores are above the threshold of similarity, respectively,
assigning second decisions rejecting one or more of the feature vector pairs having similarity scores are below the threshold of similarity, respectively, and
determining to authenticate the user when a quantity of the first decisions is larger than a quantity of the second decisions.

12. The method of claim 8, further comprising:
receiving, via the radar transceiver, raw radar signals associated with different antenna configurations from the reflections of the radar signals;
combining the raw radar signals; and
selecting the signals of interest from the combined raw radar signals.

13. The method of claim 8, wherein:
the preregistered user data includes preregistered radar signals that are reflected off of the user;
the method further comprising:
receiving a set of received radar signals that are reflected off of an object;
identifying whether a material that the set of received radar signals and the preregistered radar signals are reflected off of is different, and
determining whether to classify the object as alive or fake based on the material that the set of received radar signals and the preregistered radar signals are reflected off of is different; and
authenticating the user, comprises authenticating the user when a score based on the feature vector and the preregistered user data is above the threshold of similarity and the object is classified as alive.

14. The method of claim 8, further comprising:
identifying a distance between the radar transceiver and the user; and
selecting a model based on the distance between the radar transceiver and the user, wherein the feature vector is extracted based on the model.

15. A non-transitory computer readable medium embodying a computer program, the computer program comprising computer readable program code that, when executed by a processor of an electronic device, causes the processor to:
transmit, via a radar transceiver, radar signals;
identify signals of interest that represent biometric information of a user based on reflections of the radar signals received by the radar transceiver;
generate an input based on the signals of interest that include the biometric information;
determine, from the input, whether the signals of interest represent a living object;
after a determination that the signals of interest represent the living object, extract, using a neural network, a feature vector from the input; and
authenticate the user based on comparison of the feature vector to a threshold of similarity with preregistered user data.

16. The non-transitory computer readable medium of claim 15, wherein the computer readable program code, when executed by the processor, further causes the processor to:
capture an image of the user; and
extract the feature vector based on both the image and the input, wherein the input is based on the radar signals.

17. The non-transitory computer readable medium of claim 15, wherein the computer readable program code, when executed by the processor, further causes the neural network to generate the feature vector from the input and a photographic image of the user.

18. The non-transitory computer readable medium of claim 15, wherein:
the feature vector is one of a plurality of feature vectors;
the preregistered user data includes a set of pre-generated feature vectors; and
the computer readable program code, when executed by the processor, further causes the processor to:
identify feature vector pairs that include one of the plurality of feature vectors and one of the set of pre-generated feature vectors, respectively, generate similarity scores for the feature vector pairs, respectively, determine whether each of the similarity scores are above the threshold of similarity, assign first decisions accepting one or more of the feature vector pairs having similarity scores are above the threshold of similarity, respectively, assign second decisions rejecting one or more of the feature vector pairs having similarity scores are below the threshold of similarity, respectively, and determine to authenticate the user when a quantity of the first decisions is larger than a quantity of the second decisions.

19. The non-transitory computer readable medium of claim 15, wherein the computer readable program code, when executed by the processor, further causes the processor to:

receive, via the radar transceiver, raw radar signals associated with different antenna configurations from the reflections of the radar signals;

combine the raw radar signals; and select the signals of interest from the combined raw radar signals.

20. The non-transitory computer readable medium of claim 15, wherein:

the preregistered user data includes preregistered radar signals that are reflected off of the user; and the computer readable program code, when executed by the processor, further causes the processor to:

receive a set of received radar signals that are reflected off of an object;

identify whether a material that the set of received radar signals and the preregistered radar signals are reflected off of is different, and determine whether to classify the object as alive or fake based on the material that the set of received radar signals and the preregistered radar signals are reflected off of is different; and to authenticate the user, the computer readable program code, when executed by the processor, further causes the processor to authenticate the user when a score based on the feature vector and the preregistered user data is above the threshold of similarity and the object is classified as alive.

* * * * *